United States Patent [19]
Walker et al.

[11] Patent Number: 5,734,108
[45] Date of Patent: Mar. 31, 1998

[54] SYSTEM FOR SENSING SHAFT DISPLACEMENT AND STRAIN

[76] Inventors: Dana A. Walker, 254 Shakespeare Ct., Severna Park, Md. 21145; Michael D. Walker, 858 Birchwood Ct., Arnold, Md. 21012

[21] Appl. No.: 570,768

[22] Filed: Dec. 12, 1995

Related U.S. Application Data

[63] Continuation-in-part of Ser. No. 137,360, Oct. 18, 1993, Pat. No. 5,474,813, which is a continuation-in-part of Ser. No. 866,055, Apr. 10, 1992, Pat. No. 5,253,531.

[51] Int. Cl.$^6$ .................... G01H 17/00; G01M 13/00
[52] U.S. Cl. .................................. 73/650; 73/660
[58] Field of Search ................... 73/650, 659, 660, 73/862.321, 862.324, 862.326, 862.328; 250/237 G, 231.13, 231.14, 231.16; 356/374; 324/207.25, 207.22; 318/640, 594

[56] References Cited

U.S. PATENT DOCUMENTS

| | | | |
|---|---|---|---|
| 3,495,452 | 2/1970 | Johnson, Jr. et al. | 73/862.234 |
| 3,564,009 | 2/1971 | Foskett et al. | 548/508 |
| 3,885,420 | 5/1975 | Wolfinger | 73/650 |
| 3,934,459 | 1/1976 | Wolfinger et al. | 73/650 |
| 3,950,569 | 4/1976 | Morgan | 430/323 |
| 4,102,734 | 7/1978 | Schiffman | 156/659.11 |
| 4,121,272 | 10/1978 | Wolfinger | 73/650 |
| 4,148,222 | 4/1979 | Wolfinger et al. | 73/650 |
| 4,235,958 | 11/1980 | Barraud et al. | 430/281.1 |
| 4,317,371 | 3/1982 | Wolfinger | 73/650 |
| 4,430,566 | 2/1984 | Searle | 250/231.14 |
| 4,433,585 | 2/1984 | Levine | 73/862.326 |
| 4,464,935 | 8/1984 | McHugh | 73/660 |
| 4,482,584 | 11/1984 | Hess et al. | 427/286 |
| 4,551,017 | 11/1985 | Mannava et al. | 73/657 |
| 4,578,290 | 3/1986 | Koman | 427/421 |
| 4,621,256 | 11/1986 | Rusk | 341/3 |
| 4,641,027 | 2/1987 | Renner et al. | 250/237 G |
| 4,727,014 | 2/1988 | Horn et al. | 430/321 |
| 4,783,998 | 11/1988 | Sander | 73/660 |
| 4,806,454 | 2/1989 | Yoshida et al. | 430/321 |
| 4,818,661 | 4/1989 | Taylor et al. | 430/320 |
| 4,844,947 | 7/1989 | Kasner et al. | 427/510 |
| 4,885,231 | 12/1989 | Chan | 430/321 |
| 4,975,569 | 12/1990 | Ebina et al. | 250/231.16 |

(List continued on next page.)

FOREIGN PATENT DOCUMENTS

| 2093991 | 9/1982 | United Kingdom | 73/862.324 |
|---|---|---|---|

OTHER PUBLICATIONS

"Non–Contact Sensor Measures Engine Torque" Based on SAE Paper 830206, Noncontact Minature Torque Sensor For Automotive Application by William J. Fleming.

(List continued on next page.)

*Primary Examiner*—Hezron E. Williams
*Assistant Examiner*—Rose M. Miller
*Attorney, Agent, or Firm*—Sixbey Friedman Leedom & Ferguson; Daniel W. Sixbey; Evan R. Smith

[57] ABSTRACT

A system detects relative movement between an optical sensor unit and a set of finely spaced, parallel grid lines. Unlike prior optical line detection systems, each set of lines is applied to a surface of an object at an angle relative to movement between the optical sensor unit and the object. The system is particularly useful for monitoring rotating members, such as shafts, but is also useful with linearly moving members. In a preferred shaft monitoring application, a plurality of optical units are provided, with a plurality of corresponding sets of parallel lines at different angles on the shaft. Signal output phase differences between the optical units are compared to precisely determine movement of the shaft in seven directions of freedom, including rigid body displacement components along three translational and three rotational axes, and shaft twist. The differentially angled sets of lines may be spaced axially along the shaft or other object, or a plurality of angled line sets may be superimposed in a single location as a set of cross-hatched lines.

33 Claims, 36 Drawing Sheets

PITCH MOTION (AMPLITUDE EXAGGERATED)

PLUNGE MOTION (AMPLITUDE EXAGGERATED)

U.S. PATENT DOCUMENTS

| | | | |
|---|---|---|---|
| 4,978,954 | 12/1990 | Koike | 341/1 |
| 4,995,257 | 2/1991 | Leon | 73/660 |
| 4,997,747 | 3/1991 | Yoshida et al. | 430/321 |
| 5,001,937 | 3/1991 | Bechtel et al. | 73/862.326 |
| 5,328,727 | 7/1994 | Kashio et al. | 427/595 |
| 5,365,787 | 11/1994 | Hernandez | 73/660 |
| 5,438,882 | 8/1995 | Karim-Panahi et al. | 73/862.324 |

OTHER PUBLICATIONS

ISA Transactions: 12 (186–190) "Optical Measurements of Very Small Strains During Torsional Oscillations of Metallic Rods" by Hartman & Palmer.

Proc Instn Mech Engr, vol. 203, "Using an Encoder as a Torsional Vibration Transducer" by J.D. Smith and J.S. Echeverria–Villagomez (1989).

Burel & Kjaer Produce Data, Torsional Vibration Meter, Type 2523.

C311/84 "A Review of Rolling Element Bearing Health Monitoring (III): Preliminary Test Results On Eddy Current Proximity Transducer Technique" PY Kim, MEng, MASC. The American Society of Mechanical Engineers (84–DET–55) "Measurement of Torsional Vibration In Rotating Machinery" by J.M. Vance and R.S. French.

"Measuring Torsional Vibration: by W.H. Verhoef, Tektronix, Inc., Nov., 1977, pp. 61–66.

Technishes Messen 51 Jahrgang 1984 Heft 10, "Drehzahlmessung Mit hilfe Einer Optimalen PLL–Schaltung", Measuring of Revolutions by an Optimal PLL Circuit.

Automotive Engineer, Apr./May 1989 "Laser Tools For Diesel Engine Development" by Halliwell, Pullen, Baker, Inst. of Sound & Vibration Research.

"Diesel Engine Vibration: Diagnosis With a Laser", Internoise 83, Halliwell Pullen and Baker, Inst. of Sound and Vibration Research, pp. 1139–1142.

"Torsional Vibration Behavior of Hydrodynamic Couplings" by Dr. Ing. D. Sideris and Dipl. Ing. H. Worsch, pp. 46, 48.

Applied Optics, vol. 11, No. 4, Apr. 1972, "Transmission of Incoherent Light Between Ronchi Grids" by C. Harvey Palmer & Bruce Z. Hollmann.

VIBRAC Corp. Model 1038 Manual, Motorized Dynometer.

VIBRAC Corp. 880 Series Manual, Motor Evaluators.

International Search Report/PCT/US93/03228 and International Examination Report.

RONCHI GRID MASK
WITH QUADRATURE

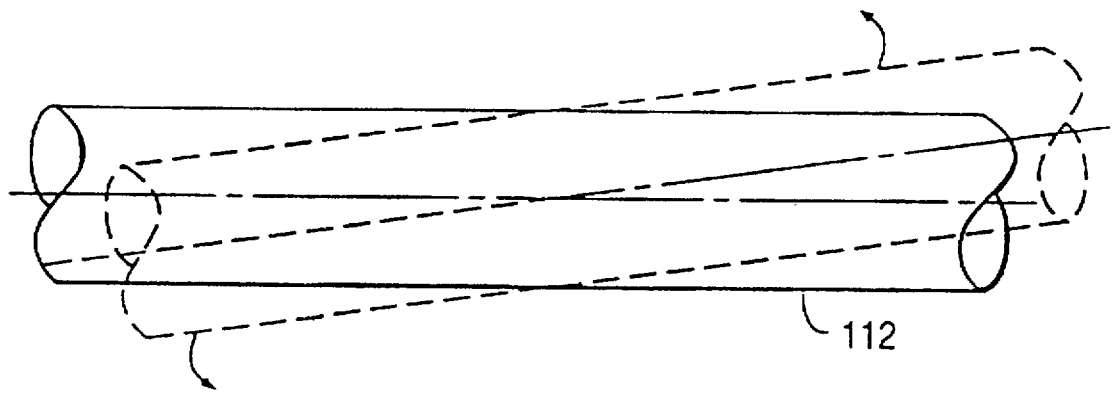
PITCH MOTION (AMPLITUDE EXAGGERATED)
FIG. IIa
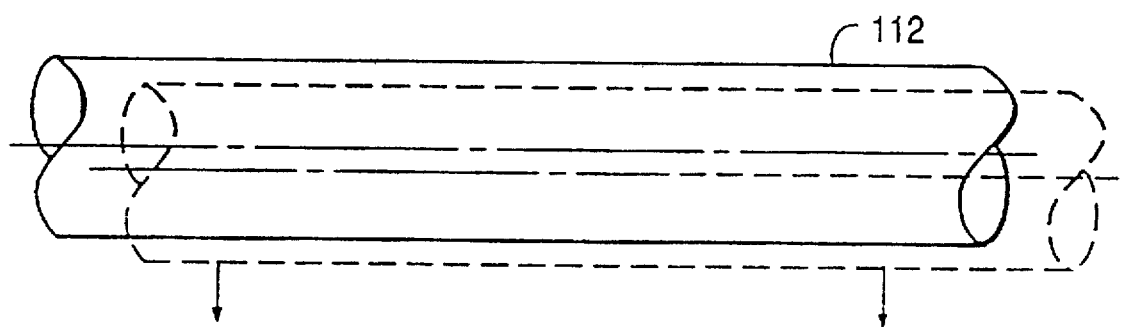
PLUNGE MOTION (AMPLITUDE EXAGGERATED)
FIG. IIb

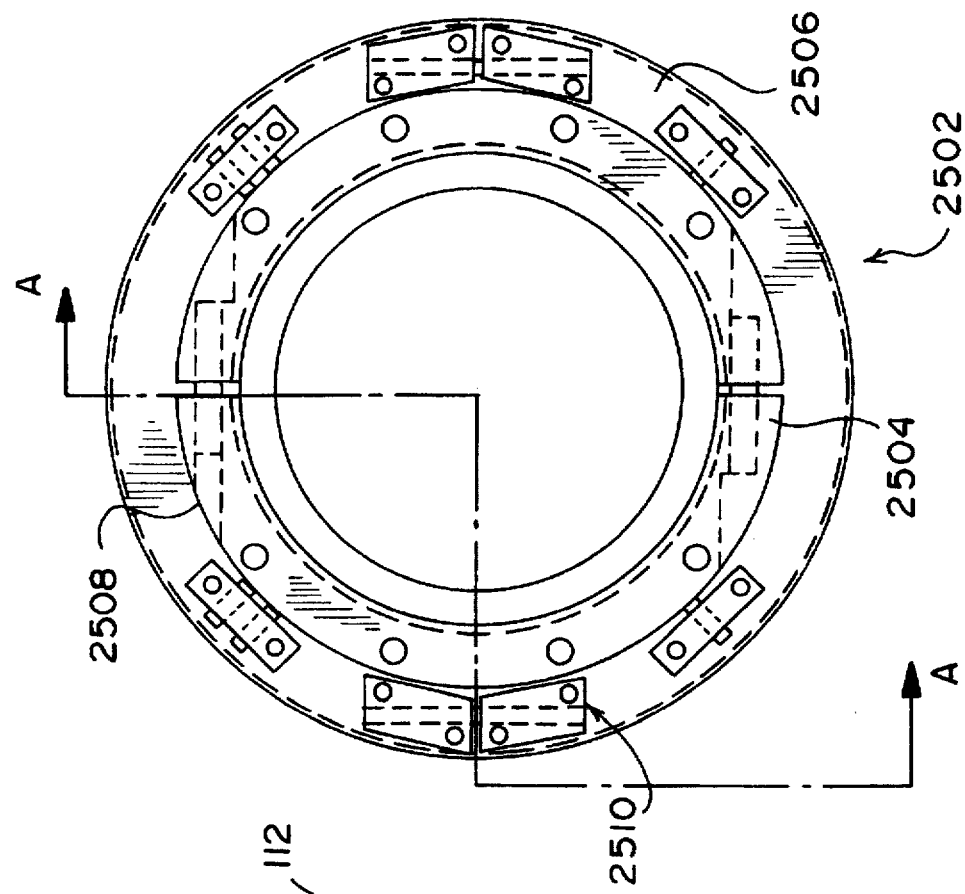
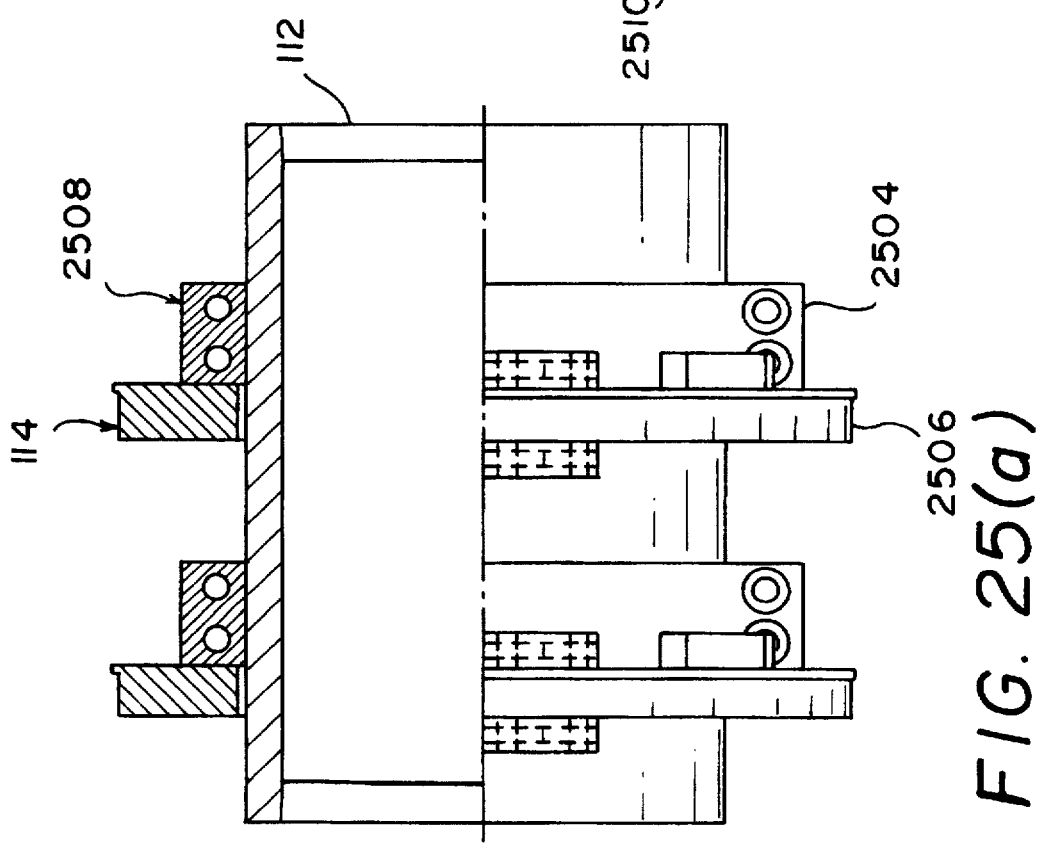
FIG. 25(b)
FIG. 25(a)

FIG. 27a
TORSIONAL POSITION & SPEED
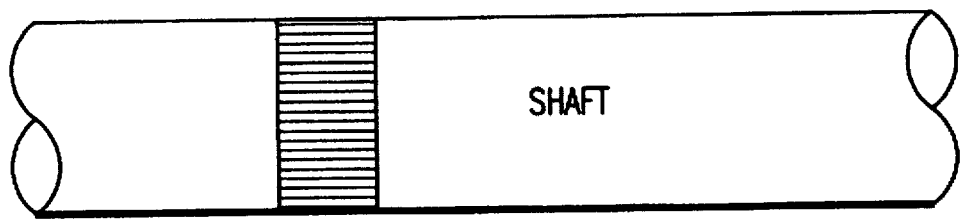
FIG. 27b
TORSIONAL POSITION, SPEED & STRAIN
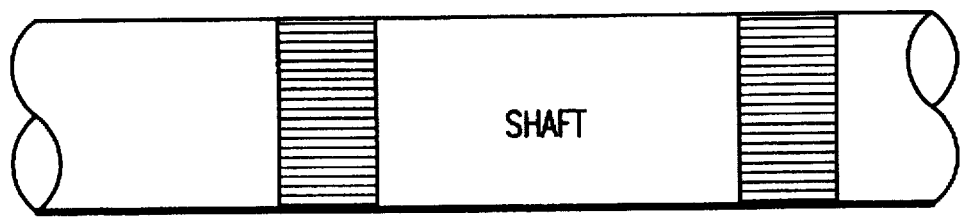
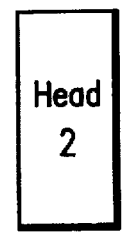

TORSIONAL STRAIN & LATERAL POSITIONS

TORSIONAL STRAIN & AXIAL STRAIN

FIG. 27e
TORSIONAL STRAIN & AXIAL POSITION
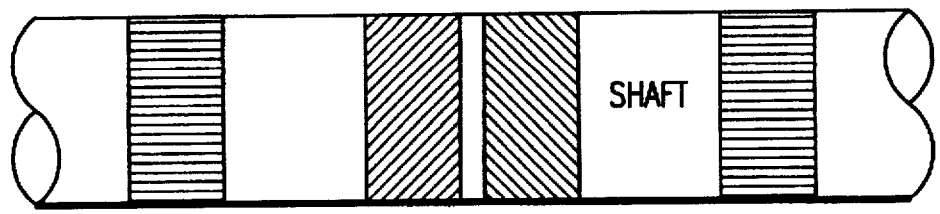
 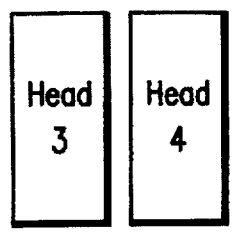 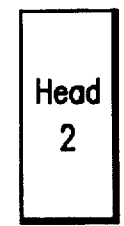
FIG. 27d
TORSIONAL & LATERAL POSITIONS
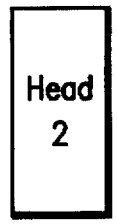
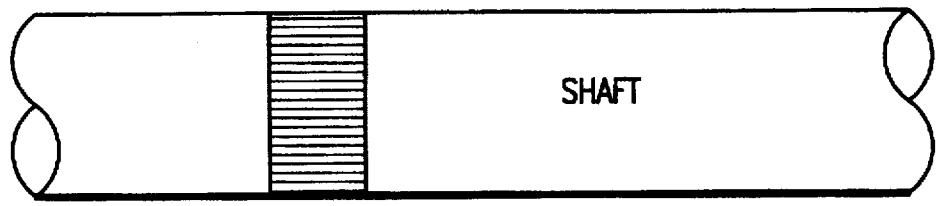

SYSTEM FOR SENSING SHAFT DISPLACEMENT AND STRAIN

This application is a continuation-in-part of U.S. patent application Ser. No. 08/137,360 filed Oct. 18, 1993 (now U.S. Pat. No. 5,474,813), which is a continuation-in-part of U.S. patent application Ser. No. 07/866,055 filed Apr. 10, 1992, now U.S. Pat. No. 5,253,531.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND ART

Torsional vibrations in power transmission shafts are produced by load fluctuations or by fluctuations of the power source or transmission system. Detection of these vibrations, especially if they can be isolated from other vibrations and noise, is a means of early detection of flaws in the transmission system. The smaller the fluctuation which can be detected, and the more specific the location of the source, the earlier such flaws can be identified so that potentially serious problems can be averted.

Indirect means of monitoring, such as microphones or accelerometers—mounted for example to a bearing block—can provide a warning when failure is imminent, but the information of interest in their signals is partially masked by ordinary vibrations and cannot identify the specific source of vibrations. Previous optical means of detecting torsional vibrations are either not sensitive enough to detect small fluctuations, or are expensive, fragile laboratory devices not suitable for continuous monitoring in the hostile environment of a power system. Additionally, many of these systems must be installed before assembly of the power system and/or require access to the ends of shafts in the system.

It has been found that detailed analysis of torsional variations, for example those that recur at the same point during a rotational cycle of a shaft or system of shafts can be used to identify wear or damage to gears and other transmission components used to transmit power to and receive power from the shaft. For example, a gear with a worn tooth typically results in uneven application of power to the shaft due to delay in engagement of the worn tooth with its mating tooth. Prior art systems do not permit the desired regular monitoring and detection of very small recurrent variations in power transfer, and may lack the sensitivity to identify developing problems before they have already become audible or visible to an experienced mechanic. It would therefore be desirable to provide a system and method capable of resolving and reporting very small torsional vibrations which could be permanently installed on an oceangoing vessel or other mode of transportation, or in an industrial facility.

Hartman and Palmer, in ISA Transactions, Volume 12, pp. 186–190 (1973), disclose application of an optical technique to measurement of torsional oscillations on a non-rotating beam in a laboratory and were able to measure a resolution of $10^{-4}$ arc-seconds. In the field, however, the inventors have found that resolution is limited by motion of optics components relative to each other. With a moving shaft, resolution is also affected by shaft run-out and other shaft vibrational modes. Resolution of much less than one arc-second under these dynamic conditions is difficult to reach using the disclosed optical techniques due to vibration of the optics.

An article by J. M. Vance and R. S. French titled "Measurement of Torsional Vibration in Rotating Machinery" presented at the Design Engineering and Technical Conference of ASME, Oct. 7–10, 1984, shows the use of optically transduced signals from a special tape applied to a shaft.

U.S. Pat. No. 4,551,017 to Mannava et al. shows a system which is said to optically measure torsional vibration of a shaft using a photodetector which senses the passage of a grating on the moving surface of the shaft. An optional reference beam at the same location is used to detect other motion of the shaft. The photodetector output is passed through a zero-crossing detector. The system disclosed uses a laser Doppler velocimetry system for illuminating the grating. Mannava et al. use a non-zero Bragg diffraction order from the shaft mounted grating to obtain a Doppler frequency shift due to the surface velocity of the shaft. The collected first order diffracted light is then heterodyned with a reference beam. This approach requires coherent incident and receiving optics and requires that the light collection angle be carefully chosen to avoid zero and second diffraction orders, and further requires that the vector normal to the shaft surface remain constant, and that the position of the plane tangent to the shaft surface remain constant. Further, it requires that a diffraction grating be machined into the surface of the shaft, or that a grating, if suitable grating exists, be attached to the surface of the shaft.

U.S. Pat. No. 4,995,257 to Leon shows an angular shaft vibration monitor with two optical sensors spaced along the length of the shaft. Beams of light are shined toward the shaft, and are reflected by markings on the shaft, with the scattering of light detected by optical sensors. The difference between the sensor signals is used to measure torsional vibration. However, the markings used are single marks. While such systems may be effective in detecting large random torsional vibrations, they are incapable of finely resolving higher frequency torsional variations occurring only at certain points over an entire revolution of a shaft.

U.S. Pat. No. 4,433,585 to Levine shows a method and apparatus for measuring torsional deviation of a shaft using optical diffraction transmission gratings. Signals from two photodiodes are passed through comparators and their phases compared. The resulting signal is low-pass filtered to generate a signal representing torsional deviation. In this system, the diffraction gratings are arranged at opposite ends of the shaft, making it difficult or impossible to retrofit an existing industrial or naval shaft for such detection. Such a system cannot be applied on multiple shafts or on shafts with inaccessible ends. On very large shafts, the size of the optical disc required becomes an obstacle to easy installation, and the large optical discs introduce error into measurements because of their own vibrations. Finally, Levine does not disclose a system which detects variations in torsional deviation, i.e. torsional vibration. It is desirable to monitor not simply the steady state twist of the shaft, but oscillations in the shaft twist, principally the first few torsional pendulum modes. In the largest shafts, the twist due to the steady state load is already small, perhaps 50 arc-seconds/foot. Oscillation amplitudes are generally a small fraction of this amount, say 5 arc-seconds/foot. Even this represents a very high energy oscillation for which monitoring would be desirable.

U.S. Pat. No. 3,885,420 to Wolfinger shows a method and apparatus for measuring torsional vibration of a shaft. A signal from a shaft rotation sensor is passed through a zero crossing detector and its phase is compared with a second signal. The resulting signal is low-pass filtered to generate a signal representing torsional vibration. However, the sensors used are proximity sensors used with gear teeth. These can only resolve low frequency, large amplitude variations. Furthermore, the signals are processed by a phase-locked-loop and low pass filtered, limiting the application to less than one octave of shaft speed range and to low frequency variations. The system disclosed is applied to a constant speed 60 hz power generator for which it is suited, but like the Mannava et al. system described above, systems of this type do not provide true torsional vibration readings and are incapable of resolving either small amplitude or high frequency vibrations.

U.S. Pat. No. 4,317,371 to Wolfinger shows the same non-optical torsional vibration monitor to which quadrature has been added along which separate frequency bandpass filters to help discriminate against periodic electrical interference which masks the signal. Another patent to Wolfinger et al., U.S. Pat. No. 3,934,459, shows another system using multiple nonoptical sensors in a complex machine to detect variations in torsional oscillation between plural rotating shafts.

U.S. Pat. No. 5,001,937 to Bechtel et al. shows an optically based torsion sensor using an adhesive band applied to the shaft. The band has alternating high and low reflectivity regions, the passage of which is sensed to detect torsion. Like the U.K. patent to Lowman, this disclosed system uses a light source to produce a single spot on the target shaft at two or more locations. The ability to resolve shaft twist appears to depend upon reducing the spot to a small size, in particular much smaller than the line spacing. An example in the disclosure of Bechtel et al. resolves only three minutes of arc. Lines are produced by painting or machining the shaft.

U.K. Patent Application GB 2 093 991 A to R. J. Lowman shows a torque measurement apparatus with axially spaced alternating reflective and non-reflective areas, the passage of which is detected with a pulsed laser light beam directed to a single spot on each of the two axially spaced reflective and non-reflective areas on the shaft. The reflective areas are produced by grinding or polishing, and the non-reflective areas by painting or etching.

U.S. Pat. No. 4,641,027 to Renner et al. shows an apparatus for measuring static or dynamic torque which optically measures relative movement of a flexible surface to make the torque measurement. This system uses lines which at zero torque are parallel to the axis of the shaft to measure shaft torque. The lines are strained as the shaft is strained, and thus their angular orientation is slightly changed. The system disclosed uses the angle of the lines as indicated by the spacing of Moire fringes between two transparent cylinders or disks to measure the torsional strain of a shaft.

U.S. Pat. Nos. 4,806,454 to Barrand et al. and 4,997,747 to Yoshida et al. show generally the production of diffraction gratings using photo processes. However, these patents are directed primarily to etching techniques and do not show or suggest application of grating lines to a cylindrical shaft. A very large number of lines is required to cover the perimeter of any shaft greater than about 2.5" in diameter. Because of the number of lines and the need for precise spacing, diffraction errors and lens aberrations inherent in conventional techniques (such as photoreduction of a larger pattern onto a shaft) make it impossible to apply these techniques to forming very fine lines about the circumference of a shaft.

Photoelectric torque transducers, such as those used in the 8800 series Motor evaluators and 1038 Motorized Dynamometer made by Vibrac Corporation, are also known, but are not suitable for torsion vibration measurement because frequency response is limited by line spacing and by the digital counter processing method used. Such systems do not have the precision to resolve under 300 arc-seconds. These transducers were designed to include a shaft and torsion rod which must transmit the shaft loads, and have maximum loads of 200 lb-ft.

Similarly, prior laser doppler velocimetry systems developed by Brüel & Kjaer, Dantec, and TSI, Inc. are laboratory research instruments unsuitable for fleet deployment due to their expensive construction, fragile nature, and difficulty of use. Also, as far as the inventors are aware, these systems have not been used with very finely spaced grid lines applied to the shaft, which the inventors have found improves accuracy and ease of use.

In conclusion, none of the prior art systems known to the inventors provides an entirely satisfactory apparatus and method which can be permanently retrofitted to existing industrial and shipboard applications to continuously detect and analyze torsional vibrations occurring in rotating shafts, or measurement of position parameters in linear systems such as linear position, speed, and relative displacements such as strain.

Similarly, the prior art systems do not provide an apparatus that is also suitable for taking accurate steady-state measurements of parameters such as d.c. torque, thrust, and position.

SUMMARY OF THE INVENTION

Therefore, it is a general object of the invention to provide an improved optical detection system for accurately measuring velocity, torque, thrust, torsional strain, planar strain, axial strain, displacement in various degrees of freedom, and other parameters of a moving object.

Another general object of the invention is to provide a system for monitoring torsional vibrations and oscillations in power transmission shafts.

A further general object of the invention is to provide an apparatus and method for precision application of finely spaced lines to a shaft.

A more specific object of the invention is to provide a system for measuring torsional strain in a power transmission shaft which is capable of resolving instantaneous torsional strains on the order of one arc-second per foot.

It is another object of the invention to provide a system which can be permanently installed in an industrial plant, ocean-going vessel, or other mode of transportation to monitor the operation of a shaft.

Yet another object of the invention is to provide a system for monitoring a power transmission shaft which can be constructed at low cost and which is capable of providing information on torsional vibration, torsion, rotation rate, variations in rotation rate, vertical pitch and plunge of the shaft, shaft power, torque and torque fluctuations.

A further object of the invention is to provide a system for monitoring torsional oscillations and other shaft operational parameters which can be retrofitted to existing shafts, particularly shafts in industrial installations and power shafts of naval vessels and other modes of transportation.

Another object of the invention is to provide a system for monitoring shaft operation which uses a standardized, interchangeable set of hardware and software to monitor any shaft.

It is also an object of the invention to provide a system for monitoring shaft operation which can withstand large vibrational and shock loads without damage.

Yet another object of the present invention is the provide a shaft operation monitoring system which can be readily adapted to operate in adverse environments, such as underwater.

Another object of the invention is to provide a shaft monitoring system which does not require machining of the shaft or addition of protruding components to the shaft.

It is also an object of the present invention to provide an accurate shaft torsional strain monitoring system which can be used to diagnose repetitive variations in torsion caused by worn or damaged components in the transmission systems attached to the shaft. Another object of the present invention is to provide a system for accurately measuring torsional strain on a shaft which compensates for non-rotational movement of the shaft to produce a valid output.

A further object of the invention is to provide an optical shaft status monitoring system which uses infrared light emitting diodes to image finely spaced grid lines on the shaft through a Ronchi grid mask onto an optical detector for producing an output indicative of shaft movement.

Another object of the invention is to provide a unitary optical sensing unit for sensing the movement of a shaft which is designed to permit easy adjustment and positioning of the optical unit relative to the shaft.

Yet another object of the invention is to provide an optical shaft monitoring system including an optical sensing unit with a rotating turret which can be adjusted to position a photodetector for detecting the interaction of a Ronchi grid mask and an image of shaft grid lines, which can also be adjusted to position a light source to image the Ronchi grid mask onto the shaft grid lines to facilitate positional adjustment and focusing of the optical sensor unit.

A further object of the present invention is to provide a method for retrofitting a shaft with finely spaced grid lines using a photographic process.

A further object of the invention is to provide a method for applying finely spaced grid lines to a shaft such that multiple sets of matched, precisely spaced grid lines are produced at a plurality of locations and on a plurality of shafts along the axis of rotation of the shaft.

A more detailed object of the present invention is to provide a method for optical placement of finely spaced grid lines on a shaft, comprising the steps of preparing a film master, placing the master on a shaft, placing photosensitive material at other locations on the shaft or shafts, and sensing the pattern of the film master to control the exposure of the photosensitive material by a light source proximate thereto.

Yet another object of the invention is to provide a method for making a film master having a plurality of closely spaced grid lines by exposing the film selectively using a light source driven by a precision timing circuit.

Another general object of the invention is to provide a system for laser Doppler velocimetry in which laser light is applied to a set of finely spaced grid lines on the shaft to improve performance of the laser Doppler system.

A further object of the invention is to provide an improved laser Doppler velocimetry system which applies light to a set of finely spaced grid lines on a shaft using a triangle interferometer as a beam splitter.

Another broad object of the invention is to provide a novel and improved torsional interferometer incorporating at least two synchronous laser Doppler velocimeters and associated finely spaced shaft lines, at axially spaced locations on a shaft, to detect torsional strain on the shaft.

Another object of the invention is to provide a method for interferometric line writing on a shaft using synchronously pulsed lasers to expose photosensitive material on the shaft.

Another object of the invention is to provide an apparatus and method for sensing movement of a shaft, such as axial displacement, on which finely spaced grid lines are provided in at least two axially separated locations at different angles relative to the shaft axis, and the passage of the grid lines is correlated between the axially spaced locations to detect movement.

It is also an object of the invention to provide a method of applying lines to a shaft, for mastering or permanent use, by helically wrapping a lined material onto the shaft.

Another object of the invention is to provide a method for applying material to a shaft wherein a diagonal cut is made across the material, the material is applied to the shaft, and the diagonally cut ends are mated to surround the shaft without any seams parallel to a direction of lines to be generated on the material.

Yet another object of the present invention is to provide an improved spatial anti-aliasing filter and method for automatically filtering shaft movement sense signals in a variable manner depending on the shaft rotational speed.

Another object of the invention is to provide a servo control system based on the optical shaft parameter detection methods of the invention.

A further object of the invention is to provide a servomagnet feedback control system for accurately holding a shaft in position based on shaft operating parameters determined by optically sensing the passage of finely spaced lines on the shaft.

It is also an object of the invention to provide an improved method of determining the rotational position of a shaft, incorporating at least one index line and a sensor that detects passage of the index line and synchronizes a sensor monitoring passage of a set of lines based on the location of the index line.

Another object of the invention is to provide an optical prism assembly for collecting images of a set of lines and an index line and feeding the images through a single optical element path to sensors for detecting the passage of the lines and index line.

A further object of the invention is to provide a split collar apparatus for temporarily or permanently applying finely spaced line sets to a shaft without modifying the shaft.

Another object of the invention is to provide an improved phase difference detector for use with pulsed signals.

A more detailed object of the invention is to provide an improved phase difference detector for use with two pulsed signals, in which a digital counter is connected to count a difference in the number of pulses that have been generated by the two signals, and the output of the counter is integrated and filtered to provide a continuously varying analog signal level representing the current phase difference between the two signals.

Another important object of the invention is to increase the accuracy of an optical position detection system which uses a set of finely spaced lines moving relative to a detector, by measuring a baseline phase error arising from line placement and spacing variations and dynamically subtracting the baseline error from the output produced by the detection system.

Further objects and advantages of the present invention will be apparent to those skilled in the art upon review of the specification and drawings.

Such objects are achieved in the present invention by an optical system for monitoring torsional vibration which has an optical unit including IRLED radiation sources aimed at grid lines applied around the circumference of the shaft. The scattering of the radiation is imaged through lenses and a matching Ronchi grid onto a photodiode which produces a periodic wave signal from which indications of rotational irregularities can be derived. In one embodiment, duplicate radiation sources and imaging apparatus are arranged in diametric opposition across the shaft to permit compensation for pitch and plunge shaft vibration. In another preferred embodiment, a second, duplicate optical unit is located at a distance along the shaft from the first unit. The output signals of the two units are passed through a comparator and a phase detector, then low-pass filtered to produce a signal indicative of torsional deflection. Quadrature techniques can be used to provide shaft directional information.

The system produces readings of torsional vibration and torsion, rotation rate, variations in rotation rate, and vertical pitch and plunge of the shaft. In addition, shaft power, torque, and torque fluctuation readings can be derived from the output of the sensors disclosed.

To facilitate the provision of matched pairs of grid lines at spaced locations on the shaft, a method and apparatus for precisely applying finely spaced grid lines to an existing shaft on site is disclosed. A photosensitive material is applied to the shaft, and a light source synchronized to the rotation of the shaft exposes the photosensitive material as the shaft is rotated to create freely spaced grid lines on the material. The method disclosed triggers the strobe light to form the lines based on output signals from the disclosed sensors which are aimed at a photographic film master or optical encoder attached about the circumference of the shaft.

Each set of lines may be applied to a surface of an object at an angle relative to movement between the optical sensor unit and the object. In a preferred shaft monitoring application, a plurality of optical units are provided, with a plurality of corresponding sets of parallel lines at different angles on the shaft. Signal output phase differences between the optical units are compared to precisely determine movement of the shaft in seven directions of freedom, including rigid body displacement components along three translational and three rotational axes, and shaft twist. The differentially angled sets of lines may be spaced axially along the shaft or other object, or a plurality of angled line sets may be superimposed in a single location as a set of cross-hatched lines.

BRIEF DESCRIPTION OF THE DRAWINGS

FIG. 3 is a schematic diagram of the electronic operating circuitry of the sensor unit of FIG. 2a;

FIG. 4b is a schematic diagram of an alternative phase detector circuit useful in the circuit of FIG. 4a;

FIG. 6b is an assembly drawing showing the construction of the light aperture used in the apparatus of FIG. 6a;

FIG. 7 is a detailed schematic diagram of the power supply shown in the apparatus of FIG. 6a;

FIG. 8 is a detailed schematic diagram showing the strobe control circuit of the apparatus of FIG. 6a;

FIGS. 11a and 11b are diagrams showing pitch and plunge motion of a shaft, respectively;

FIG. 25a is a side sectional view of a pair of clamping collars useful for removably attaching lines to a shaft, and FIG. 25b is an end view of the same clamping collar;

FIGS. 27a through 27g show a few of the many variations in sensor, line, and phase detector configurations possible using the principles of the invention;

DETAILED DESCRIPTION OF THE PREFERRED EMBODIMENTS

Figure 1:
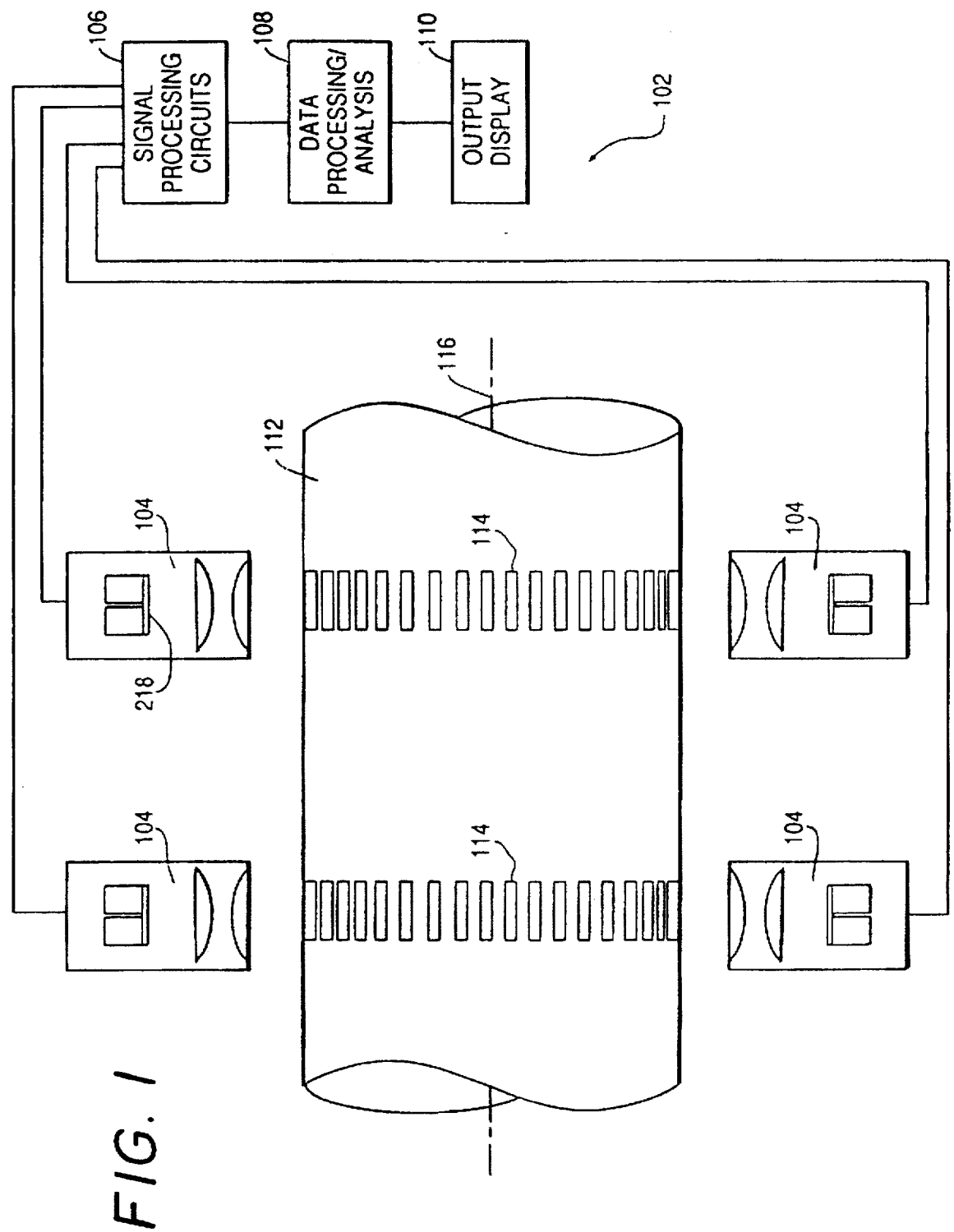
FIG. 1 is a block diagram showing the components of the system of the present invention installed for monitoring of a shaft.

In a first embodiment, the invention comprises a system including incoherent IRLED sources and a linear phase detector to resolve small angular differences between two sensors (shaft twist angles).

The system of the present invention will be described first in terms of one preferred embodiment, shown generally in FIG. 1. The shaft sensing and monitoring system of the invention is shown generally at 102. Shaft sensing and monitoring system 102 comprises one or more sensor units 104, which are operably connected to signal processing circuits 106. Signal processing circuits 106 are connected to data processing and analysis circuits 108 which has a connected output display 110. Sensor units 104 are mounted proximately to a shaft 112, the operation of which is to be monitored by system 102. Shaft 112 is provided with one or more sets of finely spaced lines 114 which are located about the circumference of shaft 112, parallel to each other and to a central longitudinal axis 116 of shaft 112. Preferably, there are 5 to 10 lines 114 per millimeter on the surface of shaft 112. In the embodiment shown in FIG. 1, two identical sets of lines 114 are provided on shaft 112, separated by a distance along central longitudinal axis 116, which is the axis of rotation of the shaft 112. The distance along the length of shaft 112 between sets of lines 114 is preferably determined by the expected torsional twist of the shaft, so that the expected twist between the axially separated locations corresponds approximately to one line spacing. A pair of diametrically opposed sensor units 104 are provided proximate to each set of lines 114, and sensor units 104 operate to sense the passage of lines 114 passed sensor units 104 as shaft 112 rotates about axis 116. The invention attains better resolution by using this four point system to compensate for non-torsional vibrations. The use of four sensor units 104 permits compensation for pitch and plunge of the shaft (as illustrated in FIGS. 11a and 11b) at the measurement location. Although pitch and plunge is not significant with less accurate prior art systems designed for use with small shafts, on a shaft four feet in diameter a vertical vibration of only 0.001" produces an apparent angular rotation of more than 8 arc-seconds. With sets of detectors on both sides of the shaft, vertical displacement (plunge, as shown in FIG. 11b) or tilt (pitch, as shown in FIG. 11a) can be compensated. These also can be used to produce precise (<<0.001") time-resolved measurements of both pitch and plunge of the shaft (due e.g. to bending modes, shaft runout, or worn bearings).

Referring again to FIG. 1, preferably, sensor units 104 are permanently installed in the engine room of an oceangoing vessel or other mode of transportation, or in an industrial setting such as a power plant. However, it is an important advantage of the invention that the sensor units 104 can be constructed to be air or water-tight and operate effectively in hostile environments, such as underwater. For underwater systems, the lines 114 may be added to the shaft via a lined tape attached to the shaft with an adhesive (hydrobond) which can be applied even underwater. Alternatively, a small, secondary (idler) roller could be used in contact with the shaft. The shaft of the idler roller and sensor units 104 would be placed in a watertight housing. The shaft angle would be amplified by the diameter ratio and light transmission through murky water and fouled parts thereby avoided. However, any such mechanical coupling is expected to substantially degrade the angular resolution of the system, and therefore direct reading of lines 114 on shaft 112 is preferred, if not prevented by ambient conditions.

As will be explained in more detail later, it is also possible to provide only one sensor unit 104 and one set of lines 114, or to provide two diametrically opposed sensor units 104 and a single set of lines 114, or to provide two sets of lines 114 and only one sensor unit 104 for each set of lines. These alternative configurations are less preferred because in each case the types of analysis of operation of shaft 112 that can be performed are limited in comparison to the analysis possible using the embodiment of FIG. 1. However, as will be explained in more detail later, in circumstances where only a limited level of monitoring is required, a variety of alternative configurations may be selected to effect a cost savings.

Those skilled in the art will recognize that measurements of linear position, speed and relative displacements such as strain can also be obtained in linear systems using the methods and apparatus disclosed herein. For application to linear systems, instead of being attached to a moving shaft, either the lines or the optical heads are attached to a linearly moving member and linear position, speed, and plane strain measurements may be obtained. Instead of line sets being axially spaced, they are planarly spaced to obtain comparative strain and displacement measurements.

Signal processing circuits 106 process periodic wave signals produced by sensor units 104 to produce phase difference and line count information used to determine shaft speed, shaft twist, and instantaneous torsional strain information used by the data processing and analysis circuits 108. Signal processing circuits 106 are preferably designed in accordance with FIGS. 4a, 4b, and 19–21 and the text accompanying those Figures. Data processing and analysis circuits 108 preferably take the form of a computer having input ports for receiving digital data from counters and digital data representations of analog levels produced by connected analog-to-digital converters. The computer of data processing and analysis circuits 108 is further provided with operating software for analyzing and reporting shaft status according to the description herein. A standard computer such as an IBM-compatible personal computer may be used, or a microprocessor system could be designed to perform the desired functions using a program in read only memory. Output ports of the computer are connected to an output display 110 which may comprise a display screen, printer, analog gages, numeric displays, an audible alarm, or any other desired indicator. Further, the computer may be used to control the engine, power plant, etc. according to shaft status and other input data, or may be connected to transmit data indicating the status of the shaft to another computer system which performs such control functions.

Sensor units 104 each act as a means for providing a radiation energy source and detecting the scattering of the radiation energy caused by the lines 114 passing in front of sensor units 104 as the shaft 112 rotates. The scattered light at each location is detected using Ronchi grid masks and PIN photodiodes. The Ronchi grid permits large areas of detection, allowing spatial averaging of irregularities in the line spacing. It also permits collection of much more light without sacrificing resolution or frequency response. Sensor units 104 are capable of detecting the instantaneous movement of the shaft 112 to a resolution far smaller than the spacing of lines 114. Specifically, a linear phase detector, described in more detail below, measures the lag which occurs between lines at one axial location relative to the other. The phase detector design permits resolution of small fractions of the line spacing.

Figure 2A:
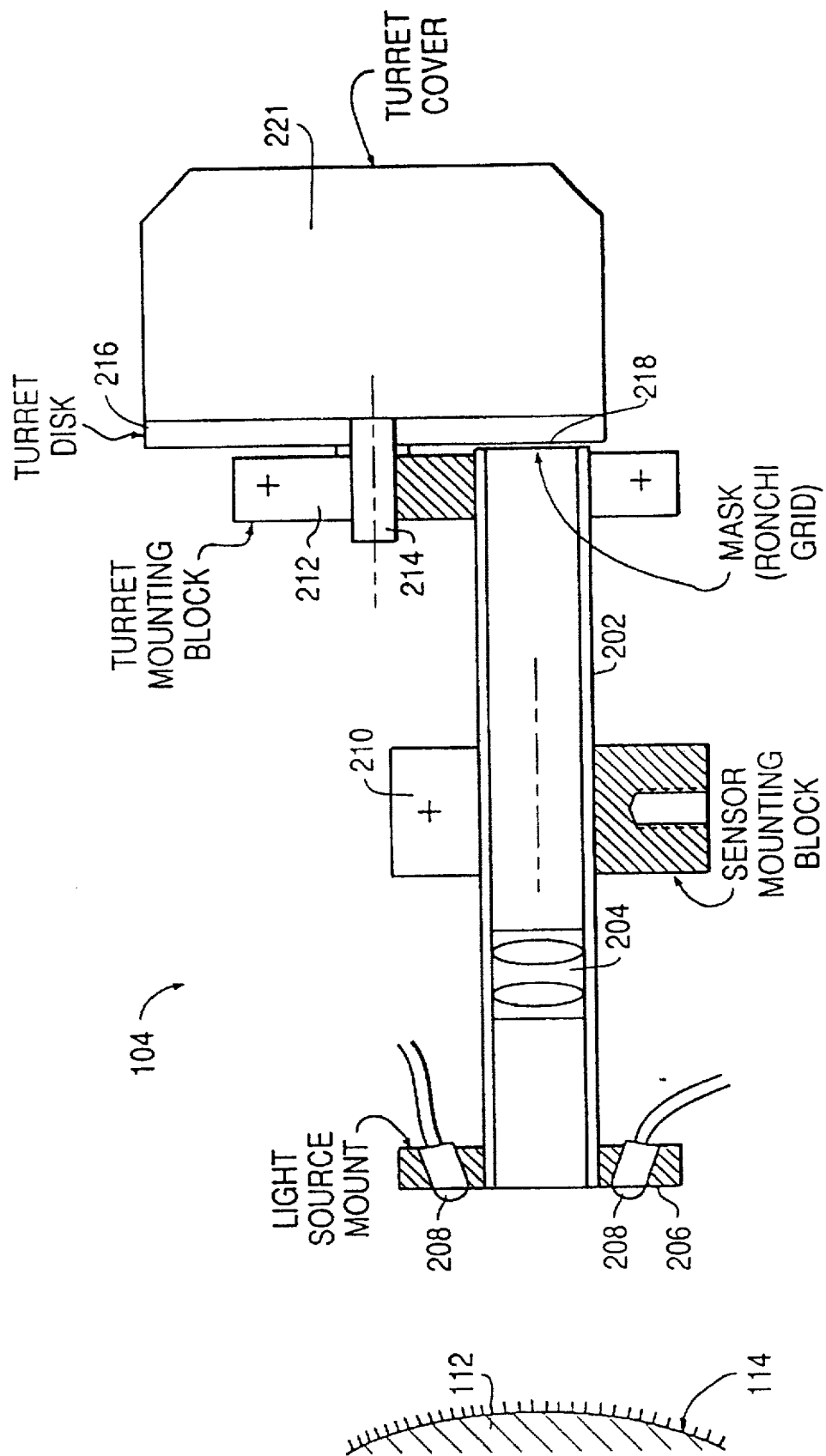
FIG. 2a is a sectional elevation of the sensor unit according to the present invention.

FIG. 2a shows the mechanical components of sensor unit 104. As shown in FIG. 2a, sensor unit 104 comprises tube 202, lenses 204, light source mount 206, IRLEDs 208, sensor mounting block 210, turret mounting block 212, turret pin 214, turret disk 216, Ronchi grid mask 218, and turret cover 221.

Tube 202 may be approximately 0.625 inches in inside diameter, and is open at one end proximate to shaft 112. Light source mount 206 is attached to tube 202 near the open end, and holds two IRLEDs 208 so that when activated their infrared radiation impinges on shaft 112 in the region of the open end of tube 202.

IRLEDs 208 are preferred as a radiation energy source because they have a good spectral match with photodetectors and have been found to be superior in mean time before failure (MTBF) and tolerance to shock loads in the context of the inventive apparatus. IRLEDs are also less expensive than any laser, and may actually provide higher resolution than a laser in the present incoherent detection application.

Lenses 204 are mounted in tube 202 and act to focus an actual size image of lines 114 onto Ronchi grid mask 218, which is located at the end of tube 202 distant from shaft 112. Tube 202 is fixed in position relative to shaft 112 by sensor mounting block 210. Sensor mounting block 210 may be a block of material drilled to receive tube 202 and cut along the plane passing through the central longitudinal axis of tube 202 to form two parts which may be selectively fastened together about tube 202 to clamp tube 202 in a fixed position. In other embodiments, sensor mounting block 210 may be formed as a piece of relatively flexible material with a circular hole and a single radial slot. In this embodiment, fasteners are provided for clamping the sensor mounting block 210 in the region of the radial slot to effectively reduce the diameter of the circular hole, effecting a clamping of the tube 202. The sensor mounting block 210 may also utilize a circumferential clamping mechanism if desired, such as those well known for use in clamping hoses and pipes.

Sensor mounting block 210 is also provided with means for attaching it to a fixed structure in the area of shaft 112 so that tube 202 is held in a relatively fixed location with respect to shaft 112.

Turret mounting block 212 is attached to the outside of tube 202 at its end distant to shaft 112 and holds pin 214 in spaced relationship with tube 202 such that the central longitudinal axis of pin 214 is parallel to the central longitudinal axis of tube 202. Turret disk 216 is rotatably mounted on pin 214. Turret disk 216 is provided with a turret cover 221 for covering components attached to turret disk 216.

Figure 2B:
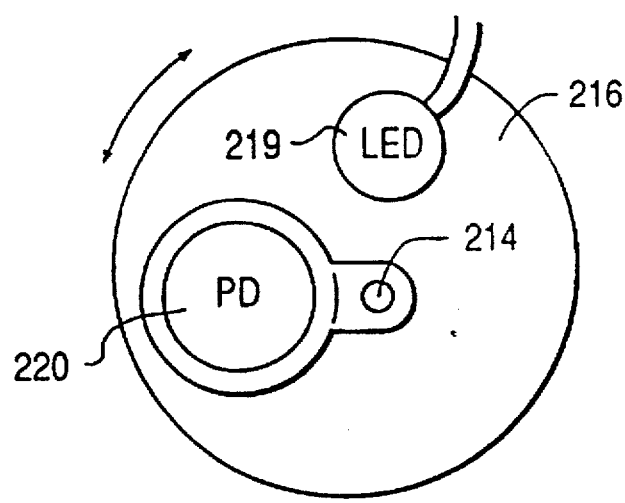
FIG. 2b is an end view, relative to FIG. 2a, of the turret disk shown therein.

Referring now to FIG. 2b, turret disk 216 is shown in more detail. Mounted on turret disk 216 are LED 219 and photodiode 220. LED 219 and photodiode 220 are mounted about the periphery of turret disk 216 such that either may be rotated into alignment with the end of tube 202. Preferably a locking mechanism or detent is provided to selectively hold turret disk 216 in position so that LED 219 is aligned with tube 202, and alternatively to selectively hold turret disk 216 in position so that photodiode 220 is aligned with tube 202.

The novel turret mechanism provided in sensor unit 104 facilitates ready positioning and alignment of sensor unit 104 relative to shaft 112. For proper operation of sensor unit 104, it is necessary that the lines of Ronchi grid mask 218 be parallel to the imaged lines 114. It is also necessary that the image of lines 114 produced at Ronchi grid mask 218 through lenses 204 be an actual size image, corresponding precisely to the lines of the Ronchi grid mask 218. To perform the required alignment, a user can rotate turret disk 216 so that LED 219 is aligned with the end of tube 202. LED 219 is then activated, projecting an image of Ronchi grid mask 218 through lenses 204 and onto lines 114 on shaft 112. Sensor mounting block 210 is then loosened to permit rotation of tube 202 therein and also to permit linear movement of tube 202 along its central longitudinal axis relative to sensor mounting block 210. By linearly moving tube 202 and rotating this tube as necessary, parallel alignment of the Ronchi grid mask 218 and lines 114 can be obtained, and proper focusing of the image can be obtained, by examining the projected image of Ronchi grid mask 218 relative to lines 114. Then, sensor mounting block 210 is tightened to lock tube 202 in place, and turret disk 216 is rotated so that photodiode 220 is aligned with tube 202. As a result, sensor unit 104 is properly aligned, focused and positioned and is ready for sensing the passage of lines 114 on the surface of shaft 112. As a result of the turret disk and sensor mounting block design, sensor unit 104 is particularly easy to adjust in preparation for shaft monitoring operations.

Figure 2C:
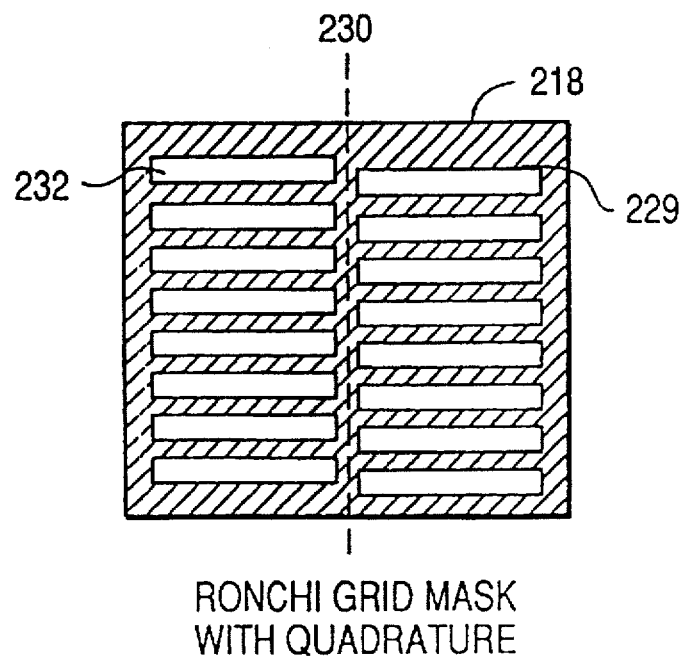
FIG. 2c is a view of the Ronchi grid mask which is configured to provide quadrature output according to the invention.

If it is desired to determine the rotational direction of shaft 112 using the inventive system, tube 202 is made slightly larger and two photodiodes 220 are provided, aligned so that one photodiode 220 senses the lines 114 through one side of Ronchi grid mask 218 and so that the other photodiode 220 senses the lines 114 through the other half of the Ronchi grid mask 218. In this case, Ronchi grid mask 218 is constructed according to the diagram of FIG. 2c, with lines 229 spaced according to the imaged spacing of lines 114. On one side of a central bisecting line 230, lines 232 are offset from the lines 229 on the other side of the central bisecting line 230 by ¼ of the spacing distance of the lines 229, so that the two photodiodes 220 sensing the passage of lines 114 through the Ronchi grid mask 218 produce output signals in phase quadrature with one another. The quadrature relationship of two such signals can be used to determine the direction of rotation of the shaft 112 according to the method which will be described in detail later.

Figure 3:
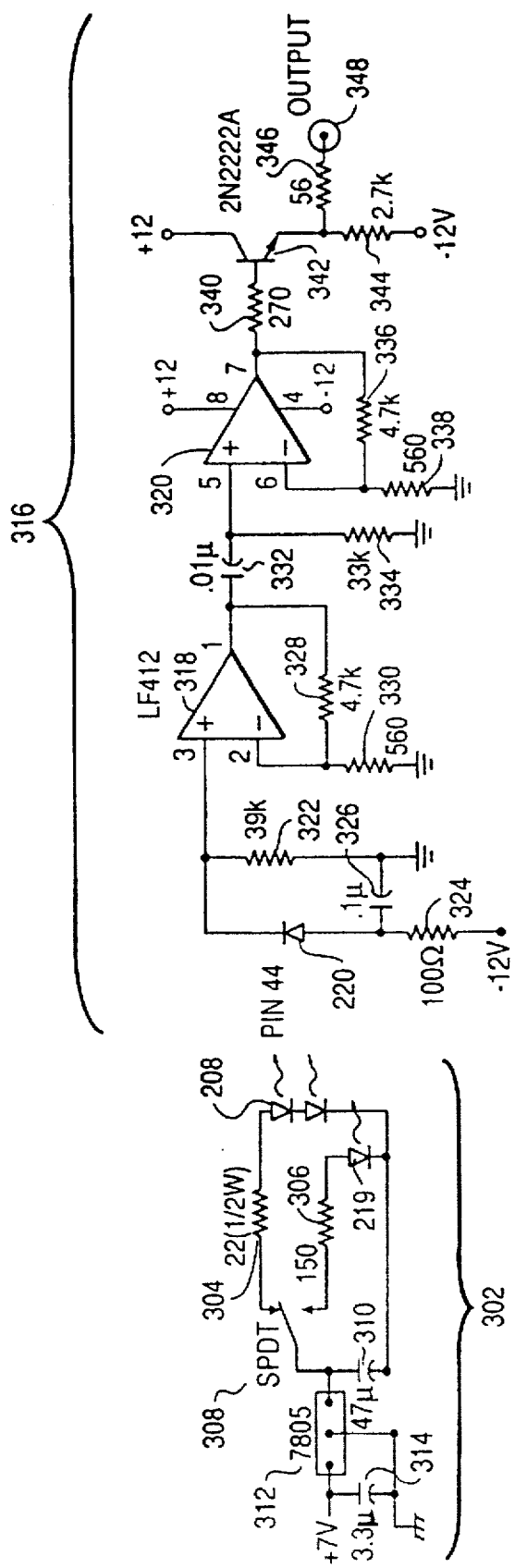

Referring now to FIG. 3, the electronic circuitry of sensor unit 104 is shown in schematic form. Power to LEDs 208 and 219 is provided by LED power circuit 302, which comprises LEDs 208 and 219, 22 ohm resistor 304, 150 ohm resistor 306, single-pole double-throw switch 308, 47 microfarad capacitor 310, 5 volt DC voltage regulator 312, and 3.3 microfarad capacitor 314. Voltage regulator 312, which may be a 7805-type integrated circuit voltage regulator, is connected between a 7 volt DC power source and ground. Capacitor 314 is connected between the 7 volt input to voltage regulator 312 and ground. Capacitor 310 is connected between the 5 volt regulated DC output of voltage regulator 312 and ground. The common terminal of switch 308 is connected to the 5 volt DC regulated output of voltage regulator 312, and one of the switching terminals of switch 308 is connected through resistor 304 to IRLEDs 208 in series, and then to ground. The other switching terminal of switch 308 is connected through resistor 306 and focusing LED 219 to ground. Thus, switch 308 operates to selectively actuate either IRLEDs 208 or focusing LED 219, providing the selected light emitting device with a constant regulated voltage supply to maintain a consistent illumination level. IRLEDs 208 may preferably be Honeywell Model No. SEP 8703-001 90 milliamp IRLEDs, while LED 219 is preferably a visible light range, super bright LED in accordance with its alignment and focusing use.

Sensor circuit 316, shown on the right hand side of FIG. 3, comprises photodiode 220 and a high pass filter circuit designed to pass frequencies greater than 482 Hz. Photodiode 220 may be a PIN photodiode such as a Model No. PIN 44D photodiode manufactured by United Detector Technology, Division of ILC Technology, 12525 Chadron Avenue, Hawthorne, Calif. 90250. The preferred photodiode 220 has a relatively large area such as 0.26 inches by 0.26 inches, and can therefore accommodate a Ronchi grid mask 218 with a relatively large number of lines, such as 32 lines. A larger area photodiode of this type produces better signal characteristics in the inventive application. PIN photodiodes are preferred for their relatively fast signal response.

The high pass filter of circuit 316 is preferably implemented using two operational amplifiers 318 and 320 which are preferably provided as a single integrated circuit such as Model No. LF 412 manufactured by National Semiconductor. The LF 412 integrated circuit is provided in a dual in-line pin package, the pin connections for which are shown in the drawing figure.

A power source of −12 volts DC is connected through 100 ohm resistor 324 to the anode of photodiode 220. The cathode of photodiode 220 is connected to the positive input of operational amplifier 318. The cathode of photodiode 220 is also connected through a 39K ohm resistor 322 to ground. The anode of photodiode 220 is connected through a 0.1 microfarad capacitor 326 to ground. The output of operational amplifier 318 is connected through a 4.7K ohm resistor 328 to the negative input of operational amplifier 318, which is also connected through 560 ohm resistor 330 to ground. The output of operational amplifier 318 is connected through a 0.01 microfarad capacitor 332 to the positive input of operational amplifier 320, which is connected through 33K ohm resistor 334 to ground. Operational amplifiers 318 and 320 are provided with +12 volt DC and −12 volt DC power inputs. In the case of the LF 412 integrated circuit, +12 volts DC is provided at pin 8 and −12 volt DC is provided at pin 4 to power both operational amplifier 318 and operational amplifier 320. The output of operational amplifier 320 (pin 7 of the LF 412) is connected through 4.7K ohm resistor 336 to the negative input of operational amplifier 320, which is also connected through 560 ohm resistor 338 to ground. The output of operational amplifier 320 is further connected through 270 ohm resistor 340 to the base of a transistor 342. Transistor 342 provides increased output driving capability for circuit 316. Transistor 342 may be a 2N2222A NPN transistor manufactured by SGS Thomson or others. The collector of transistor 342 is connected to a +12 volt DC source, and the emitter of transistor 342 is connected through 2.7K ohm resistor 344 to a −12 volt DC source, and also through 56 ohm resistor 346 to an output terminal.

When mounted in the apparatus shown in FIGS. 1 and 2 as described previously, the circuit of FIG. 3 produces an output at output terminal 348 in the form of a periodic wave peaking with the passage of each line 114 on shaft 112 past sensor unit 104. As the shaft 112 turns, the grid of lines 114 is displaced. Lines 114 are imaged in the plane of matching Ronchi grid 118, located in front of the photodiode 220. The signal from the photodiode 220 is a triangle wave with a fundamental frequency $$f_t = \frac{\pi D \Omega}{60 d} \qquad \text{(Eq. 1)}$$

where $f_t$ is in Hz, D is the shaft diameter, $\Omega$ is the angular velocity in revolutions per minute (RPM), and d is the line spacing preferably 0.008 inches/line. The duplicate sensor unit 104 located a distance L along the shaft produces an output with the same frequency as the first sensor unit 104, but a different phase.

If shaft directional information is desired, the circuit shown in FIG. 3 is duplicated so that two photodiodes 220 and associated circuits 316 are provided. The output terminals 348 of these circuits are substantially identical, but have a 90 degree phase offset due to the quadrature relationship of the Ronchi grid lines in front of the two photodiodes 220. The sign of this phase difference (either leading or lagging) indicates the direction of rotation of shaft 112.

Figure 4A:
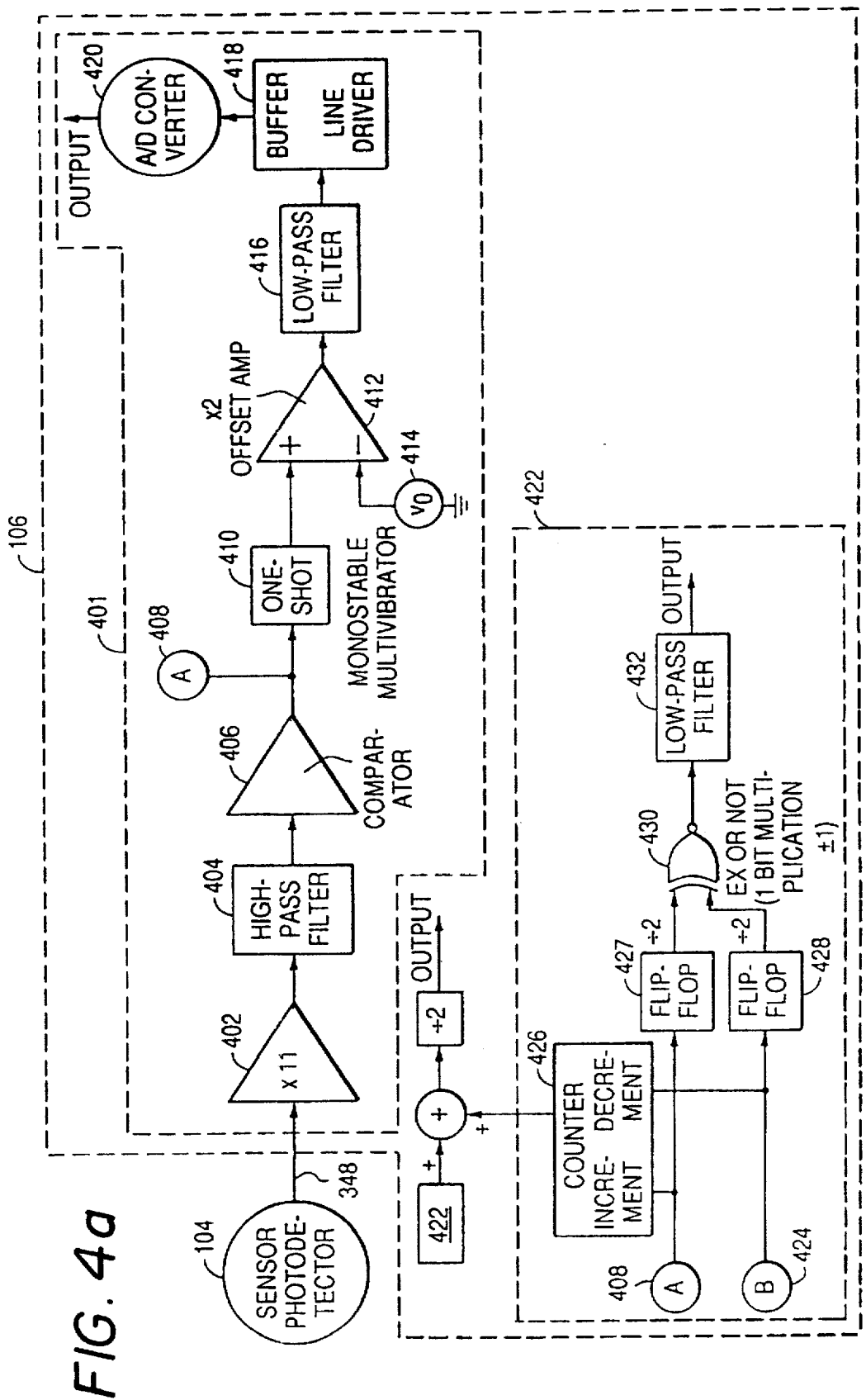
FIG. 4a is a block schematic diagram of an analysis circuit according to the invention.

FIG. 4a shows the signal processing circuits 106 (first shown in FIG. 1) in greater detail. Referring now to FIG. 4a, the output terminal 348 of sensor unit 104 is connected to the input of a signal processing circuit 401. Signal processing circuit 401 comprises amplifier 402, high pass filter 404, comparator 406, terminal 408, monostable multivibrator 410, offset amplifier 412, reference voltage generator 414, low pass filter 416, buffer and line driver 418, and analog-to-digital converter 420. A single circuit 401 is shown in the drawing figure, but those skilled in the art will appreciate that it is desirable to provide a circuit 401 for each sensor unit 104 of system 102.

Amplifier 402 provides an 11X amplification of the triangular wave output signal of sensor unit 104. Next, the signal is high-pass filtered by high pass filter 404 with $F_c = 1$ KHz. Preferably, high pass filter 404 is a fourth order Sallen and Key filter. The resulting signal is then passed through comparator 406 to produce a square-wave signal which rises and falls each time a line 114 passes by sensor unit 104. This output signal of comparator 406 is useful for controlling other parts of the circuit as will be described in greater detail later. Therefore, terminal 408 is provided for connecting other parts of the circuit to receive this signal.

To produce a digital signal representing the speed of shaft 112, the signal of terminal 408 is connected to monostable multivibrator 410. The output of monostable multivibrator 410 is connected to the positive input of an offset amplifier 412 with a gain of 2. A reference voltage $V_0$ is provided to the negative input of offset amplifier 412 by reference voltage generator 414. The output of offset amplifier 412 is provided to low pass filter 416, which is preferably an eighth order Bessel filter with $F_c$ variable from 2.25 to 60 KHz. The output of low pass filter 416 is provided to a buffer and line driver 418. buffer and line driver 418 converts the output signal of low pass filter 416 to a signal appropriate for input to analog-to-digital converter 420. The output of buffer and line driver 418 is a voltage proportional to shaft speed. Analog-to-digital converter 420 is connected to an input port of data processing and analysis circuits 108.

Circuit 422 shown in FIG. 4a further processes signals from sensor units 104 to provide information indicating torsional deformation of the shaft being monitored. The inputs of circuits 422 are terminals 408 (corresponding to the output of comparator 406 of circuit 401) and terminal 424, which corresponds to the same output of comparator 406 of a circuit 401 connected to another sensor unit 104 at a different axial location from the sensor unit 104 providing the signal at terminal 408. The signals provided at terminals 408 and 424 are applied to the increment and decrement control terminals respectively of counter 426. As a result, counter 426 provides a count output indicating the instantaneous torsional strain on the shaft. When there is no strain on the shaft, the same number of lines 114 will have passed by the sensor units 104 providing the signals to terminals 408 and 424 at any given time. The existence of torsional strain, or twist, in the shaft between the axially separated locations of the sensor units 104 providing the signals to terminals 408 and 424 causes the passage of a greater number of lines 114 (or fractions of lines) past one of the sensor units 104. As a result, counter 426 produces an output which is the integer function of the circumferential twist of the shaft, measured in units of the spacing between lines 114. Because the spacing of lines 114 and the diameter of the shaft are known, those skilled in the art will appreciate that this twist measurement can be converted to an angular measurement of shaft torsional strain.

In the embodiment of the invention which uses four sensor units 104, the sensor unit located diametrically opposite to the unit providing the signal to terminal 408 and the sensor unit 104 diametrically opposite to the sensor unit 104 providing the signal to terminal 424 are connected to a duplicate circuit 422. The sensor units 104 connected to the duplicate circuit 422 are connected to the increment and decrement inputs of counter 426 of duplicate circuit 422 in the same manner as the other sensor units 104 located respectively at the same axial locations on shaft 112. Thus, in the absence of any non-rotational movement of shaft 112, the counters 426 of the two identical circuits 422 produce the same output. An important feature of the invention lies in the ability to compensate for non-rotational movement of shaft 112. The outputs of counters 426, which are connected respectively to two sensor units 104 on a first side of the shaft and to two sensor units 104 on a second side of the shaft, are added together digitally and divided by two in the computer of data processing and analysis circuit 108. Because the sensors connected to the two counters 426 are diametrically opposed, other movements of the shaft (such as vertical movement) increases the number of lines passing the sensors on one side of the shaft in a time period and decrease the number of lines passing the sensors on the other side of the shaft. By adding the line counts together, the effects of vertical motion are eliminated and an accurate count of the number of lines of torsional deformation is provided.

The circuit 422 also makes it possible to resolve the amount of torsional deformation more precisely than can be attained by merely counting lines. To accomplish this, the phase difference between the signals from sensor units 104 at axially spaced locations are measured. The phase difference indicates the fraction of the line spacing that must be added to the count of full line spacings to arrive at an accurate measurement of the circumferential torsional deformation of the shaft. To accomplish this, terminals 408 and 424 are connected respectively to flip-flops 427 and 428 which have the effect of dividing the incoming pulse trains by two. This division guarantees top to bottom symmetry of the signals. A one-bit multiplication operation is then performed on the output signals of flip-flops 427 and 428 by exclusive NOR gate 430. The use of an exclusive NOR gate for the 1 bit multiplication operation provides less sensitivity to "pedestal" and an output duty cycle spanning 0 and 1.

Other appropriate phase detectors may be used in place of the exclusive NOR gate. In one embodiment, a phase detector can be constructed using flip flops.

The output of the X-NOR is low-pass filtered to remove energy at $2f_o$ (and higher frequencies). The output is linear for a phase shift of $<½$ cycle, but is multiple valued for larger angles. This is accomplished in the embodiment shown by transmitting the output of gate 430 through low pass filter 432 to produce a voltage proportional to the phase difference between the axially separated sensor unit 104 outputs. This voltage is provided, through an analog-to-digital converter (not shown), to the computer of data processing and analysis circuits 108 and is then added to the counter 426 output in the manner described previously in order to calculate the total lines and fraction of torsional deformation. If desired, this voltage output of low pass filter 432 may be added to the corresponding voltage output of the circuit 422 connected to sensor units 104 on the opposite side of shaft 112, and the resulting total may then be divided by two to produce an indication of phase difference which cancels the effects of nonrotational shaft motion as described previously with respect to the output of counters 426.

If absolute deflection measurements, or the sign of the oscillating deflection, are required, it is necessary to count half cycles rather than merely counting lines. The ambiguity in the sign of the phase shift at $nT/2$ can be resolved by a quadrature technique as described previously.

After compensation for pitch and plunge, remaining limitations to the resolution of the twist angle by the circuit of FIG. 4a are vibration of the optics in sensor unit 104, optical and electronic noise, variation in the line spacing of the lines 114 applied to the shaft 112, misalignment of the matching Ronchi grid 118 with the shaft lines 114, and accumulation of particles on the lines 114. In the underwater case, accumulation of particles may occur faster, and hydrodynamic loads on the optics housing can affect alignment and produce vibration of the housing.

The limitations to frequency response are photodiode/ electronics response, and grid passing frequency. An example of grid passing frequency, corresponding to a 4 ft. diameter propeller shaft at 50 RPM, produces a grid passing frequency of 16 KHz. The fundamental of the phase-detector is twice this frequency. An adaptive low-pass filter set two octaves below the fundamental frequency limits the response to approximately 4 KHz for this case. Response for other cases is proportional to the surface velocity of the shaft.

After the phase data is converted to vibration amplitude and the signal is impedance matched, it can be transmitted to any remote on-board location by coaxial cable, shielded twisted pair, or optical fibers. A centrally located computer (e.g. in a ship's bridge, a control room, or a monitoring station) can sample the data and produce real-time output.

If unambiguous indication of the direction of shaft rotation is desired, and at least one sensor unit 104 has been provided with quadrature-related multiple sensors as described previously, the quadrature-related output signals of this unit are fed to a phase detector circuit (not shown), which produces as an output an indication of which of the two input signals leads the other by 90 degrees. This indication is provided as an input to data processing and analysis circuit 108. Data processing and analysis circuit 108 can determine the rotational direction of shaft 112 based on this input.

As noted previously, alternate embodiments of the invention may include a single sensor unit 104, with or without a quadrature sensor. If a single sensor unit 104 is provided, circuit 422 is not provided. The available outputs of the system is then limited to rotation rate, direction, variation in rotation rate, and shaft rotational position. If these outputs are the only outputs desired, this embodiment will be desirable since it eliminates the need for additional sensor units 104 and portions of signal processing circuits 106.

Another alternate embodiment of the invention provides two sensor units 104 which are axially separated along shaft 112. This embodiment permits measurement of torsional vibration, torsion, rotation rate, variation in rotation rate, shaft power, torque, shaft rotational position, and torque fluctuations. However, this embodiment lacks the capability of compensating for non-rotational pitch and plunge of the shaft. Therefore, this embodiment is appropriate for installations where pitch and plunge of the shaft are not expected to be a problem or where there are lower accuracy requirements for system outputs. In this embodiment, signal processing circuits 106 are provided as shown in FIG. 4a. However, the duplicate circuit 422 described with respect to the embodiment having four sensor units 104 may not be provided, and the output of counter 426 may not be added to another counter output and divided by two as described in the four-sensor embodiment.

The invention contemplates a wide variety of combinations of optical heads and phase processors, depending on the type of measurements required, as will be apparent to those skilled in the art upon reviewing the examples and description in the specification. Nonlimiting examples of possible configurations, shown in FIGS. 27a through 27g, include:

a) 1 head, 1 set of lines for measuring rotational position and speed, (ac and dc speed).

b) 2 heads, 1 phase processor, and 2 sets of lines for measuring torsional strain (ac and dc) plus the measurements of a). Two head systems are sensitive to out-of-plane vibrations. This can be seen from the equation for the phase signal, which is $$V_{phase}=C(2\pi/d)[r(\theta_1-\theta_2)+(w_1-w_2)] \qquad \text{(Eq. 2)}$$

where d is the line spacing, r is the shaft radius, $\theta_1$ and $\theta_2$ are the rotational positions at axial stations 1 and 2, respectively, $w_1$ and $w_2$ are the displacements of the shaft centerline at stations 1 and 2 in a direction normal to the plane of the optical heads, and C is a dimensionless constant. $w_1-w_2$ is seen to be a rotation about an axis normal to the shaft. Usually, this difference of lateral displacements is insignificant. But if it is significant, the linearity of the sensors makes it easy to decouple the motion, see case c).

c) 4 heads, 2 phase processors, and 2 sets of lines for measuring lateral displacements (both pitch and plunge) plus the measurements of a). Using four heads produces a signal given by Equation 2 and $$V'_{phase}=C(2\pi/d)[r(\theta_1-\theta_2)-(w_1-w_2)] \qquad \text{(Eq. 3)}$$

with the same constant C. The difference between these phase signals is:

$$V_{phase}-V'_{phase}=C(4\pi r/d)(\theta_1-\theta_2) \qquad \text{(Eq. 4)}$$

independent of all shaft displacements except torsional strain. The equation is easily reversed to find ($\theta_1-\theta_2$) from the phase signals. Thus, a four head system permits compensation for out-of-plane vibrations.

d) 2 heads, 1 phase processor, and 1 sets of lines for measuring lateral displacement in one direction (x or y) plus measurements of a). Adding Equations 2 and 3 produces a signal for the rotation of the shaft about an axis normal to the shaft in the plane of the heads. But it is even simpler to use just two heads on opposite sides of the shaft and one strip of lines to measure out-of-plane displacements, w:

$$V_{phase}=C(4\pi/d)w+C' \qquad \text{(Eq. 5)}$$

e) 2 heads, 1 phase processor, and 2 sets of lines (or one set of overlapping lines at two different angles, ref. FIG. 12c) for measuring axial displacement of the shaft plus measurements of a). Axial motion can be measured opposite non-zero of lines at equal but opposite non-zero angles, α, with respect to the shaft axis. Two optical heads on the same side of the shaft detecting two such matched sets of lines produce a phase signal:

$$V_{phase}=C_1(2\pi/d)[r(\theta_1-\theta_2)\cos\alpha+2x\sin\alpha]+C_2 \qquad \text{(Eq. 6)}$$

where x is the axial shaft displacement and subscripts 1 and 2 indicate axial stations 1 and 2, respectively. The first term depends on torsional strain; the second term is due to axial displacement.

f) 4 heads, 2 phase processors, and 4 sets of lines for measuring torsional and axial strains (both ac and dc) plus the measurements of a).

g) 4 heads, 3 phase processors, and 4 sets of lines for measuring torsional and axial strain and axial displacement (ac and dc) plus the measurements of a). The three phase processors are arranged so that the phase difference between heads 1 and 2 determines axial position, and the phase differences between heads 1 and 3 and 2 and 4 respectively are combined to determine axial and torsional strain.

Additional configurations not shown in FIG. 27 include:

h) 2 heads, 1 phase processor, 2 sets of lines (or 1 overlapping set of lines at two different angles) for measuring axial displacement of the shaft plus the measurements of a).

i) 4 heads, 2 phase processors, and 1 set of cross-hatched lines for measuring lateral displacements in both directions (x and y) plus the measurements of a).

j) 6 heads, 3 phase processors, and 2 sets of lines for measuring shaft position (x, y, & z) plus the measurements of a).

k) 7 heads, 5 phase processors, and 4 sets of lines for measuring shaft position (x, y, & z) and torsional and axial strains plus the measurements of a). Example (k) combines examples g) and j), eliminating redundant head and rings.

Three head, five-head and other four head and six head systems can also be produced according to the principles of the invention. Also, any of these configurations can be used in combination on multiple shafts linked directly or indirectly (mechanical, fluid or electronic for example). Shafts not linked at all may be considered for separate applications of systems. Combination systems can be used to measure the characteristics of linkages as well as the operational parameters listed above. For example, the transmission of gear sets or the flexing and slipping of flexible couplings can be monitored using the invention.

Figure 4B:
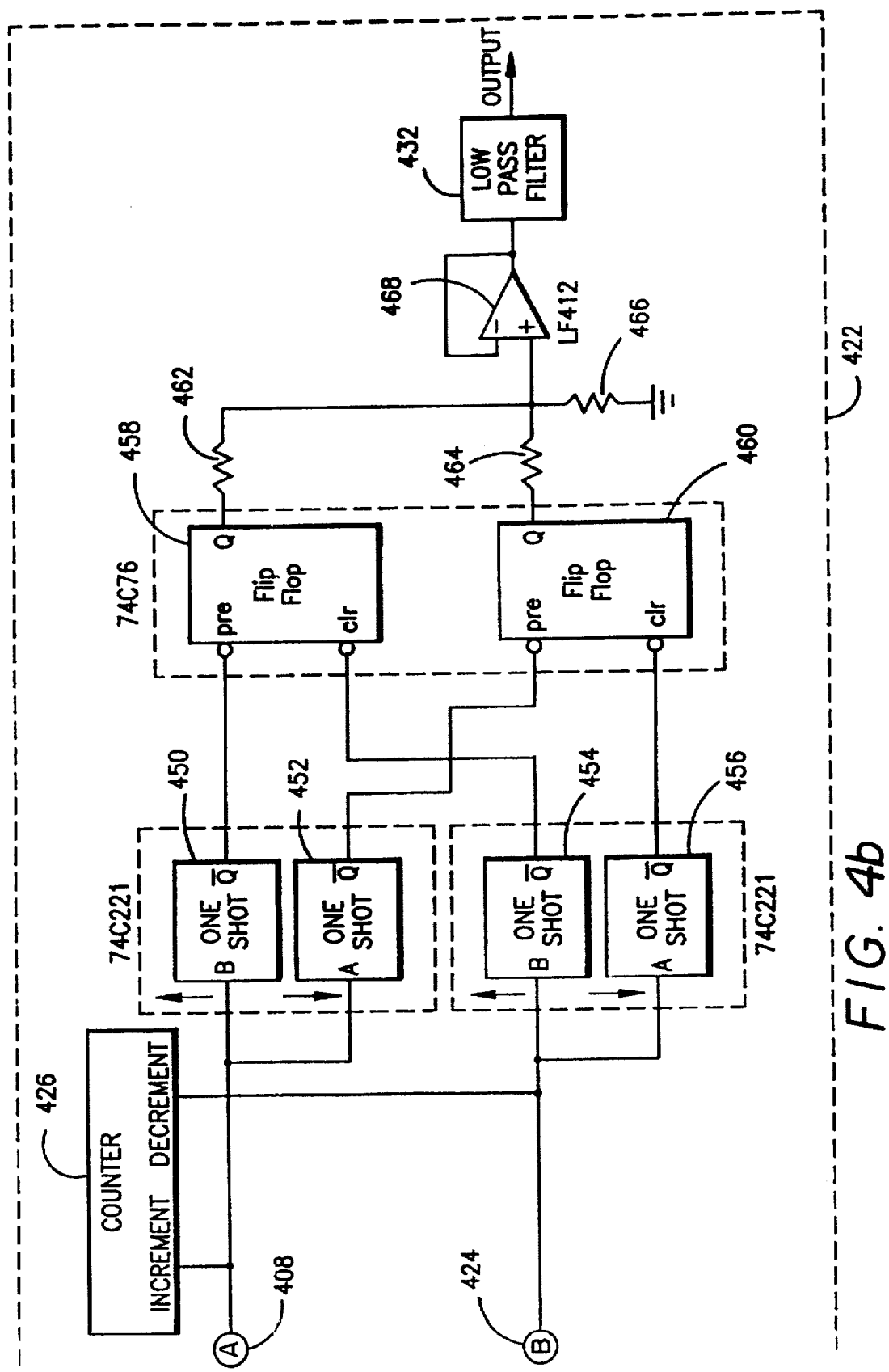

FIG. 4b is a schematic diagram of an improved alternative to the phase detection circuit 422 shown in FIG. 4a. In this alternative circuit, terminals 408 and 424, counter 426, and low pass filter 432 operate in the same manner disclosed previously in the description of FIG. 4a. Flip flops 427 and 428 and EX NOR gate 430 in the embodiment of FIG. 4a are replaced in this embodiment by four one shots 450, 452, 454, and 456, flip flops 458 and 460, resistors 462, 464, and 466, and operational amplifier 468.

Each pair of one shots 450 and 452, and 454 and 456, respectively, is preferably provided as a 74C221 integrated circuit. The flip flops 458 and 460 are provided as a 74C76 integrated circuit. One shots 450 and 454 are connected to terminals 408 and 424, respectively, and are responsive to the rising edge of the input signals received. One shots 452 and 456 are connected to terminals 408 and 424, respectively, and are responsive to the falling edge of the input signals received. The outputs of one shots 450 and 452 are connected to the preset terminals of flip flops 459 and 460, respectively. The outputs of one shots 454 and 456 are connected to the clear terminals of flip flops 458 and 460 respectively. The outputs of flip flops 458 and 460 are connected through resistors 462 and 464, respectively, to the positive input of operational amplifier 468. The positive input of operational amplifier 468 is connected to ground through resistor 466. The output of operational amplifier 468 is connected through low pass filter 432 to provide the output of circuit 422. Operational amplifier 468 is connected in a unity gain configuration.

With the connections shown, flip flop 458 is set by the rising edge of a pulse on terminal 408, and reset by the rising edge of a pulse on terminal 424. Similarly, flip flop 460 is set by the falling edge of a pulse on terminal 408, and reset by the falling edge of a pulse on terminal 424. The output duty cycle of the flip flops 458 and 460 is therefore a function of the phase difference between the signals on terminals 408 and 424. The output signals of the flip flops 458 and 460 are added through the voltage divider formed by resistors 462, 464, and 466. The summed signal is processed through operational amplifier 468 and low pass filter 432. Low pass filter 432 averages the duty cycle signals produced by the flip flops 458 and 460 to generate a voltage having a level proportional to the phase difference between the signals at terminals 408 and 424. The summation of both the rising edge and falling edge signals compensates for DC or very low frequency components of the photodetector output signal, thus reducing the sensitivity of the system to ambient light.

The computer of data processing and analysis circuit 108 (previously described with reference to FIG. 1) receives and stores the data inputs provided from signal processing circuits 106 and performs the necessary analysis of this data to produce the desired output indicators specifying, for example, rotational direction, rotational speed, torsional vibration, torsion, rotational position, and vertical pitch and plunge of the shaft. Preferably, the measured data is stored in memory or mass storage of the computer so that readings over an expanded time period can be reviewed. In particular, it is preferable that the computer be programmed to identify the discontinuity in the received signals which inherently occurs at the "seam" in the lines applied to the shaft. Then, readings are stored in groups as a sequence of readings in a single revolution of the shaft. Readings from the same position on the shaft, taken in different revolutions of the shaft, are then compared and analyzed using various techniques, if such a seam exists. If the lines are applied to the shaft without a seam in a manner to be disclosed in more detail later, alternative techniques may be used. One preferred technique is to determine the number of lines that have been written about the circumference of the shaft, and keep a count of lines passing the detector, resetting the count when it is equal to the number of lines about the shaft. The count determined in this manner precisely represents the rotational position of the shaft at all times. A synchronization line can also be written at a location on the shaft axially spaced from the lines 114, and an additional sensor provided to detect the passage of the synchronization line and generate a synchronization pulse when the line is detected. In a preferred embodiment, the synchronization line is provided on the shaft adjacent to a set of lines 114. A second sensor is built into sensor unit 104. The second sensor may have generally the same construction as sensor units 104 and is aimed at the region proximate to lines 114 to sense passage of the synchronization line. The output of this second sensor is provided as an input to the signal processing circuits 106 and data processing/analysis circuits 108. In this manner, the rotational position of the shaft can be determined and the angular position of the shaft can be recorded in conjunction with other data to permit identifying the position at which irregularities in shaft movement occur.

The synchronization line applied to the shaft may be very fine, such as 0.1 mm wide or less, if an extremely accurate determination of shaft position is desired. The synchronization line method can be advantageously combined with the counting method to permit accurate, synchronized determination of angular position. When the methods are combined, the synchronization pulse is used to establish the starting location for the count and to reset the count after each rotation.

Any desired statistical or actual representation of the recorded quantities may be provided as outputs. For example, the outputs may be provided in instantaneous form, in phase-averaged form, in time-averaged form, as maximum or minimum measurements, as a range occurring in a given time period, or a measure of statistical deviation may be provided. Those skilled in the art will appreciate that once this data is in the computer, numerous conventional methods of analysis may be applied to the data and outputs may be provided depending on the desired purpose of the monitoring. For example, in an oceangoing ship, shaft direction and rotational speed may be provided as instantaneously changing outputs to a display on the ship's bridge. Statistical measures or visual representations of torsional vibrations may be provided on a screen in the engine room for review and monitoring by an engineer. The computer may also be programmed to trigger an alarm or other indication if sudden changes in readings occur or readings occur which are outside a predetermined range of acceptable values. Acquired data may be processed using Wavelet transforms and other types of filters and used to produce Choi-Williams plots, bispectral plots and other data output. The data collected can also be used for real time control or processed by hard-wired systems rather than software. As another example, methods known in statistical process control can be used to identify significant deviations from normal conditions. Readings more than N standard deviations from the mean might be used to trigger an alarm. Also, Shewhart-type or Cumulative Sum control charts and statistical methods for identifying problems using these charts may be automatically generated.

To analyze torsional vibrations, phase averaging or waveform eduction techniques may be applied to a series of data from the sensors. In one particularly preferred technique, plural sets of torsional strain readings taken in different revolutions are provided and readings from the sets which were taken from the same point on the shaft are added together. This additive process tends to emphasize recurring increases or decreases in torsional strain occurring at a particular point on the shaft. When the addition is completed for numerous points around the shaft, a model is developed of recurring variations in torsional vibration. A graph of these variations is then produced and reviewed to identify possible problems with bearings, gears, or other power transmission elements connected with the shaft. Alternatively, the computer can be programmed to perform this analysis and to provide an output indication when any significant change in the pattern of torsional vibrations is detected.

As noted previously, very fine resolution of torsional strain measurements by the system of the invention requires that the axially spaced sets of lines 114 be precisely matched so that the sets of lines are as nearly identical as possible. Therefore, the inventors have developed a novel method and apparatus for providing the required lines on a shaft. The process and apparatus disclosed is suitable for use with any shaft, but is particularly advantageous for retrofitting existing shafts mounted in industrial installations, ocean-going vessels, or other modes of transportation with the required sets of finely spaced lines.

Figure 5:
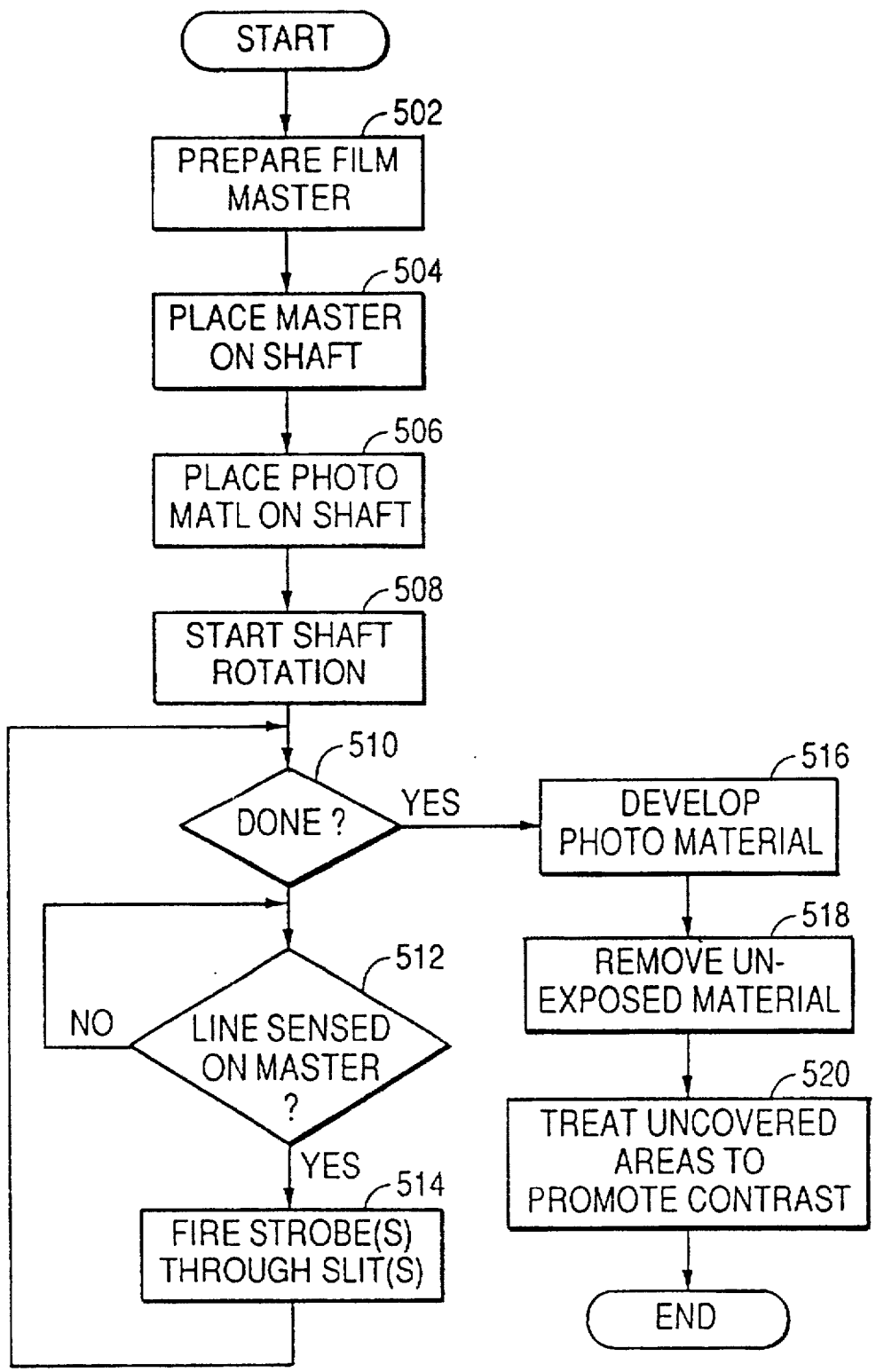
FIG. 5 is a flow chart showing steps in a novel process according to the invention for writing matched pairs of lines on a shaft.

One process for photographically applying finely spaced grid lines to a shaft is disclosed in the flow chart of FIG. 5. A photo-sensitive emulsion is applied to the surface of the shaft to allow lines with a spacing of from 5 to 10 lines/mm to be photo-optically imprinted on the shaft. Lines are preferably imprinted simultaneously in at least two axially spaced locations.

The first step in the process, shown at block 502, is the preparation of a film master. The film master is prepared using ordinary photographic film with high contrast, such as Kodak 5052 TMX film. Depending on the desired line spacing, different films may be used. The Kodak 5052 TMX film is suitable for line spacing on the order of 5 lines per millimeter. The grain and resolution of the film used should be finer for closer line spacing, and may be coarser for wider line spacing. The film master is prepared by exposing lines onto the film, spaced at the desired distance, and along a length of film at least equal to the circumference of the shaft which is the object of the process. As will be described in more detail later, the film may be exposed by a synchronized strobe light shining through a thin slit onto the film as it is moved past the slit at a uniform speed. Then the film is developed to produce the film master which controls the application of lines onto the shaft.

In the next step of the process, the prepared film master prepared in block 502 is placed on the shaft as shown in block 504. The film master is fastened around the circumference of the shaft, in a position axially spaced from the locations where lines are to be formed on the surface of the shaft. A sensor unit 104 according to the invention, and a least a portion of the signal processing circuits 106 as described previously, is placed proximate to the film master to detect the passage of the lines in the film master during rotation of the shaft.

Next, as shown in block 506, photosensitive material is placed on the shaft in the regions where lines are to be formed. In a preferred embodiment, the photosensitive material placed on the shaft in this step is a photopolymer, such as KTFR Resist, available as Catalog no. 1461946 from KTI Chemicals Incorporated, 2 Barnes Industrial Park Road, Wallingford, Conn. 06492. This material has a liquid form and can be applied around the circumference of the shaft in an even layer at the desired locations. The KTFR resist is heat treated after application to cure it onto the shaft. A selectively operable light source, such as a strobe light, is connected to the sensor unit 104 and signal processing circuit 106 and deployed in the area where the photosensitive material has been applied to the shaft. The shaft is shielded from the light source except in the area of thin slits corresponding to the desired line length and width and located at each point where lines are to be formed on the shaft.

In the next step of the process, shown in block 508, the shaft is rotated until the photosensitive material has been fully exposed. During rotation of the shaft, as shown in blocks 512 and 514, the sensor unit 104 is used to sense the presence of a line on the master film, and signal processing circuits 106 are used to trigger the light source, such as a strobe light, which exposes the photosensitive material on the shaft. Photopolymers such as KTFR are relatively insensitive to light so a considerable period of repeated exposure in each spot where a line is to be formed may be required. Because of the precision control of the application of light to the shaft in the process according to the invention, it is possible to repeatedly apply light to the same desired line formation spots during each of numerous consecutive rotations of the shaft.

When exposure of the photosensitive material is complete, the photo material is developed as shown at block 516. For developing KTFR, KTFR developer is used (KTI Chemicals catalog no. 1017631). Next, in step 518, the unexposed photopolymer, which because of its lack of exposure has not been cured onto the shaft, may be removed leaving only the polymer at the desired line locations. The unexposed material may then be removed using a solvent made for this purpose.

Next, as shown in block 520, the areas of the shaft between the applied photopolymer lines are treated to promote contrast between the lines and the shaft. Such treatment may be accomplished in a number of ways. In one preferred method, KTI KTFR blue dye (KTI catalog no. 1473362) is applied around the circumference of the shaft in the region where the lines have been formed. The blue dye adheres to the polymer KTFR but does not adhere to the shaft. Thus, a contrast is produced which can be readily detected by sensor units 104. In another preferred method of treating the line areas to produce contrast, the exposed metal of the shaft may be etched, for example, with ferrite chloride, and the etched regions may be filled with a material of a color contrasting with the color of the shaft in the polymer coated region. For example, the etched regions may be filled with a black material. Then, a protective coating may be applied around the circumference of the shaft to preserve the applied lines.

In addition to these methods, other methods may be used within the scope of the invention. In some instances, when shafts are to be retrofitted with grid lines, it is desirable to use a photochemical process rather than the photopolymer process described previously. For example, the room where the shaft is located can be darkened and unexposed film glued around the periphery of the shaft in place of the photopolymer in the previously described process of FIG. 5. Then, the film is exposed according to the process of FIG. 5 and subsequently developed on the shaft. This process has the advantage of requiring fewer rotations of the shaft for exposure of the film. The disadvantage of this process compared to the embodiment described above with respect to FIG. 5 is that the film attached to the shaft is more susceptible to damage than are lines produced by a staining or etching process.

Rather than gluing a film carrier to the shaft, it is also possible to apply the photosensitive chemicals used on such a film carrier directly to the shaft before exposing and developing them by the same process previously described.

Another technique for producing fine lines on a shaft is to use high intensity lasers to remove material from the shaft. Conventional laser apparatus can be used for performing such laser machining operations. What is important in the invention is the control of the laser machining apparatus. It is necessary to precisely control the laser ablation process to generate precisely spaced lines about the circumference of the shaft. The same control process described previously for photographic generation of lines is used to control the laser ablation. That is, a master set of lines may be produced and attached to the shaft, and the passage of these lines is detected as the shaft is rotated to generate a timing signal for laser machining at another location on the shaft.

Laser ablution can also be used on coatings or strips of material attached to the shaft, rather than the shaft itself. These alternatives are useful when the surface of the shaft cannot be etched or where the shaft material is unsuitable for laser ablation. The laser ablation process is advantageous since no darkroom is required and the process of forming the lines may be faster and require fewer steps than photographic processes.

Figure 6A:
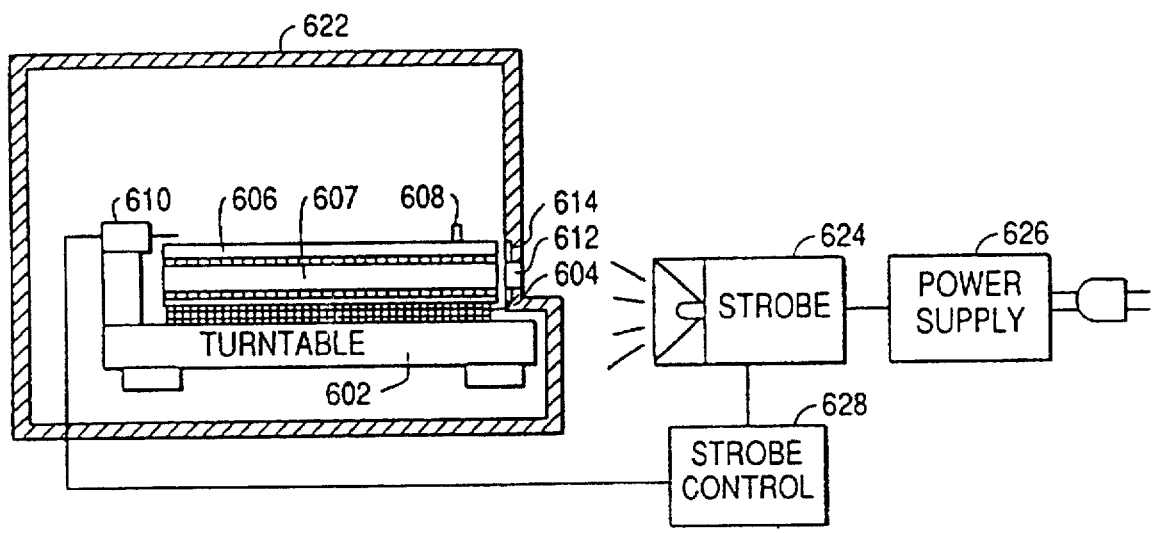
FIG. 6a is a diagram showing one apparatus useful in making a film master in the process of FIG. 5.
Figure 6B:
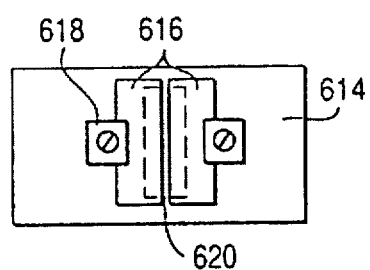

FIGS. 6a and 6b show an apparatus for preparing the film master according to block 502 of the flow chart of FIG. 5. As shown in FIG. 6a, the apparatus comprises turntable 602 having a platter 604, film carrier 606 mounted on turntable platter 604, film 607 mounted on film carrier 606, limit switch trip element 608, limit switch 610, and slit carrier 614, all surrounded by light blocking enclosure 622 except in the region of a hole 612 permitting the access of light to slit carrier 614. A strobe control circuit 628 is connected to turntable 602 and to limit switch 610 and is operatively connected to control strobe 624 which is powered by power supply 626. Turntable 602 is a means for moving film 607 past slit carrier 614 at a precisely uniform speed. For relatively small shafts, turntable 602 may be a direct drive audio turntable system such as a Technics model SL 1900 with its stylus and auxiliary lighting removed. Alternatively, a DC servomotor and appropriately sized rotating turntable could be used. Film carrier 606 may be formed from aluminum or other suitable material and is uniformly circular to a high degree of precision. Film carrier 606 is mounted on platter 604 for rotation therewith. The limit switch trip element 608 is aligned in conjunction with limit switch 610 to activate the limit switch, thereby indicating that the film carrier has reached a desired position and that strobing should be initiated. Turntable 602 and its associated components are enclosed in light blocking enclosure 622 which shields film 607 from external light such as that produced by strobe 624, except in the region of slit carrier 614. Referring to FIG. 6b, slit carrier 614 is constructed as an opaque plate of material, for example aluminum, with a cutout in the region of slit 620. Two adjustable slit edges 616, which may, for example, be razor blades, are aligned under a microscope to produce the desired slit width. Slit edges 616 are then locked into position using clamps such as locking devices 618.

Referring again to FIG. 6a, in operation, slit 620 is aligned in front of film 607 and turntable 602 is actuated. When limit switch trip element 608 actuates limit switch 10, the resulting signal to strobe control circuit 628 actuates a precision timing circuit which cycles strobe 624 at precisely calculated intervals to expose film 607 through slit 620. Slit 620 is located very close to film 607, preferably within ½ millimeter. Because film 607 rotates at a uniform speed, and strobe 624 is actuated at precise intervals, precisely spaced lines are exposed onto film 607. Preferably, strobe control circuit 628 also includes a counter which activates strobe 624 a specified number of times to produce a specified number of lines, and then ceases to activate strobe 624. In this way, overwriting of previously exposed areas of the film is prevented. Alternatively, strobe control circuit 628 may activate strobe 624 beginning with the activation of limit switch 610, and may cease activating strobe 624 when limit switch 610 is actuated a second time, indicating that film 607 has made a complete revolution. Although the second method would result in an area of double exposure, film 607 could be aligned so that this area would occur near an end of film 607 which could then be cut off upon attachment of film 607 to the shaft.

Strobe 624 may be a GEN RAD model GR 1538-A Strobotac operating with an external trigger in the form of strobe control circuit 628. The required frequency of the strobe is a function of the film carrier diameter, the rotational speed of the turntable, and the desired line spacing. As an example, for a cylinder diameter of 2.95 inches and a rotational speed of 33⅓ RPM, the frequency of strobe 624 should be set to 656 Hz for a line spacing of five lines per millimeter.

Figure 7:
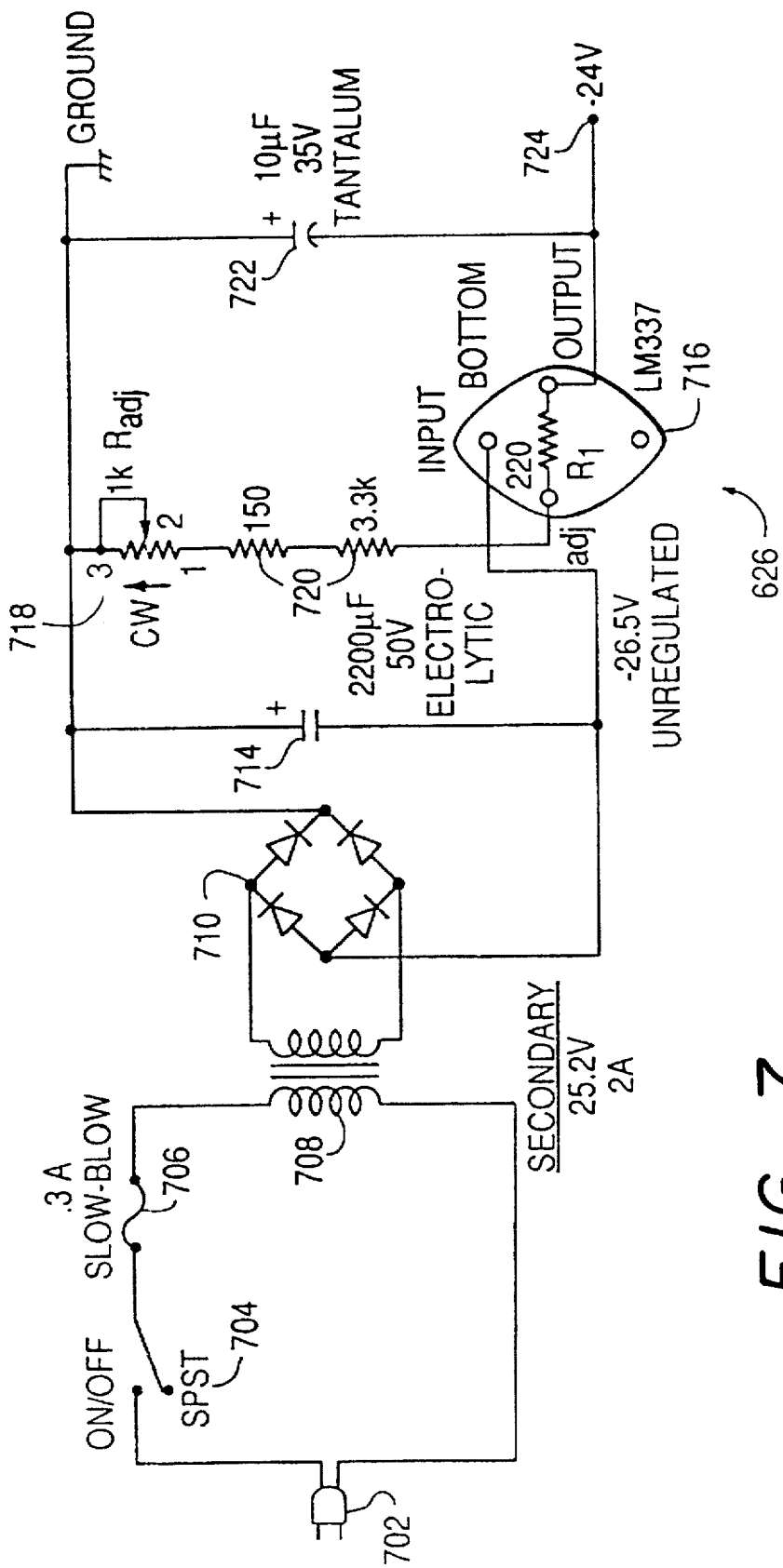

Because of the need for precision exposure of film 607, strobe 624 is provided with a regulated power supply to eliminate variations in intensity caused by alternating current power. FIG. 7 shows a relatively simple 24 volt DC power source supply which can be used for this purpose. In the power supply, line cord 702 is connected to a source of 120 volt AC power, which upon closure of switch 704 completes a circuit passing through fuse 706 and the primary of transformer 708. The secondary winding of transformer 708 has a turns ratio which provides 25.2 volts AC at 2 amperes. The secondary winding of transformer 708 is connected to a full wave bridge rectifier 710. The output of full wave bridge rectifier 710 is connected across electrolytic capacitor 714 and then to voltage regulator 716 which may be an LM 337 voltage regulator. Resistors 718 and 720 are provided for adjusting the output voltage. On the other side of voltage regulators 716, at the output terminal 724 of power supply 626, a tantalum capacitor 722 of 10 microfarads is connected between output terminal 724 and ground.

Figure 8:
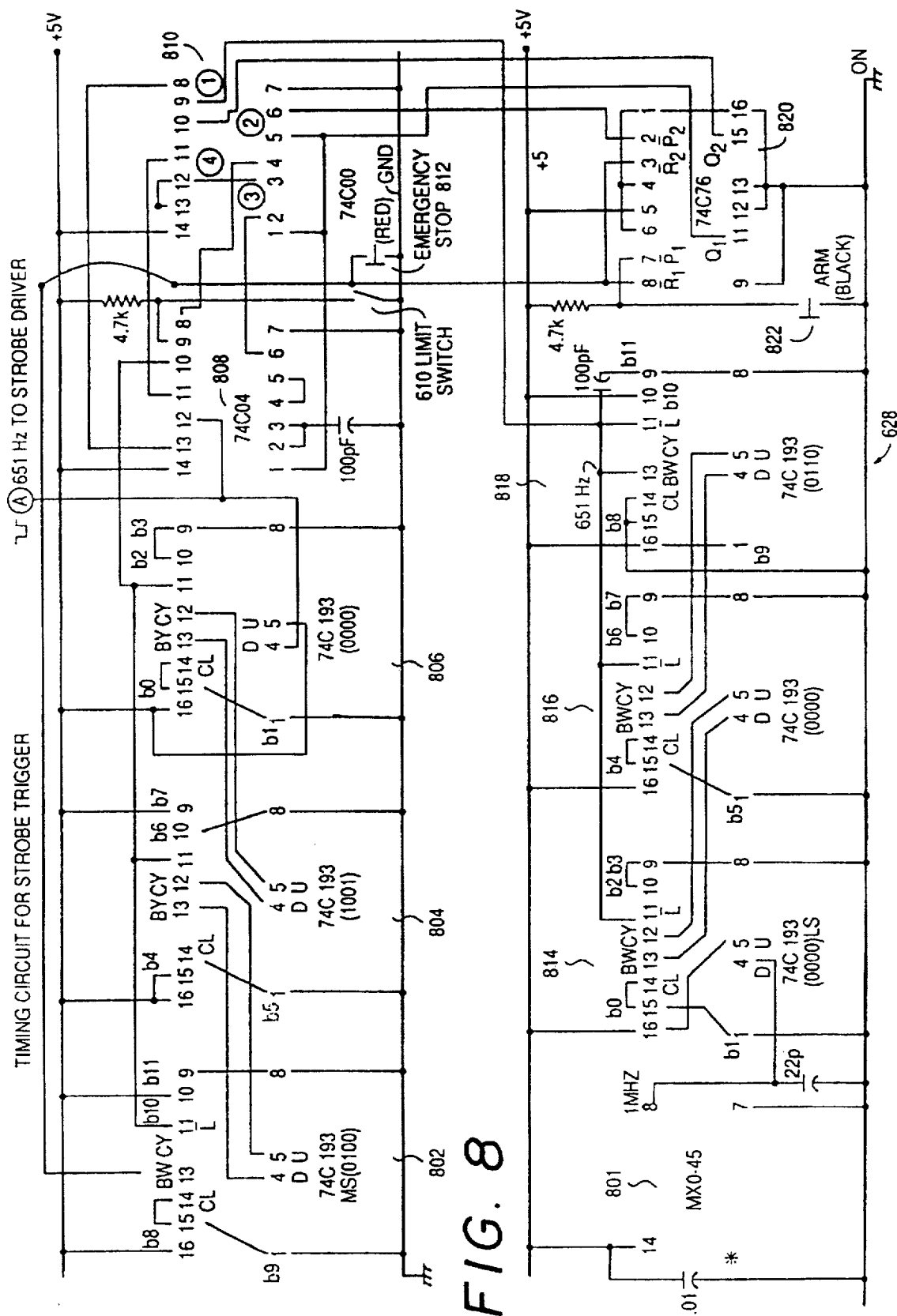

Referring now to FIG. 8, strobe control circuit 628 is shown in schematic form. Strobe control circuit 628 has as a major component a crystal oscillator 801 which may be an MXO-45 oscillator having a precise 1 MHz output. Strobe control circuit 628 is essentially a clock circuit which begins with a precision time base and divides the time base output using counters to produce a desired output pulse frequency. The output pulses are then used to trigger strobe 624. Strobe control circuit 628 also includes a counter for the output pulses and means attached to the counter for disabling the pulsed output after a predetermined number of pulses have been generated. Specifically, circuit elements 802, 804, 806, 808, 810, 814, 816, 818, and 820 are operative to start the flashing of the strobe at a precise 651.04 Hz rate upon actuation of limit switch 610, and to actuate the strobe for a predetermined number of flashes. As an example, for a film carrier diameter of 2.95 inches and spacing of five lines per millimeter, 1176 flashes might be performed, thus forming 1176 spaced lines on the film master. An emergency stop switch 812 and an arm switch 822 are provided for control of circuit operation.

Figure 9:
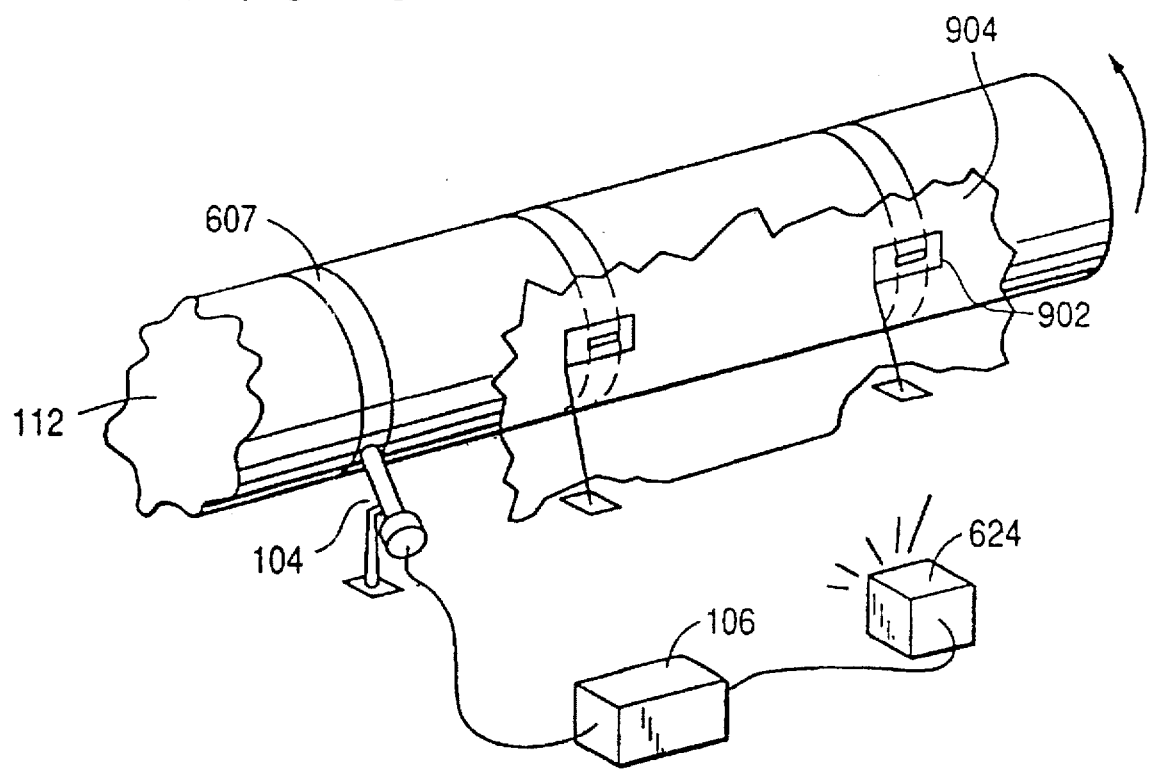
FIG. 9 is an oblique view showing the setup of apparatus for writing lines onto a shaft useful in the process of FIG. 5.

Referring now to FIG. 9, a typical apparatus setup is shown for application of lines to a shaft on-site, as described with respect to the flowchart of FIG. 5. Master film 607 is placed around the circumference of shaft 112 and sensor unit 104 is aligned to sense the passage of lines on master film 607. The output of sensor unit 104 is connected to a portion of the circuit of signal processing circuits 106. In cases where the end of the shaft 112 is accessible, it is also possible to use a disk-type optical encoder attached to the end of the shaft as the source for master line spacing signals. In addition, a helically wrapped master can be used in a manner described below with reference to FIG. 13.

Referring briefly back to FIG. 4a, the portion of the signal processing circuit 106 used for mastering is the portion comprising amplifier 402, high pass filter 404, and comparator 406 terminating at terminal 408. Terminal 408 provides a square wave pulse upon passage of each line on master film 607. Terminal 408 is connected to a power boost circuit (not shown) which provides current boosting and level and impedance matching depending on the requirements of the trigger terminal of the strobe selected. This power boost circuit is connected to the trigger terminal of strobe 624. As shown in FIG. 9, strobe 624 is located to provide light through slit masks 902 which are aligned very close to photosensitive material 903 which has been placed on shaft 112 in the locations where matched sets of grid lines are desired. A Ronchi grid, or laser interference fringes, may be used to perform the function of slit masks 902. A shield 904 prevents light from strobe 624 from reaching photosensitive material 903 except in the areas of the slits in slit masks 902. Only part of shield 904 is shown to avoid obscuring the other parts of the apparatus.

Figure 10:
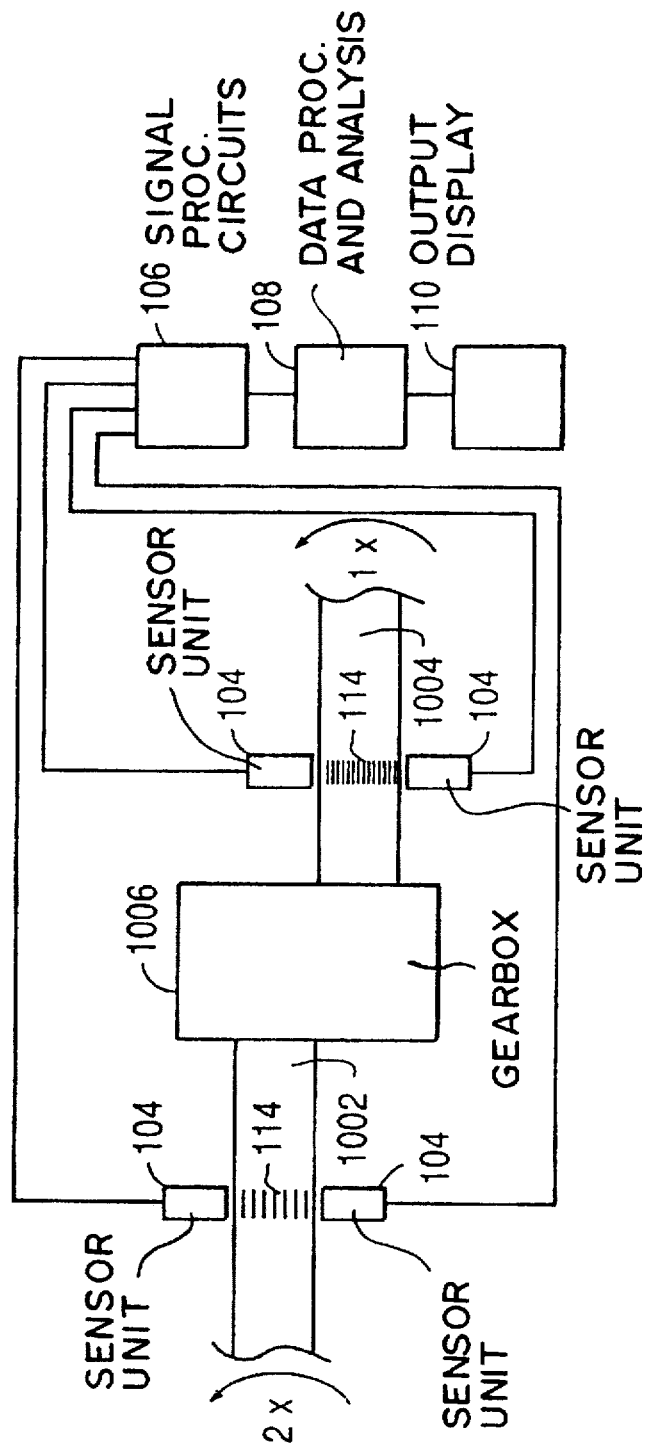
FIG. 10 is a block diagram showing the application of the inventive apparatus to multiple-shaft systems.

In another embodiment of the invention, as shown in FIG. 10, the system disclosed may be used with a plurality of different shafts 1002 and 1004, separated by one or more transmission elements such as gearbox 1006. In this embodiment of the invention, lines 114 are placed on the shafts 1002 and 1004 in the same manner as previously described for placing plural matched sets of lines on a single shaft. However, because of the action of gearbox 1006, shafts 1002 and 1004 do not rotate at the same speed. Preferably, shaft 1002 rotates at an integer multiple of the rotational speed of shaft 1004, for example at twice the speed of shaft 1004. During application of the lines, the film master should be placed on the fastest rotating shaft in the system, for example shaft 1002. Then, lines are formed synchronously on both shafts as the machine is operated, according to the process described herein. Synchronous formation of the lines results in lines 114 on shaft 1002 with greater spacing than lines 114 on the slower rotating shaft 1004. When shaft 1002 rotates at twice the speed, lines 114 on shaft 1002 have twice the separation of the lines on shaft 1004. Also, for each rotation of the film master on shaft 1002, lines are exposed on only half the circumference of shaft 1004.

The system of FIG. 10 provides an example of a system for sensing two shafts separated by a gearbox, but those skilled in the art will appreciate that this concept can be expanded to include sensors on any number of connected shafts in a power transmission system, which can be compared with the output of sensors on proximate shafts or with the output from sensors of any shaft in the system to perform desired operational analysis using any of the methods disclosed herein.

Because of the synchronous application of the lines 114 to the various shafts, the output of sensor units 104 associated with shaft 1002 and with shaft 1004 have the same output frequency during operation of the power transmission system shown, and these outputs may be compared and analyzed using the same circuits and methods described previously to identify possible problems in gearbox 1006.

As discussed previously, lines parallel to the shaft axis (as shown in FIG. 1) may be used to measure displacement and velocity in the two lateral directions perpendicular to the shaft axis. With two sets of lines and multiple sensors (see FIG. 1), such lines allow measurement of five rigid body displacement components (along two translational and three rotational axes) and one non-rigid body component, shaft twist about its central axis. By providing lines not parallel to the central longitudinal axis 116 of shaft 112 as shown in FIGS. 12a and 12b, it becomes possible to measure axial rigid body displacement and elastic deformation of the shaft, in addition to the other quantities discussed before.

Figure 12A:
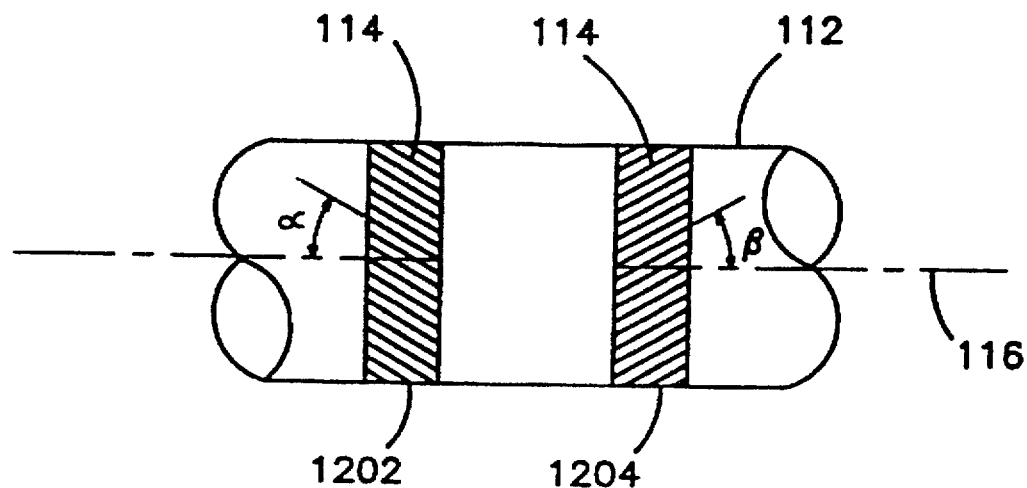
FIGS. 12a and 12b are side views of a shaft with lines of varying orientation applied at different axial locations to facilitate additional displacement data collection.
Figure 12B:
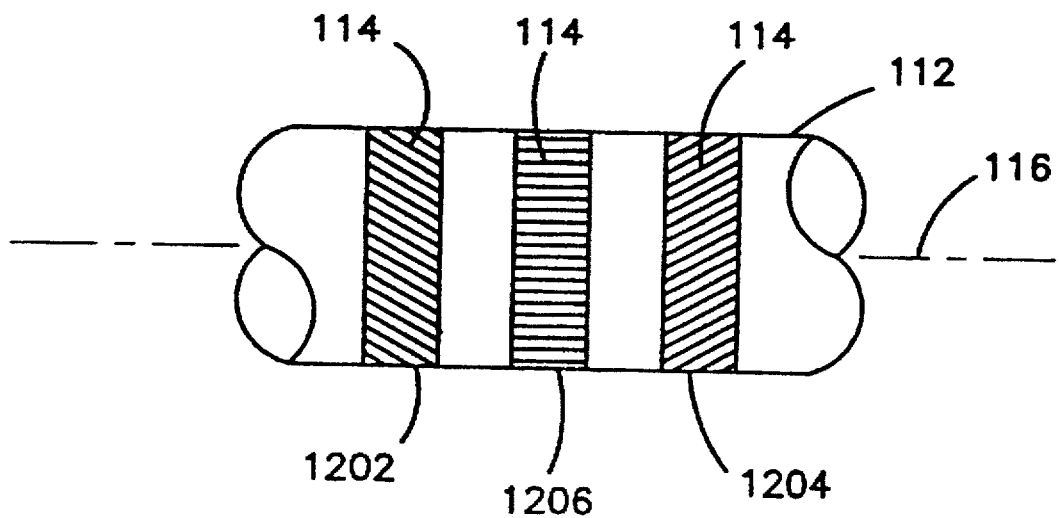
Figure 12C:
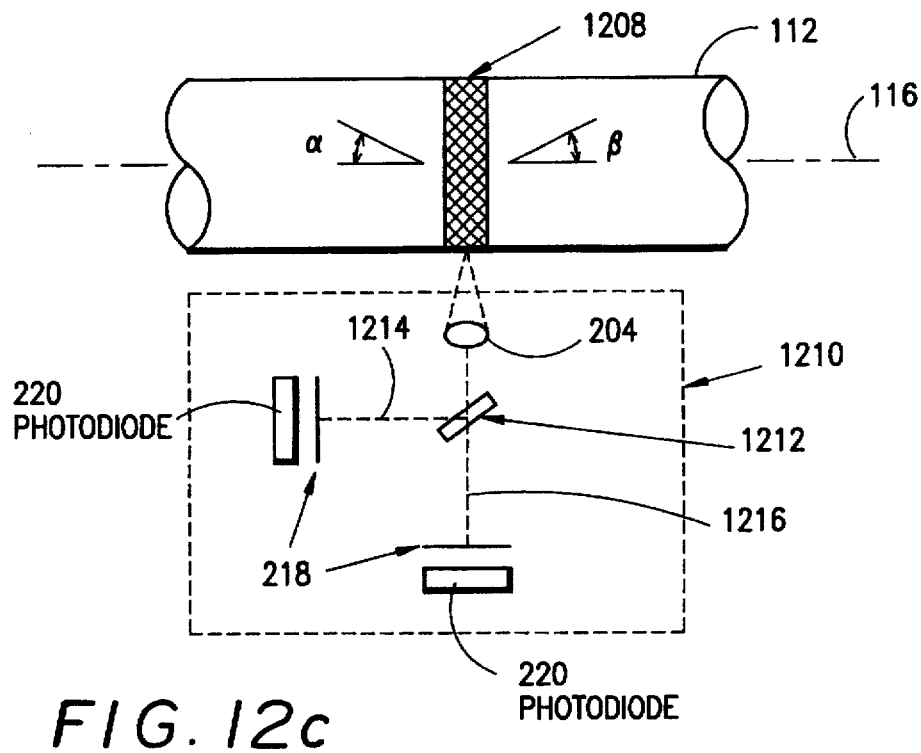
FIG. 12c is a side view of a shaft with two sets of parallel lines superimposed in the same area with different orientations, to form a cross-hatching region, and an apparatus for simultaneously detecting passage of the two sets of parallel lines.

FIG. 12a and 12b are side views of a shaft 112 with lines 114 of varying orientation applied at different axial locations to facilitate this additional displacement data collection. Referring first to FIG. 12a, a first set of lines 114 is provided on shaft 112 at axial position 1202, at an angle a to lines on the surface of shaft 112 parallel to central longitudinal axis 116. Similarly, a second set of lines 114 is provided on shaft 112 at axial position 1204, at an angle β to those lines on the surface of shaft 112 parallel to central longitudinal axis 116. Preferably, angles α and β may be equal but opposite in direction as shown in FIG. 12a. The optimal magnitude of angles α and β depends on the expected magnitude of axial motion (speed) relative to the expected magnitude of rotational speed and can be determined experimentally.

With two sets of angled lines as shown in FIG. 12a, axial displacement can be measured, but the data available in this configuration does not permit distinguishing axial displacement from shaft twist. In the absence of meaningful shaft twist, axial displacement can be determined in this configuration by measuring the phase shift of signals from sensing of lines at axial position 1202 relative to the sensed signals from lines at axial position 1204.

If it is desired to obtain measurements in all seven directions of freedom (three translational directions, three rotational directions, and shaft twist) a third set of lines, with an angle different from the angles of the first two sets, may be provided at a third axial location 1206 as shown in FIG. 12b. In the embodiment shown, axial location 1206 is between axial positions 1202 and 1204 and the third set of lines at axial location 1206 is parallel to the central longitudinal axis 116 of shaft 112, while lines at axial positions 1202 and 1204 have different angles as discussed with reference to FIG. 12a. At least one and preferably two, three, or four optical sensor units 104 (not shown) are provided at each of the three axial positions 1202, 1204, and 1206 and the sensor output of the additional optical sensor unit subsystems is provided to the system signal processing circuits in the same manner disclosed previously with reference to FIG. 1. In one advantageous embodiment, four optical sensor units 104 are provided at each of the end axial positions 1202 and 1204, and a single optical sensor unit 104 is provided at central location 1206. The four optical sensor units provided at a single axial location are arranged at 90 degree intervals about the shaft, providing two pairs of diametrically opposed sensors. One pair of diametrically opposed sensors at the location can be used to determine shaft movement in one direction, and the other pair of sensors can be used to determine shaft movement in a different direction perpendicular to the first direction, in the manner described above.

Shaft twist is determined by measuring the phase shift between signals from the lines parallel to the shaft axis (at location 1206) and signals from lines at one of the other axial positions 1202 or 1204. Phase shift due to shaft twist is subtracted from the phase shift measured between the output signals of the optical subsystems at the angled line positions 1202 and 1204, respectively, to determine the component of this phase shift attributable to axial displacement.

The angled lines shown in FIGS. 12a and 12b are provided on the shaft using any of the line application methods disclosed herein. If lines are to be written by exposing photosensitive materials applied to the shaft, it is merely necessary to adjust the angle of the slit 620 or slit mask 902 used to control the exposure of the photosensitive material so that the lines are produced at the desired angle.

FIG. 12c shows an alternative embodiment of the invention incorporating angled lines. In this embodiment, a set of angled lines 1208 is provided on shaft 112, and each set of lines 1208 comprises two sets of parallel lines superimposed in a single location. Lines 1208 include sets of parallel lines at angles $\alpha$ and $\beta$ (respectively) to lines parallel to central longitudinal axis 116 of shaft 112. Preferably, angles $\alpha$ and $\beta$ are equal, with the optimal magnitude of angles $\alpha$ and $\beta$ depending on the expected magnitude of axial motion (speed) relative to the expected magnitude of rotational speed. In one embodiment having wide applicability, angles of $\alpha=\beta 60°$ are used.

A sensor unit 1210 is provided to simultaneously sense the passage of both sets of parallel lines incorporated in angled lines 1208. Sensor unit 1210 is generally constructed according to the description above of sensor unit 104 (shown in FIG. 2a) but with additional elements to provide simultaneous sensing of the superimposed line sets. As shown in FIG. 12c, sensor unit 1210 comprises lenses 204, beamsplitter 1212, two Ronchi grid masks 218, and two photodiodes 220. Lenses 204 image an area of angled lines 1208, and the resulting image is divided through beamsplitter 1212 into two optical paths 1214 and 1216. One each of Ronchi grid masks 218 and photodiodes 220 is provided on optical paths 1214 and 1216. The two Ronchi grid masks 218 are aligned differently, so that the grid mask 218 on optical path 1214 is aligned in parallel to an image on path 1214 of the shaft lines at angle $\alpha$. Grid mask 218 on optical path 1216 is oriented to be parallel to an image on path 1216 of the lines placed on shaft 112 at angle $\beta$. In this manner, one photodiode 220 detects the passage of one set of parallel lines in angled lines 1208 (at angle $\alpha$), and the other photodiode 220 detects the passage of the other set of parallel lines in angled lines 1208 (at angle $\beta$). The outputs of the two photodiodes 220 can then be connected to signal processing circuits 106 in the manner previously disclosed, and the output signals thereof can be differentially processed by the circuits of the invention in the manner described with reference to FIGS. 4a and 4b, to yield a measure of axial displacement based on a calculated phase shift between the output signals of the two photodiodes 220, based on Equation 6 with x=0. This embodiment can be used with or without multiple sensors, and has the advantage of reducing sensitivity to torsional strain and lateral displacements when measuring axial displacement, compared to the embodiments of FIGS. 12a and 12b, since the phase shift from axial displacement is determined at a single location on the shaft.

Figure 12D:
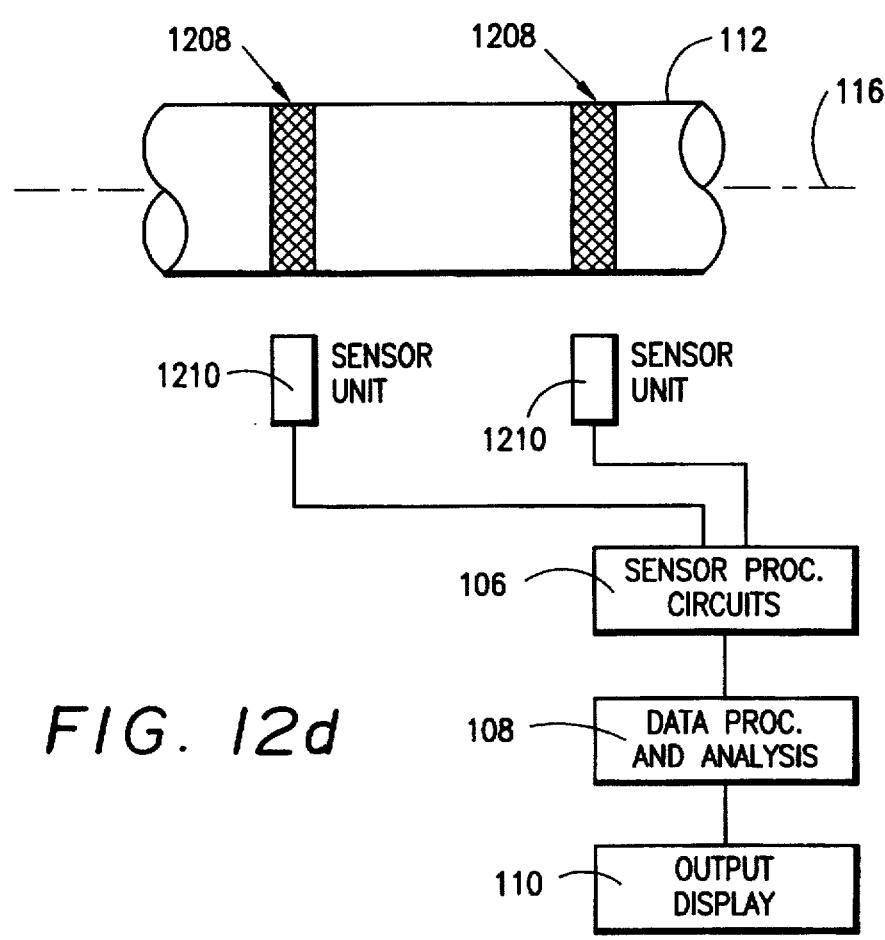
FIG. 12d is a side view of the apparatus of FIG. 12c where two axially spaced sets of cross-hatchings and associated sensors are provided on the shaft.

In a related embodiment, shown in FIG. 12d, two sensor units 1210 are provided and connected to signal processing circuits 106, data processing/analysis circuits 108, and output display 110. The provision of two axially separated sets of angled lines 1208 in this embodiment allows measurement of axial strain, in addition to other parameters. Preferably, at least one of the sensor units 1210 is placed close to the shaft load, to provide accurate high frequency measurements of axial thrust. A plurality of sensor units 1210 may also be provided at each axially spaced location where angled lines 1208 are provided, to permit more detailed pitch and plunge measurements in the manner described above with reference to FIG. 12b.

Figure 13:
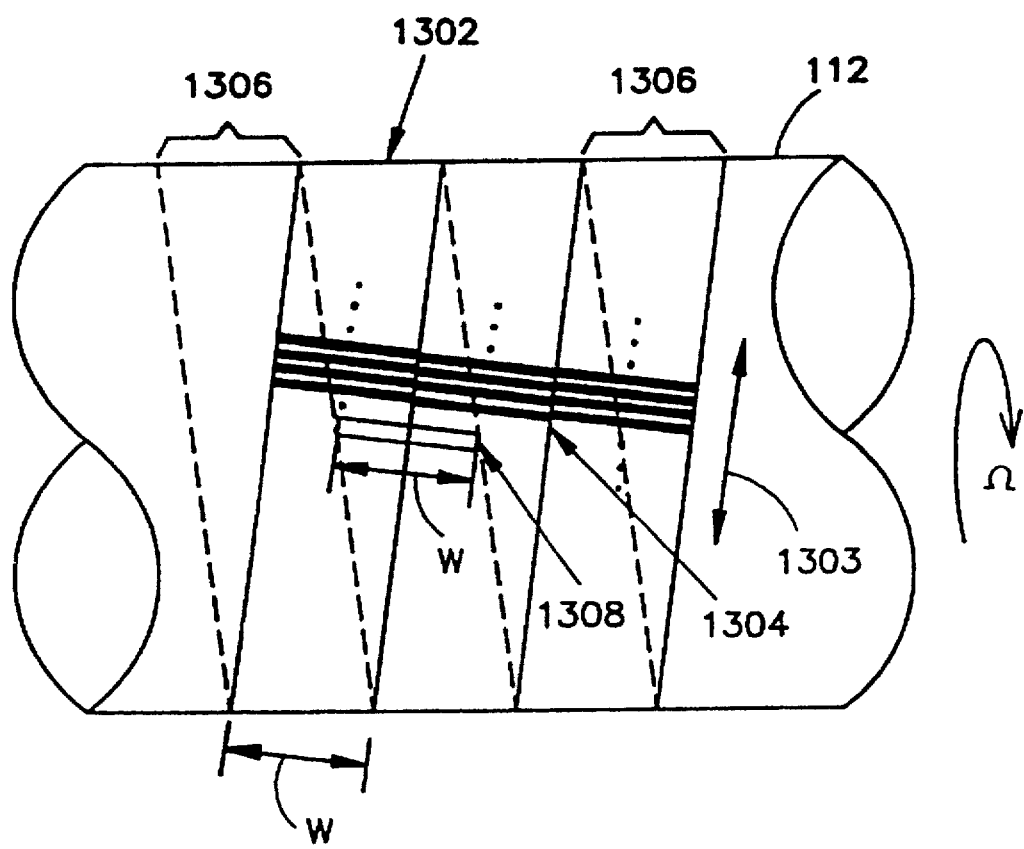
FIG. 13 is a side view of a shaft showing a helical wrapping technique for applying uniformly spaced, seamless lines to a shaft.

FIG. 13 shows a method of applying master lines to the shaft for generating one or more synchronized line sets on a shaft. The shaft 112 is helically wrapped with a lined material 1302, and the lined material 1302 is fixed to shaft 112, as by gluing. Lined material 1302 is preferably a photographically produced strip with evenly spaced lines perpendicular to the length 1303 of the strip, and extending transversely across its entire width. Such lined material 1302 may be produced by any of the processes described above with reference to FIGS. 5–10, or by another process if desired.

Depending on the width W of the lined material 1302, the desired angle of the lines, and the diameter of the shaft, it may be desirable to wrap the shaft with several turns of the lined material 1302, as shown, so as to provide enough total width of lines along the direction of the shaft axis to permit sensing. The lined material 1302 is then cut at ends 1306. As the lined material 1302 is helically wrapped, the edges 1304 of the material are butted against the adjacent turn. For constant line spacing, it is preferable for the lines at the edges 1304 to be aligned with the adjacent lines on the adjacent turn of lined material 1302, resulting in an effectively seamless set of lines.

After installation, lined material 1302 is used in the manner described earlier, in place of master film 607, to generate line spacing signals in the line writing process described with reference to FIG. 9. Briefly, the passage of the master lines is picked up by a photodetector apparatus aimed at a spot 1308 for detection of master line passage as shaft 112 rotates. The photodetector output signal is applied to trigger a strobe or pulse laser. The strobe illuminates a slit or Ronchi grid which is imaged at a desired angle onto photographic emulsion at one or more axial positions elsewhere on the shaft 112.

As noted before, it is desirable to avoid mismatches of lines at the material seams since mismatches produce undesirable phase shifts in the sensor signal output. When very finely spaced lines are provided on lined material 1302, it may be impossible as a practical matter to avoid phase shifts between adjacent turns of the material. If phase shifts are present between adjacent turns in the helical wrapping, an acceptable output can be provided in the following manner. The photodetector is aimed at a spot 1308 such that it images parts of two adjacent turns on the helical wrapping in any given revolution of shaft 112. The photodetector is preferably set up with a field of view equal to the width W of the wrapping strip, with uniform illumination over the aperture. As the shaft turns, the photodetector remains fixed at one axial position such that the two ends of the helix are never within range of the photodetector. The photodetector is long enough that it always picks up light from more than one turn of the helix. The rotation of the shaft causes the photodetector to gradually shift from one strip to another, evenly distributing phase shifts over the entire rotation. As a result, the helically applied master generates line writing signals that do not have a phase shift at a point on the shaft where the ends of the master come together.

If the photodetector aperture width is matched to the width of the master lines and the lines are written edge to edge on the master, the phase shift between adjacent portions of the master line set are spaced out uniformly over the full 360 degree rotation. If the width is matched in this manner, the master line material should encircle the master at least twice, preferably three or more times, to provide the necessary axial coverage.

This method is also useful in some cases for applying angled lines to shaft 112 for use as discussed with reference to FIG. 12. If the desired lines are relatively widely spaced, or the level of desired accuracy is not as high, angled lines for direct sensing use may be seamlessly applied to the shaft by helically wrapping the shaft 112 with a lined material 1302 as shown in FIG. 13 and fixing the lined material 1302 to shaft 112, aligning the ends of the lines on adjacent turns of the helix. The line angle produced by this method is variable depending on the helix established by placement of the material. The possible angles are limited only by the width of the material relative to the diameter of the shaft. Thus, by selecting appropriate material dimensions, it is possible to provide helically wrapped lines on a shaft which are very nearly parallel to the central longitudinal axis of the shaft.

Figure 14A:
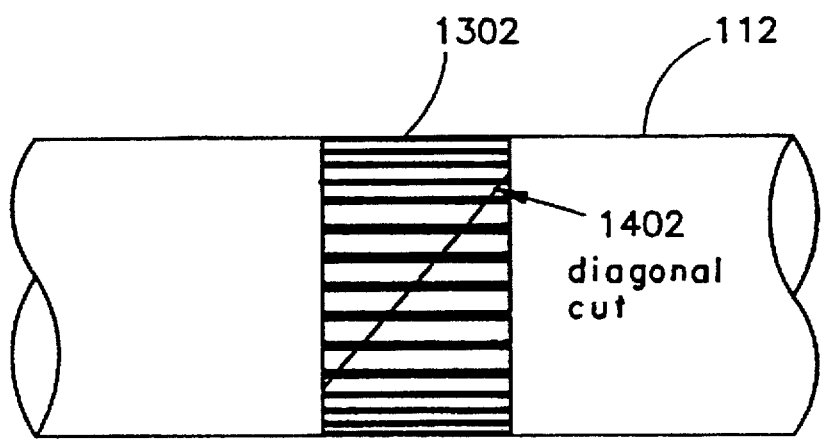
FIG. 14a is a side view of a shaft showing a diagonal cut technique for fixing line substrate material to a shaft without a seam parallel to the lines.

A method of eliminating seams which can lead to an undesirable phase shift or discontinuity in shaft lines is shown in FIG. 14a. In this method, a strip of photosensitive material 1302 is cut diagonally across its width at cut 1402 and applied to the shaft 112. This method can be advantageously used for the application of unexposed film or photo print paper to a shaft which is to be exposed to generate synchronized lines. In this way, the lines which are written on the film after it is attached to the shaft cross the joint, producing a negligible effect on the photodetection of the lines in the joint area. By eliminating the mechanical gap, the lines can be written on the material without a dropout, phase shift, or gap, thus eliminating discontinuities in the data collected by sensing the material.

This method can also be advantageously used for application of pre-lined strips to a shaft, such as the master strips discussed above with reference to FIGS. 5–10. Although the diagonal cut may be used to reduce the localized effects of phase discontinuity and gaps in strip ends, this method is particularly useful with pre-lined strips in cases where the size and spacing of the lines permits manual matching of the ends of the lines at the diagonal cut. The strip, with lines applied, can be diagonally cut in a straight line and applied to the shaft. The lines can be precisely matched at the joint by shifting one end of the strip slightly along the diagonal cut 1402, relative to the other end of the strip, until the ends of the lines at cut 1402 are aligned.

Figure 14B:
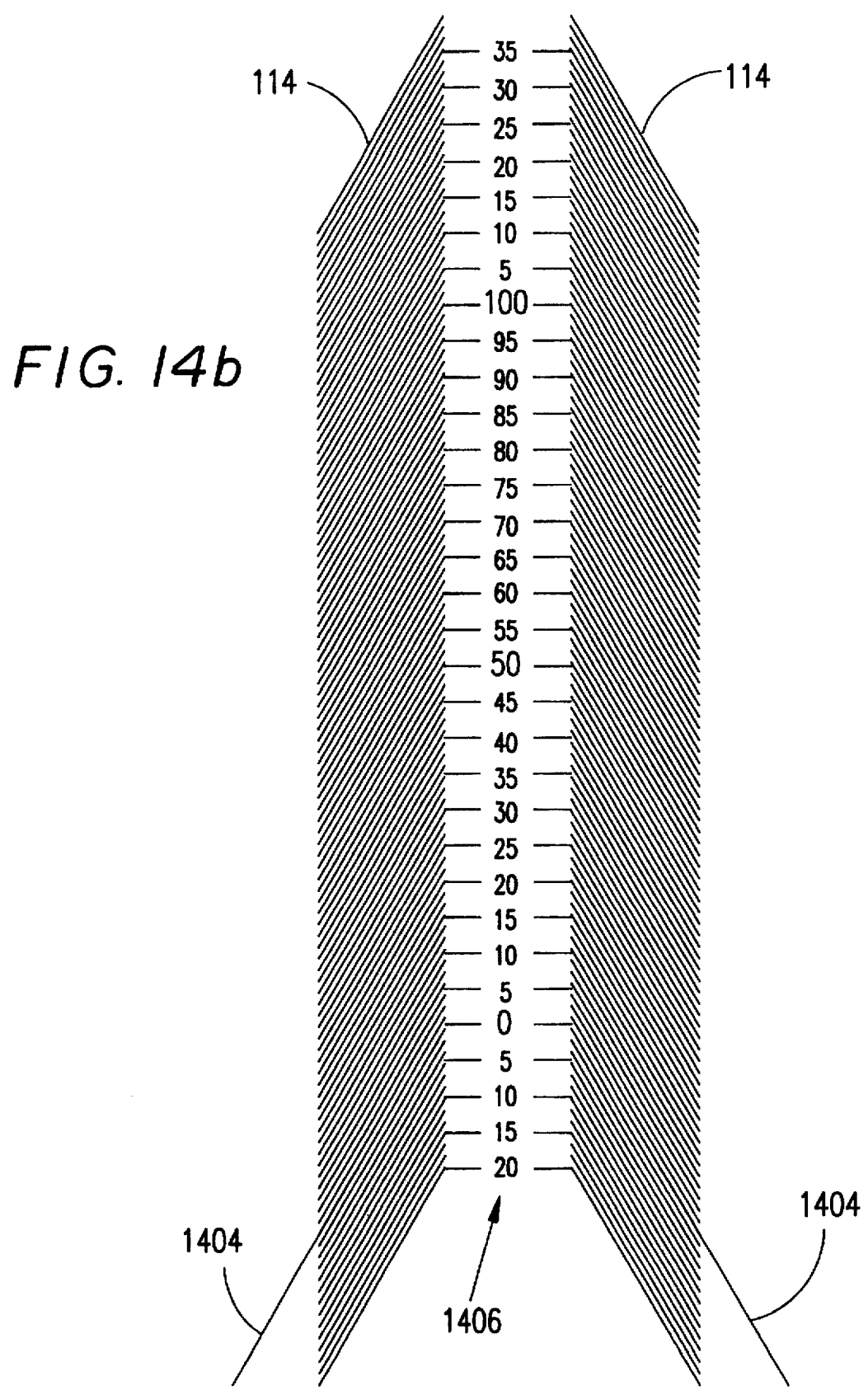
FIG. 14b shows a set of lines generated by computer and photoplotted onto flexible photographic material, including line numbers and an index line feature.

FIG. 14b shows a set of lines generated according to another, related method of creating finely spaced lines. In this embodiment of the invention, lines are generated by computer and photoplotted onto flexible photographic material to form lines 114 as shown in FIG. 14b. In this process, a file containing data on the desired line pattern is generated using design software such as AutoCad™, PCad™, or Tango™ and, after any required file format conversions are performed, for example to produce a "Gerber™" file, the file is fed into a conventional photoplotting machine of a type used to prepare printed circuit board mask works. The photoplotting machine produces the desired line pattern (as shown in FIG. 14b) on Kodak™ 7-rail mylar photographic material. This material is then adhered to the shaft or other object to be monitored using the apparatus and methods of the invention or used to transfer lines via contact print to other material, such as photosensitized nickel coated Kapton™ or photosensitized stainless steel foil or shimstock. The example in FIG. 14b shows two sets of lines 114 angled at plus 60 degrees and minus 60 degrees from the shaft axis. Lines 114 preferably have a width of 0.004 inches with white space between the lines also having a width of 0.004 inches.

To enhance the operation of the line counting apparatus disclosed above, each set of lines 114 is also provided with an index line 1404 which can be used to reset the counters at a specified point during each revolution in a manner which will be described in more detail below with reference to FIGS. 19–21. Index line 1404 is provided once per revolution and is preferably detected by a separate photodiode arrangement added to each optical unit 104, which will be described in more detail below with reference to FIG. 29. The additional photodiode generates a changed signal whenever index line 1404 passes through the field of view of the photodiode.

Index line 1404 is established at the same angle as the primary lines, but is twice as wide. Thus, index line 1404 is preferably a 0.008 inch wide line. Although shown as a black line in FIG. 14b, index line 1404 is preferably a white line on a black background. Index line 1404 is made twice as wide as the primary lines in this embodiment to minimize optical cross-talk from the primary lines, since a section of the primary lines projected onto the index line mask would include equal parts of white and black lines at any time. If optical cross-talk is not a problem due to the configuration of the sensors, index line 1404 can be made in any convenient width, and may be made narrower if that is found to improve precision in shaft position measurements.

As shown in FIG. 14b, lines 114 produced in this manner, by computer generated photoplot, are preferably also provided with numbers 1406, spaced every five to ten lines, to provide information to a test mechanic or engineer allowing relation of the location of events in test data to physical features of the rotating equipment, such as a gear tooth, a propeller blade, a scratch, shaft imbalance or misalignment, or to accurately locate top-dead-center. To facilitate accurate establishment of a desired shaft position, to within ½ line width (typically 0.004 inches on the shaft surface), an LED or other light source located behind the single-slit mask associated with the detector for index line 1404 is used to project an image of the slit onto shaft 112 in the region of numbers 140. This may be accomplished by providing a rotating turret in the manner shown in FIGS. 2a and 2b to selectively position the light source to image the index line mask slit onto numbers 1406 to provide a reference mark against which numbers 1406 are read. The projected line is used as a pointer to numbers 1406, allowing the shaft position to be precisely and repeatably read and set.

Figure 14C:
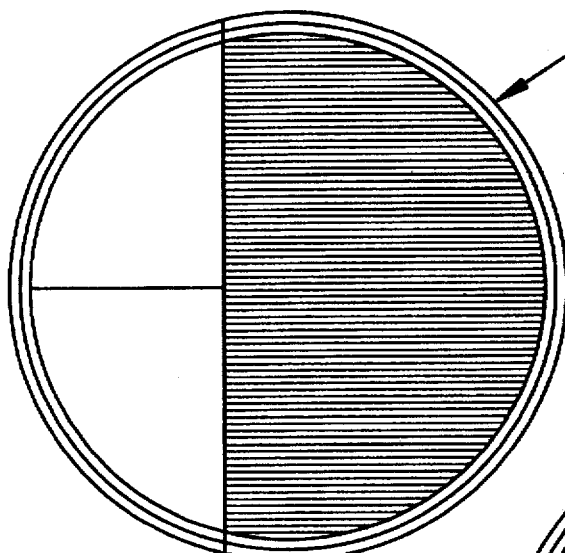
FIGS. 14c through 14g are negative images of mask elements for detecting passage of lines and index lines in the invention.
Figure 14D:
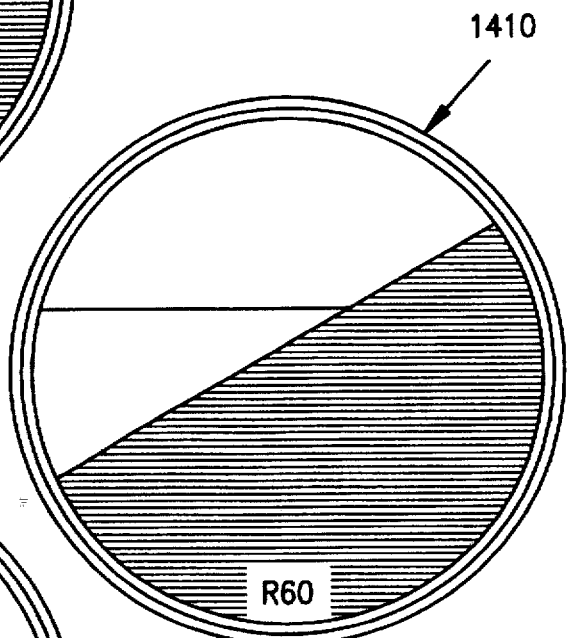
Figure 14E:
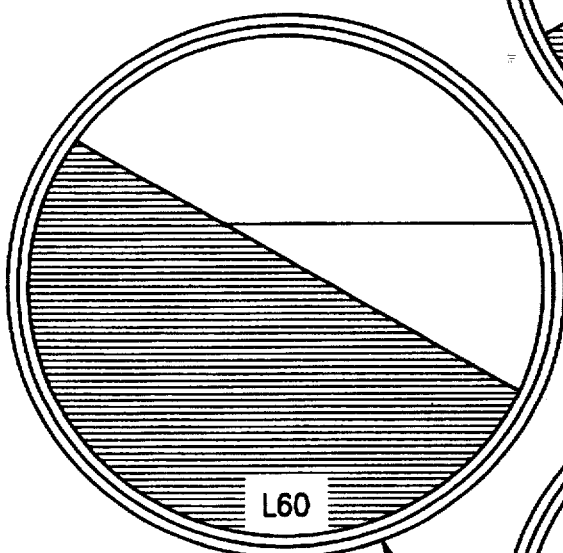
Figure 14F:
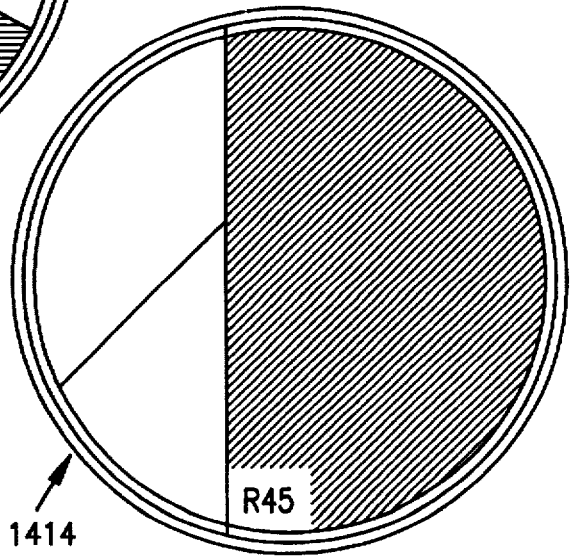
Figure 14G:
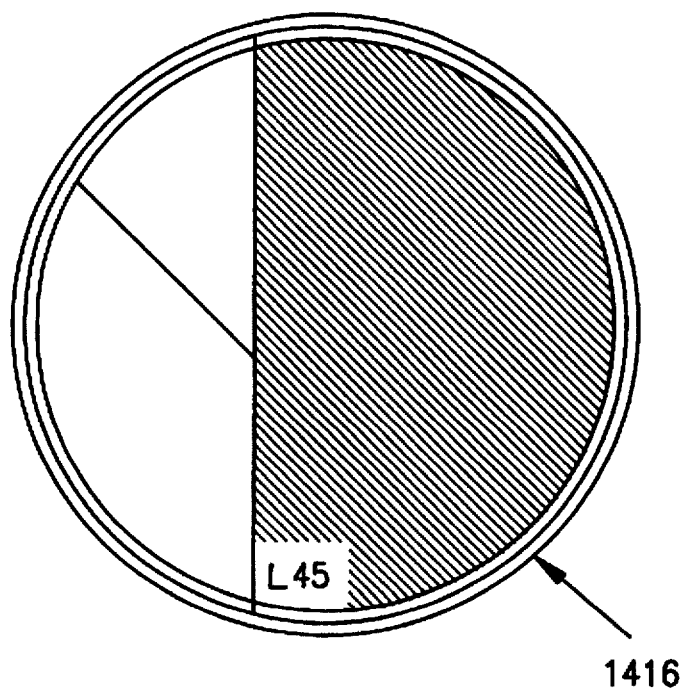

For the index line detection photodiode arrangement (described below in more detail with reference to FIGS. 29a and 29b), instead of Ronchi grid mask 218, there is provided a single-slit mask with a slit corresponding to an image width of index line 1404. Preferably, grid masks for detecting both lines 114 and index line 1404 are formed in a single mask element. FIGS. 14c through 14g are negative images of mask elements for detecting passage of lines 114 and index lines 1404. These masks may be formed from Mylar with a diameter appropriate to the configuration of sensor units 104, such as 0.830 inches. FIG. 14c shows a mask 1408 for detecting lines arranged transversely to the direction of movement of shaft 112 (zero degrees). FIGS. 14d and 14e show left and right hand mask negatives 1410 and 1412 for detecting lines placed on shaft 112 at 60° angles. FIGS. 14f and 14g show left and right hand mask negatives 1414 and 1416 for detecting 45° angled lines. The left and right hand masks are mirror images of each other. The left and light hand versions of the masks are provided to facilitate detection of sets of lines having different angles with respect to the shaft axis. For example, in the line placement embodiment of FIG. 12a, if α=60° and β=60° and index lines 1404 are provided at the same angles, left and right 60° masks would be provided, as shown in FIGS. 14d and 14e.

Figure 15:
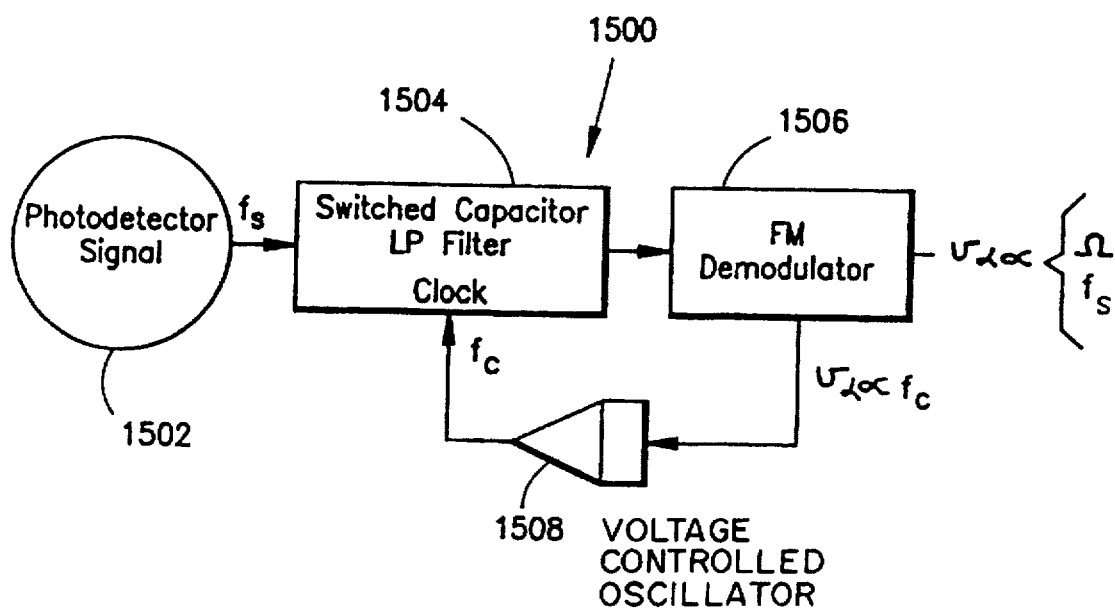
FIG. 15 is a block schematic diagram of a tracking filter for spatial anti-aliasing which can be advantageously used in processing the signals generated by the systems disclosed herein.

FIG. 15 is a block schematic diagram of a tracking filter for spatial anti-aliasing which can be advantageously used in processing the signals generated by the optical subsystems disclosed herein. If the line spacing on the surface of the shaft is d and some signal which depends on the shaft angle of rotation is sampled every time a line passes, spatial aliasing can be avoided by low-pass filtering the signal at a spatial frequency of ½d prior to sampling, thus ensuring that sampling occurs at greater than the Nyquist rate for the signal. Preferably, the signal is low-pass filtered to remove frequencies below a spatial frequency of ¼d. For a shaft with radius R rotating at Ω radians per second, the lines pass a fixed point at a rate fs=ΩR/d Hz (line passage frequency). Motion of the shaft converts the spatial frequency 1/d to the time frequency $f_s$. Thus, the anti-aliasing filter is preferably set at $f_{lp}$=ΩR/4d Hz. Although the line spacing is constant, the preferred setting of the anti-aliasing filter changes with Ω in the time domain. FIG. 15 is a block schematic diagram of an anti-aliasing filter 1500 according to the invention. Anti-aliasing filter 1500 comprises photodetector signal input 1502, switched capacitor low pass filter 1504, FM demodulator 1506, and voltage controlled oscillator 1508. Photodetector signal input 1502 is connected to the signal input of switched capacitor low pass filter 1504, and the output of switched capacitor low pass filter 1504 is connected to FM demodulator 1506 which provides the signal output of the filter. The signal output of FM demodulator 1506, $v_d$, is connected through voltage controlled oscillator 1508 to a clock input of switched capacitor low pass filter 1504. Switched capacitor low pass filter 1504 has a variable cutoff frequency controlled by the rate of the clock input. Thus, with this connection, the filter cutoff level tracks the sensor signal frequency as the rotational speed of the shaft varies. This feature is particularly useful in cases where wide variance in rotational speed, and thus the signal frequency, is anticipated.

Figure 16:
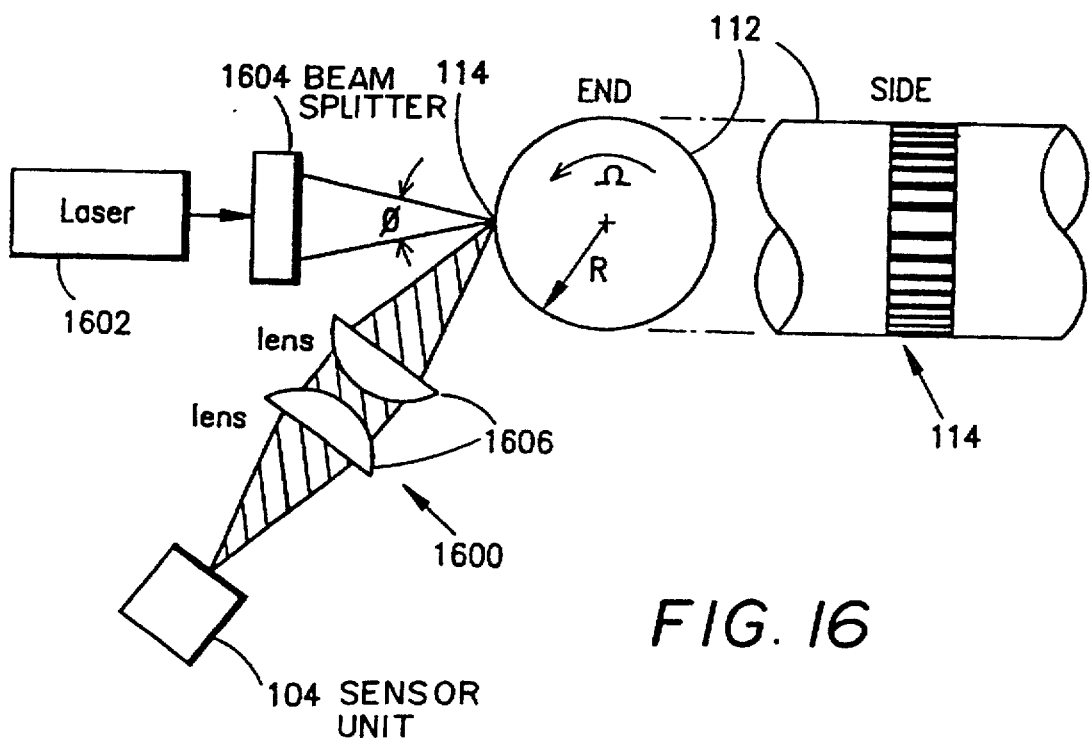
FIG. 16 is a diagram of a synchronous laser doppler velocimeter (SLDV) made according to the invention.

A particularly useful variation of the invention is shown in FIG. 16, which is a diagram of a synchronous laser doppler velocimeter (SLDV) 1600 designed to work with lined shafts according to the invention. SLDV 1600 comprises laser 1602, beam splitter 1604, lenses 1606, and photodiode 220. Laser 1602 generates a coherent light beam which is passed through beam splitter 1604 to produce two light beams aimed at a point on shaft 112 in the region of lines 114, with the beams separated by an angle φ. The convergence of the two beams produces interference fringes on the shaft. The laser and its optics are adjusted so that the interference fringes produced on the shaft coincide in spacing with the lines written on the shaft. As the shaft moves, the projected interference fringes alternately combine and interfere with the alternating light and dark line regions on the shaft. Thus, as each shaft line that passes the spot where the interference fringes are projected, photodiode 220 aimed at the location senses a profound transition between light and dark. The image of these transitions is collected through lenses 1606 and sensed by photodiode 220, which may be provided as part of a sensor unit 104 as disclosed herein with reference to FIGS. 1–3. Of course, when the laser light source is provided as shown in FIG. 16, it is not necessary to provide an IRLED radiation source as part of the photodiode 220. It is also possible to use much simpler optics in the photodetector because of the strength of the image signal produced. The apparatus need only sense alternating levels, and this simplifies the mechanisms for focusing, angular alignment, and imaged line spacing adjustments. Lines 114 are preferably finely spaced lines produced according to the processes and methods disclosed herein.

For an LDV system to be synchronous, the spacing of the lines of the target and the spacing of the interference fringes (lines) of the LDV must be identical, and the two sets of lines must be parallel and in the same plane. Unless done deliberately, this is very unlikely to occur.

The interference fringe spacing d=λ/(2*sin(φ/2)), and signal frequency $f_s$=sin(φ/2)*(2ΩR/λ) Hz. The fringe spacing and inclination angle of the apparatus relative to the shaft axis are adjusted until the interference pattern replicates the grid on the shaft. That is, the Moire fringe pattern between the shaft lines and the laser interference lines should be adjusted to infinite fringe spacing so that the SLDV operates synchronously with the lines on the shaft. The signal generated is preferably processed according to the methods disclosed above for use with the incoherent light photodetection. Thus, the SLDV according to the invention avoids the need for complicated processing circuitry used with conventional LDV systems.

Conventionally, laser doppler velocimeters have not been used in shaft parameter measurement applications in conjunction with lines applied to the shaft. By providing finely spaced lines on the shaft as disclosed herein, and sensing the coincidence of the lines with the projected fringe pattern, a much stronger signal, with a greater signal to noise ratio, is provided as compared to conventional LDVs. Also, there is no phase noise (ambiguity broadening) because the signal maintains phase coherence. It is also possible to achieve higher resolution with the SLDV system, since this method permits movement detection of lines that are much finer than those used with the IRLED optical system disclosed above.

Figure 17A:
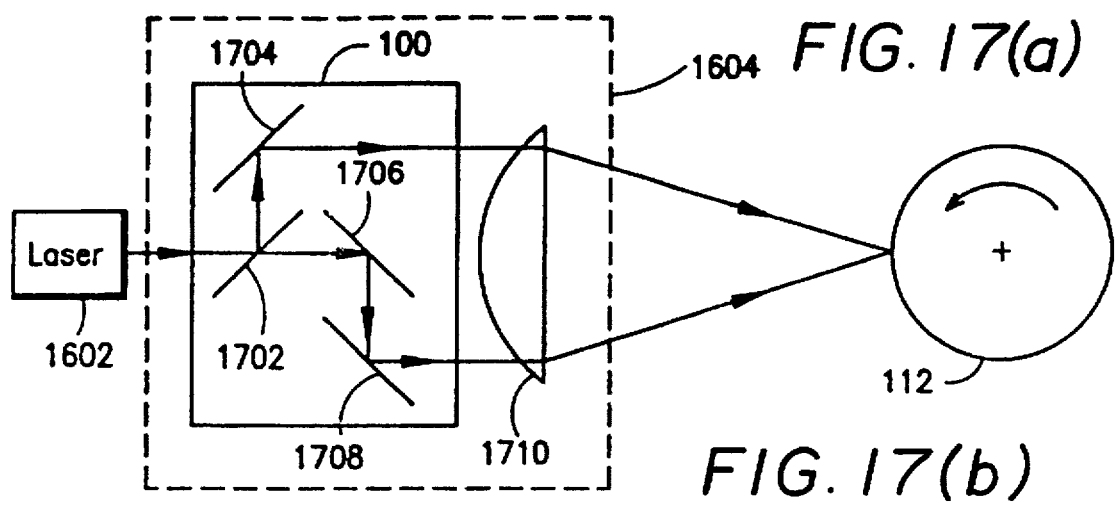
FIG. 17a is a diagram of an SLDV beam splitter useful with the SLDV of FIG. 16.

Beam splitter 1604 may have one of several configurations. For example, a refractive prism system may be used as disclosed in sections 2.12, 4.3, 4.7, and 4.10 of Durst, Melling and Whitelaw, "Principles and Practice of Laser Doppler Anemometry," Academic Press (1976), which is incorporated herein by reference. FIG. 17 shows alternative embodiments of beam splitter 1604 of SLDV 1600. FIG. 17a shows an LDV beam splitter which can be used with the SLDV of FIG. 16 in cases where small fringe spacing is desired. As shown in FIG. 17a, beam splitter 1604 comprises a conventional LDV beam splitting unit 1700. Beam splitting unit 1700 incorporates beam splitter 1702 and mirrors 1704, 1706, and 1708. Optionally, a lens 1710 may also be provided as part of beam splitter 1604 to improve focusing of the two light beams on shaft 112.

Figure 17B:
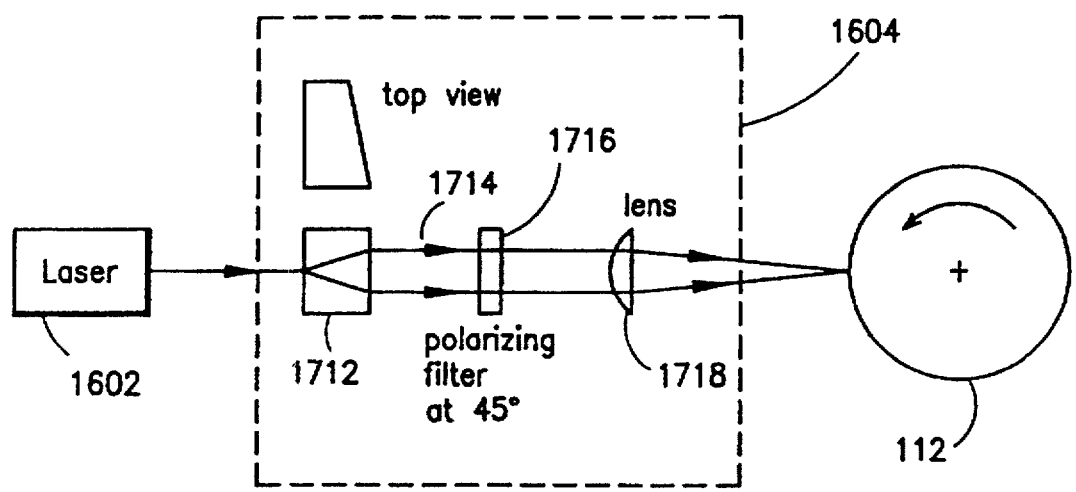
FIG. 17b is a schematic diagram of an alternative beam splitter using a birefringent crystal.

FIG. 17b is a schematic diagram of an alternative beam splitter 1604 using a birefringent material such as calcite. The laser light is passed into a generally wedge-shaped birefringent crystal 1712 which generates a multiple beam output 1714 that passes through polarizing filter 1716 and lens 1718. Polarizing filter 1716 polarizes light at 45 degrees relative to the direction of beam output 1714.

Figure 17C:
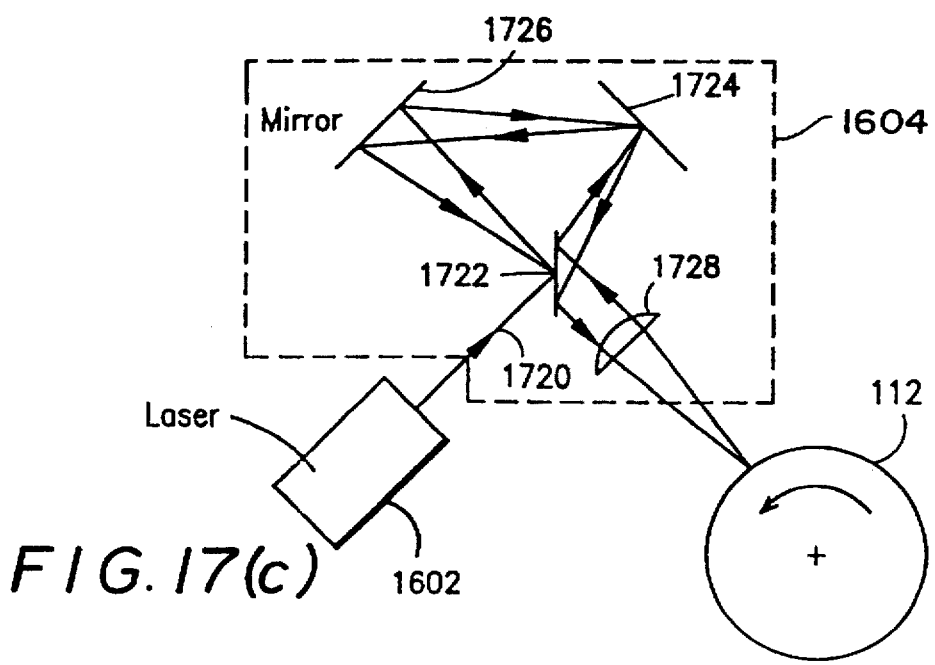
FIG. 17c is a schematic diagram of a third alternative beam splitter incorporating a triangle interferometer.

FIG. 17c is a schematic diagram of a third alternative beam splitter 1604 incorporating a triangle interferometer which is particularly useful where larger fringe spacing is desired. As shown in FIG. 17c, beam 1720 from laser 1602 is passed through a beam splitter 1722 arranged in a triangular formation with mirrors 1724 and 1726 in the configuration shown in the drawing figure. A dual beam produced by the triangular arrangement is passed through a lens 1728 and thus to shaft 112.

Figure 18:
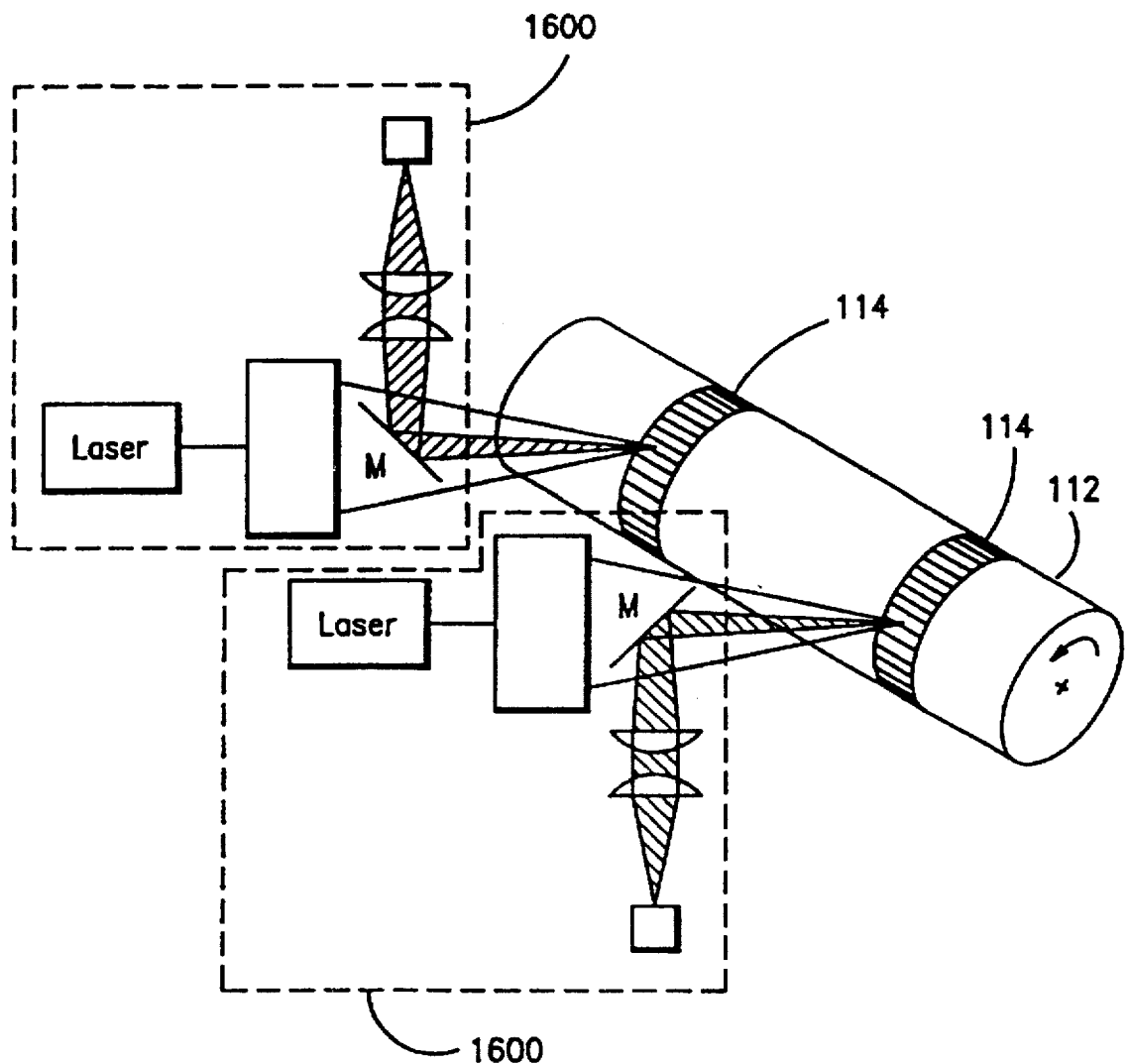
FIG. 18 is a diagram of a torsional interferometer constructed according to the principles of the invention using the SLDV of FIG. 16.

If at least two SLDVs 1600 are provided at axially spaced locations on the shaft 112, as shown in FIG. 18, torsional interferometric measurements can be derived by processing the signals generated by the SLDVs 1600. For proper operation, the SLDVs must operate in phase coherence, which is preferably achieved by writing the two axially separated sets of lines 114 synchronously on the shaft. The synchronized line sets can be written by the processes disclosed above. For small line spacing, it may also be desired to write the lines interferometrically in a manner which will be discussed later. The signals generated by SLDVs 1600 are preferably processed according to the methods disclosed above with particular reference to FIG. 4a to provide relative twist information. Specifically, the number of lines corresponding to the shaft twist must be counted after the index pulse resets. Fractions of lines may be also be interpolated with a phase detector, in the manner disclosed earlier.

Lines may be written on the shaft 112 interferometrically using the arrangement of FIG. 18, except that no receiving optics are required for writing of lines. Photosensitive material is applied to the shaft 112 in the area where lines 114 are to be written. The lasers of the SLDVs 1600 are then synchronously pulsed such that the surface of shaft 112 displaces a distance d (the desired line spacing) between each pulse, where d is matched to the interference fringe spacing. The resulting fringes expose photosensitive material on the shaft, which may be photographic emulsion, photopolymer with stain, photopolymer for etching, or laser ablation machining with (or without) interference fringes. Laser ablation can also be used on a coating or a strip of material applied to the shaft, in cases where laser machining of the actual shaft is difficult or undesirable. The synchronous pulse laser control may be generated by sensing a master line carrier applied to the shaft in the manner disclosed above, or a timed pulse control can be provided based on shaft rotational speed to provide lines at the desired spacing.

In one enhancement of the invention, an initial phase relationship of two axially spaced index lines 1404 is determined, allowing later accurate determination of phase shifts between the axially spaced sets of lines 114 even if the axially spaced index lines 1404 are not precisely in phase. As the shaft is rotated in an unloaded condition, the output of the added photodiode (detecting the passage of a first index line 1404) is provided to counter 426 of phase detector circuit 422 (shown in FIG. 4a) to reset counter 426 when index line 1404 from the first strip passes the photodiode. Counter 426 then counts passing lines until index line 1404 for the second strip (axially spaced from the first strip) is detected. The resulting count is stored in the counter 426 of the other phase detector circuit 422 before initiation of phase difference detection, as a preloaded offset value, representing the number of lines (in units and fractions) zero-torque physical offset between the first index line 1404 and the second index line 1404.

Figure 19:
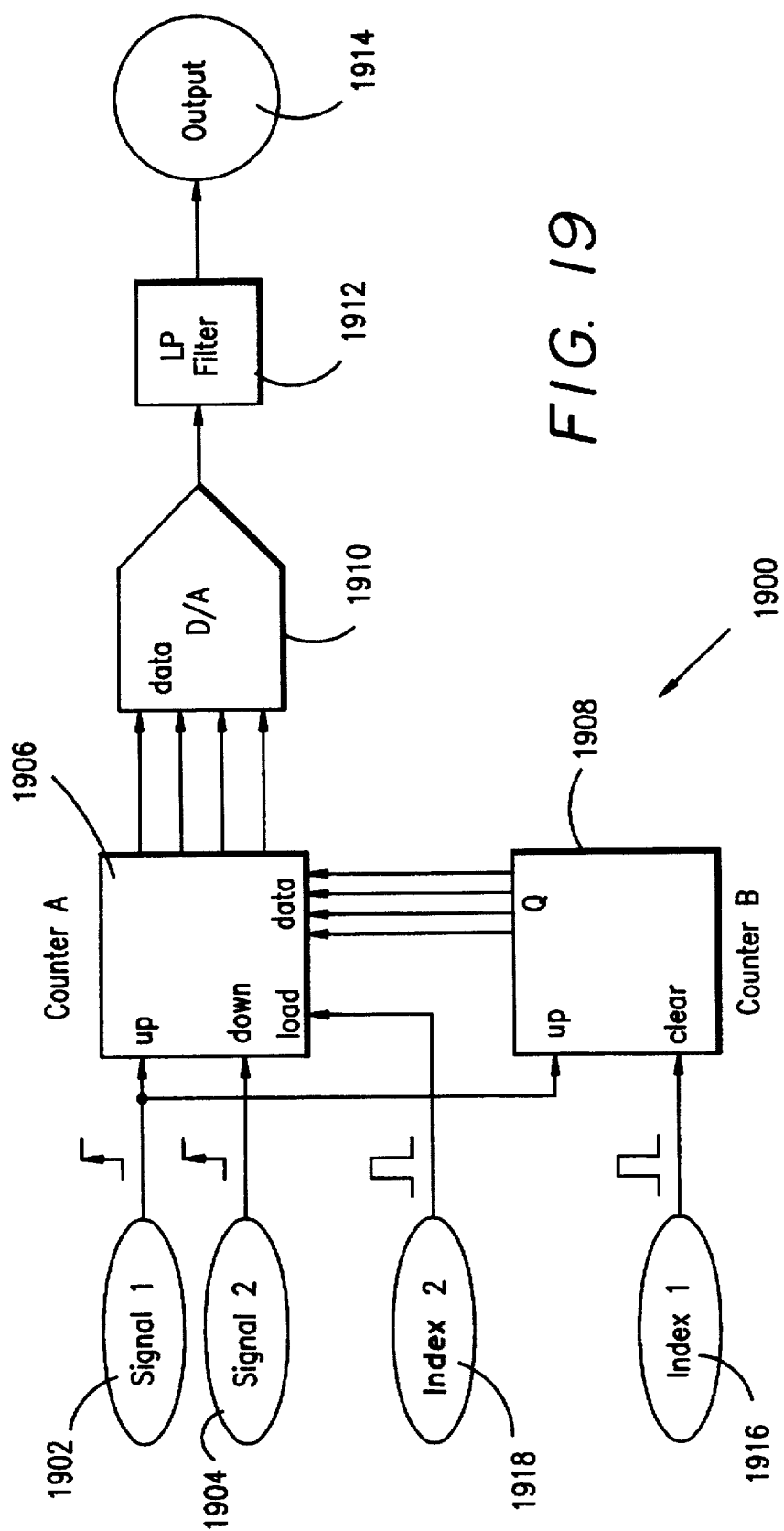
FIG. 19 is a simplified block schematic diagram of an extended range phase detector circuit according to the invention.

FIG. 19 is a simplified block schematic diagram of a preferred, extended range phase detector circuit 1900 according to the invention, which may be used in the circuit of FIG. 4a, in place of phase detector circuits 422. Extended range phase detector circuit 1900 combines a counter and a phase detector to produce a measure of the number of lines (both integer and fractional parts) of phase shift between a first input signal 1902 and a second input signal 1904.

Phase detector circuit 1900 comprises a first counter 1906, a second counter 1908, a digital to analog converter 1910, and a low pass filter 1912. First signal 1902 and second signal 1904 are connected to the up and down counter inputs respectively of counter 1906. The parallel digital bit outputs Q of counter 1906 are connected to the inputs of D/A converter 1910. The analog voltage output of D/A converter 1910 is connected to the input of low pass filter 1912, and the output of low pass filter 1912 is the output 1914 of phase detector circuit 1900. First signal 1902 is also connected to the up counter input of second counter 1908. A first index signal 1916, generated upon the passage of an index line 1404 near the lines 114 generating first signal 1902, is connected to the "clear counter" input of second counter 1908. A second index signal 1918 is connected to the "load counter" input of first counter 1906. The output lines Q of second counter 1908 are connected to input data lines of first counter 1906.

Each time first signal 1902 pulses to increment first counter 1906 without a corresponding decrement signal from second signal 1904, first counter 1906 advances one unit. D/A converter 1910, together with low pass filter 1912, effectively integrate the output of first counter 1906 to produce a voltage level proportional to the average phase difference (to fractions of line spacings) between first input signal 1902 and second input signal 1904.

For applications where there is a position or time origin it is desirable to include a way to compensate an initial difference in origins between two sensor signals. By connecting the index line sensor outputs, comprising first index signal 1916 and second index signal 1918 through second counter 1908 as shown, it is possible to subtract out mismatches in placement of index lines on a shaft at two axially spaced locations, as follows:

Second counter 1908 is reset when the index line from the first strip is detected, and counts lines passing until the index line from the second strip is detected. The resulting count in second counter 1908 represents the number of lines of phase difference attributable to noncoincidence of the two separated index lines. The passage of the second index line preloads the index line offset count into first counter 1906, thus keeping track of the offset. The timing of the count transfer allows the first counter to also keep track of the offset to a small fraction of a line. The offset can be measured during a zero load condition and subtracted from the data. Any subsequent change in the offset is due to loads and displacements to be measured. Although second counter 1908 continues to count after loading the first counter, its count is ignored until the process starts again with a pulse of first index signal 1916.

Figure 20:
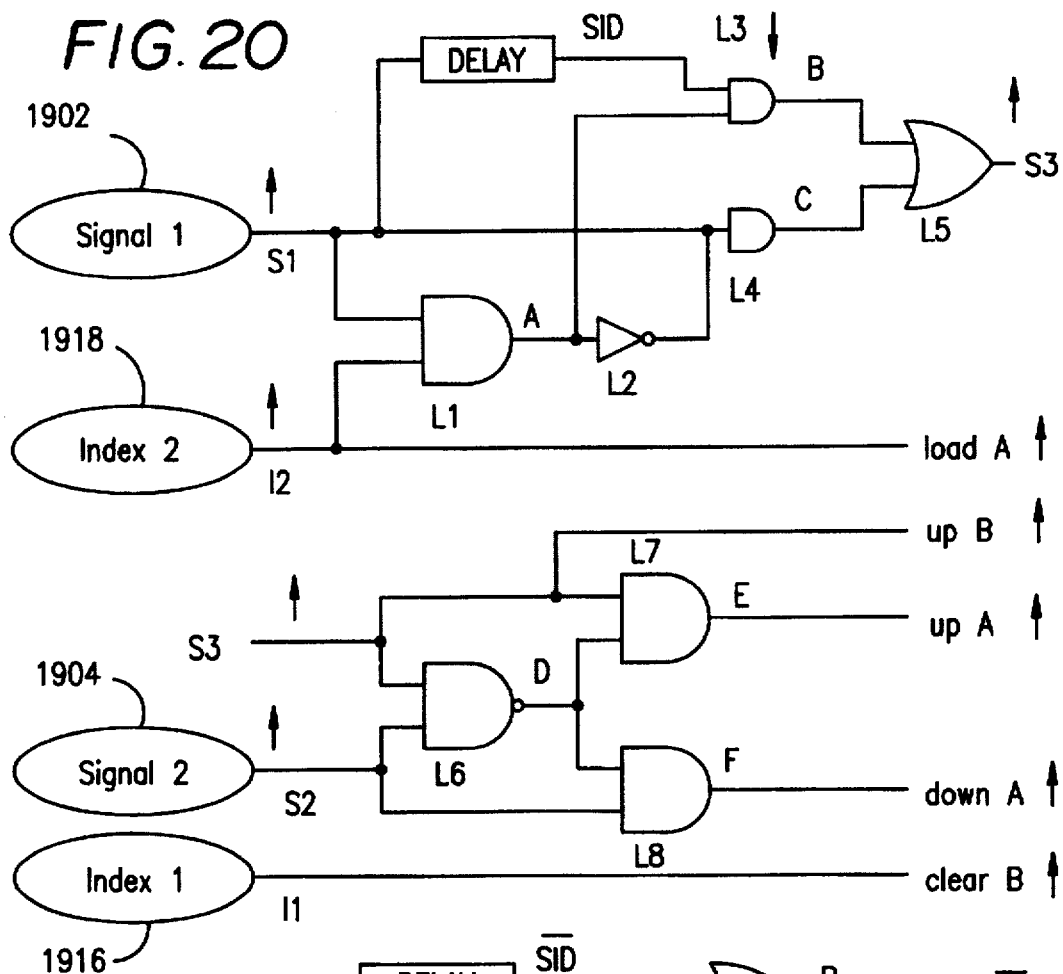
FIG. 20 is a diagram showing details of control logic used in the circuit of FIG. 19.
Figure 21:
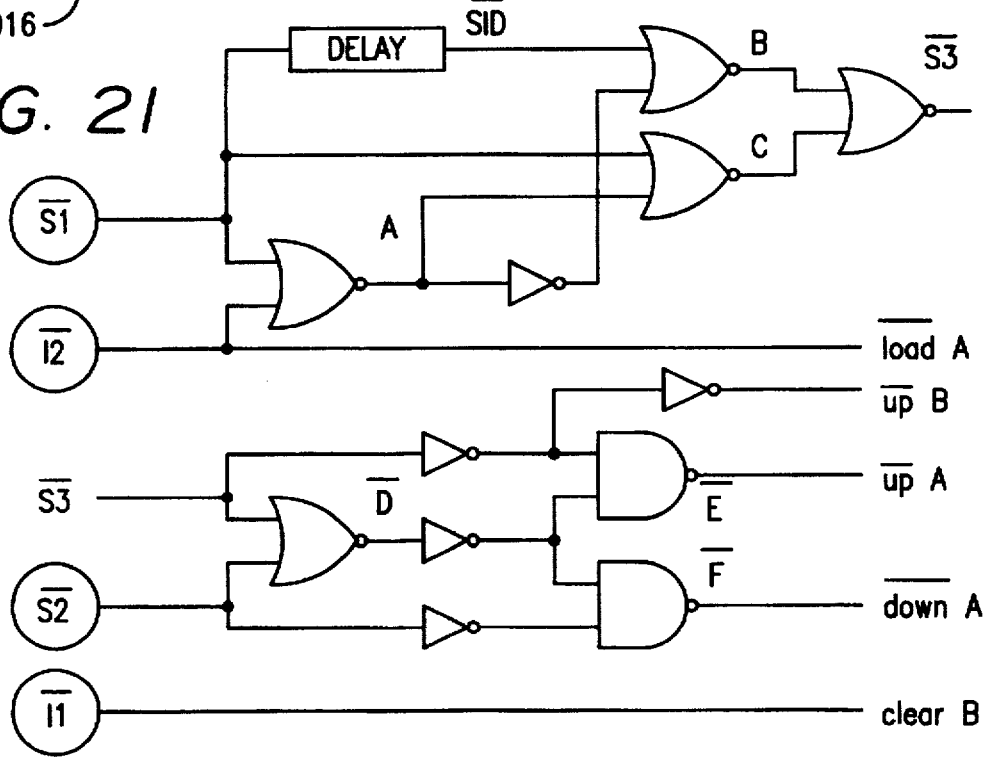
FIG. 21 is a logic diagram showing an implementation of the circuit of FIG. 20 using conventional components.

FIG. 20 is a diagram showing details of control logic used to replace input signals 1902, 1904, 1916 and 1918 in the circuit of FIG. 19. If any two inputs to a counter in FIG. 19 are asserted in an overlapping fashion, the outcome is unpredictable. Therefore, it is necessary to prevent coincidence of up and down signals to counter 1906, up and load signals to counter 1906, down and load signals to counter 1906, and up and clear signals to counter 1908. Preferably, the pulse widths used are tailored to be as small as possible, consistent with proper operation of the counters employed, but coincident signals must still be locked out for proper operation. Pulse width varying and delaying circuits which are conventional in the art are provided, but are omitted from the drawings for clarity. Referring now to FIG. 20, most of the time first signal 1902 and second index signal 1918 will not be asserted at the same time. In this situation L1 output A will be low, L4 will be enabled, and L3 disabled. First signal 1902 will be conveyed through L4 and L5 to output S3. However, if first signal 1902 and second index signal 1918 occur simultaneously, output A of L1 is asserted, enabling L3 and disabling L4. The result is a delayed first signal 1902 passing to S3 to avoid coincidence. Of course, this results in a phase detection error, but only for one cycle, and only in the range of 100 nsec for typical 74HC logic circuits.

Another portion of the circuit in FIG. 20 checks for coincidence of first signal 1902 (S3) and second signal 1904. When a coincidence occurs, outcome D of L6 disables L7 and L8 so neither the up nor the down count passes to first counter 1906. It is also necessary to convey signal S3 to the second counter 1908 up input.

The logical relationships in the circuit of FIG. 20 are as follows: S3=B+C; B=S1D*A; C=S1*NOT(A); A=S1*I2; E=S3*D; F=S2*D; D=NOT(S2*S3). FIG. 21 is a circuit diagram showing an implementation of the circuit logic of FIG. 20 using conventional inverted hardware components.

The inventors have found that application of a pair of prelined strips to a shaft introduces phase variations between them, due to, for example, variations of adhesive thickness, inaccuracies in line formation, and irregularities in the seam at the ends of the strip. By measuring a phase difference between the line positions at the two axially spaced locations as the shaft is slowly rotated with approximately zero torque, zero thrust, and zero lateral and axial displacement, a baseline phase difference condition is established which may be subtracted from data taken during other shaft operation to correct for these phase variations. This method is particularly useful in cases where lined strips of photographic material are applied to a shaft and used for operational sensing.

If data are taken synchronized with the passage of lines, the subtraction can be carried out for each line passage. In this way the correction is valid for any rotation speed. The baseline subtraction method, particularly when used with the improved counter-based phase processor described with reference to FIGS. 19-21, allows resolution of displacements at least on the order of 0.2 micrometers (or 10 microinches) using prelined strips.

Figure 22:
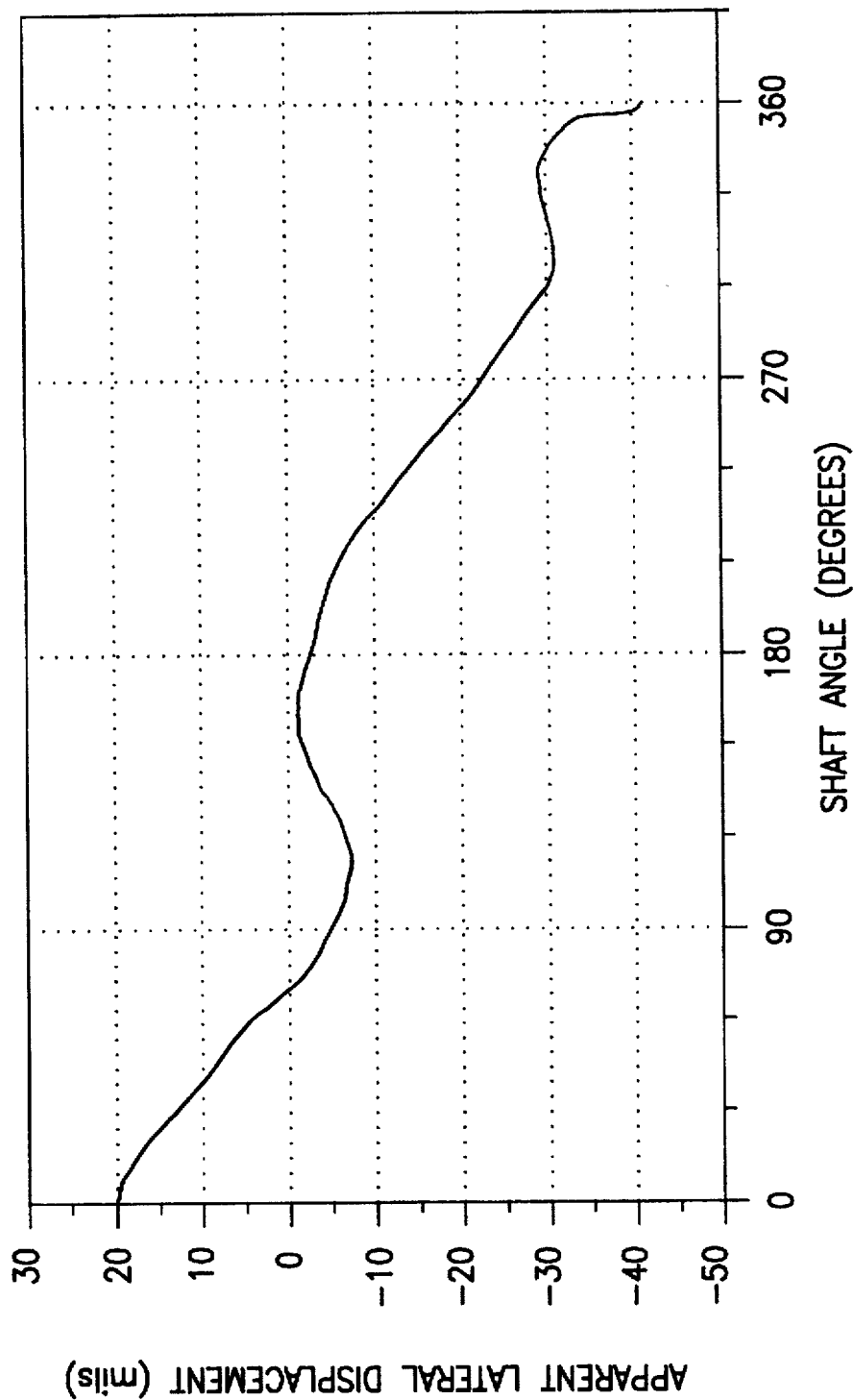
FIG. 22 is a graph of two nearly indistinguishable sets of measurements of a zero-torque phase shift baseline for a shaft with two axially spaced lined strips with slightly different numbers of lines.
Figure 23:
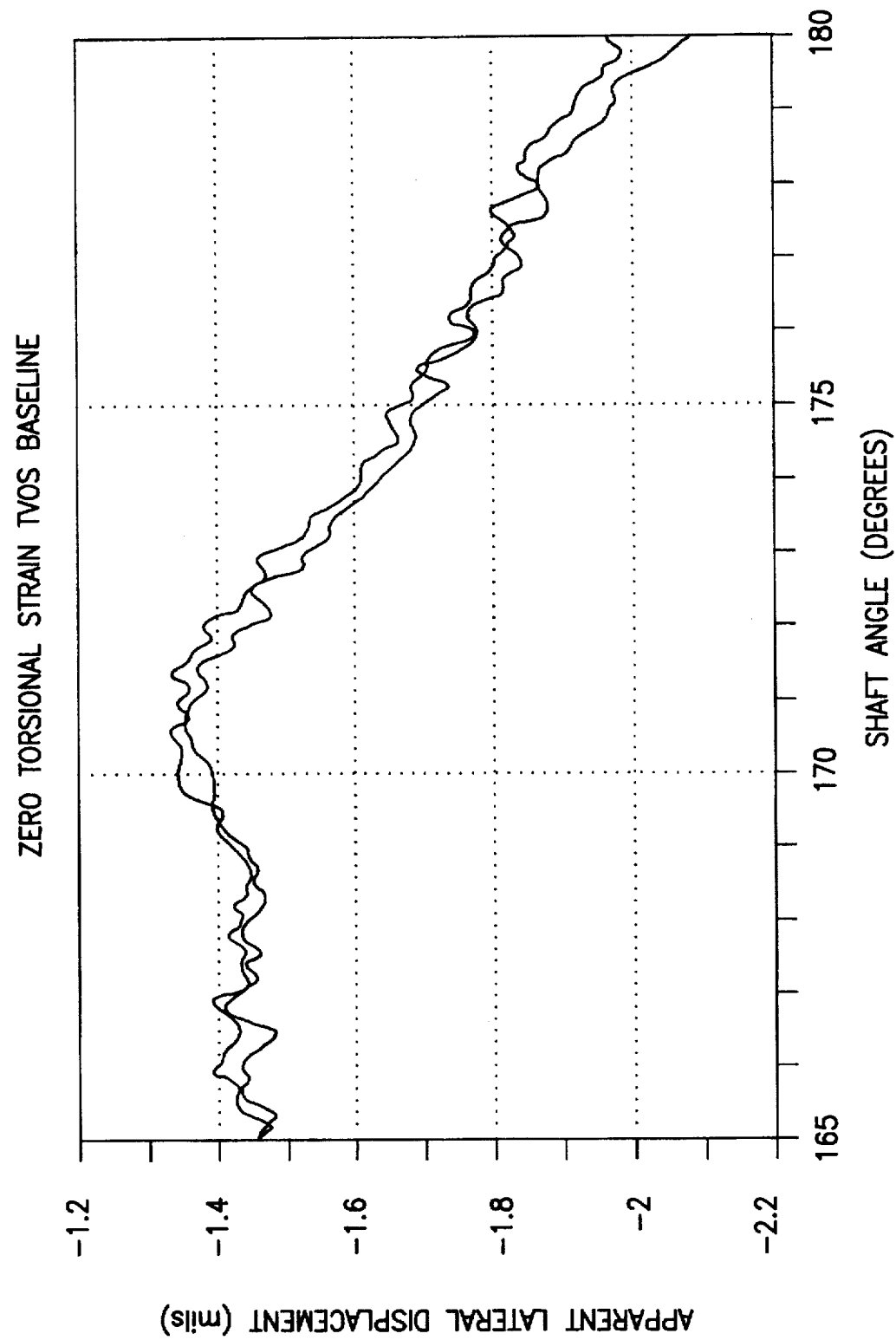
FIG. 23 is a graph of a magnified section of the baseline data of FIG. 22.
Figure 24:
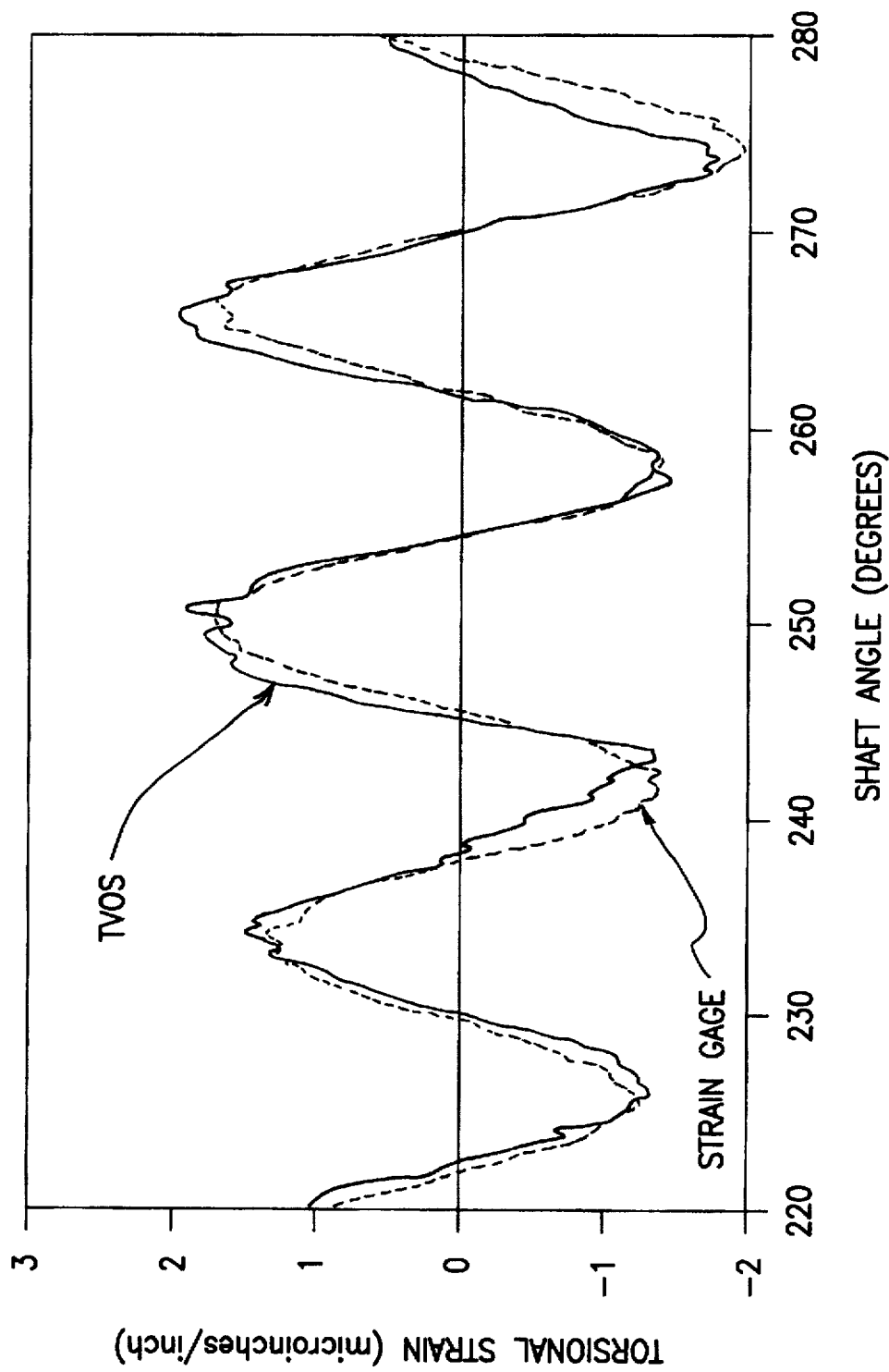
FIG. 24 is a graph showing the correlation between strain measurements of the invention with baseline correction, and measurements taken using a highly accurate semiconductor strain gage.

FIG. 22 is a graph of two sets of measurements of a phase shift baseline, taken at approximately zero torsional strain. In this example, the diameter of the shaft was slightly different at the two axially spaced locations, so that there were eight more lines at one location than at the other. The phase displaces approximately eight cycles (65 mils) before it is reset by the index lines. Deviations from a straight line are due to runout, adhesive thickness variations and the seam in the lines. The portion of the data collected in FIG. 22 is shown greatly magnified in the graph of FIG. 23. The value of the established baseline (apparent lateral displacement) for each shaft angle is then automatically subtracted from phase shifts measured by the system at that shaft angle during operation. FIG. 24 is a graph showing a comparison of strain measurements taken with the invention at its minimum sensitivity range, applying the baseline correction of FIG. 22, with semiconductor strain gage measurements taken at the maximum sensitivity of the strain gage. The data were collected simultaneously at a speed near the 22nd harmonic shaft resonance. Measured DC strain was removed for comparison purposes and the strain gage amplitude was corrected to compensate for strain gage miscalibration or drift. Once the zero strain baseline is subtracted, the corrected phase represents only additional strains of the shaft. The measurement data shown in FIG. 24 demonstrate that the inventive baseline subtraction corrects strain measurements even in cases where there is a large mismatch between line positions at the axially spaced line locations. A resolution of 10 microinches, corresponding to 0.1 microinch/inch of torsional strain, was achieved using the disclosed baseline correction method.

FIGS. 25a and 25b show a split collar assembly which can be used to removably attach lines to a shaft. FIG. 25a is a side sectional view of a pair of double split collars, and FIG. 25b is an end view of the same split collars. Benefits of this split collar assembly include the ability to reposition lines 114 to various points along a shaft, or to move lines 114 from one shaft 112 to another for a sequence of tests. Typically, split collars attached to cylindrical or tubular members have at least one gap to allow clamping. If lines were attached to such a collar, they would have a gap as well. To avoid a gap, the combined double collar assembly shown in FIGS. 25a and 25b is provided. Collar assembly 2502 comprises split clamping collar 2504, lined collar 2506, shaft clamp 2508, and ring clamp 2510. Split clamping collar 2504 is clamped to shaft 112 using shaft clamp 2508. Lined collar 2506, which may or may not be split, bolts to the end of split clamping collar 2504. Lined collar 2506 has a larger inside diameter than split clamping collar 2504, and does not touch shaft 112. In the embodiment shown in FIGS. 25a and 25b, lined collar 2506 is provided in two semicircular pieces which are assembled by means of ring clamp 2508 and then bolted to split clamping collar 2504. Lined collar 2506 is clamped tightly closed with alignment pins to keep its two halves aligned. Lines 114 may be placed on the outside diameter of lined collar 2506 without a gap. Lines 114 may be printed or etched onto lined collar 2506, using methods described earlier, so that the lines have no phase dislocation or seam, whether lined collar 2506 is split or not. Splitting lined collar 2506 permits assembly from the side of the shaft; otherwise, lined collar 2506 is installed by sliding it over the end of shaft 112.

A prism assembly useful in compensating for significant axial displacement will now be described with reference to FIGS. 26a and 26b. The optics (lenses, masks, etc.) in sensor units 104 which detect lines 114 and index lines 1404 are preferably shared. This requires that lines 114 and index lines 1404 be close to each other in the plane of the mask. With optics that make the image of lines 114 on the mask the same as the spacing of lines 114 on the shaft, lines 114 and index line 1404 on shaft 112 must be close to each other and aligned with the corresponding lines on the mask. In this situation, an axial shaft displacement of more than approximately ⅛ inch typically results in loss of the signal.

Figure 26A:
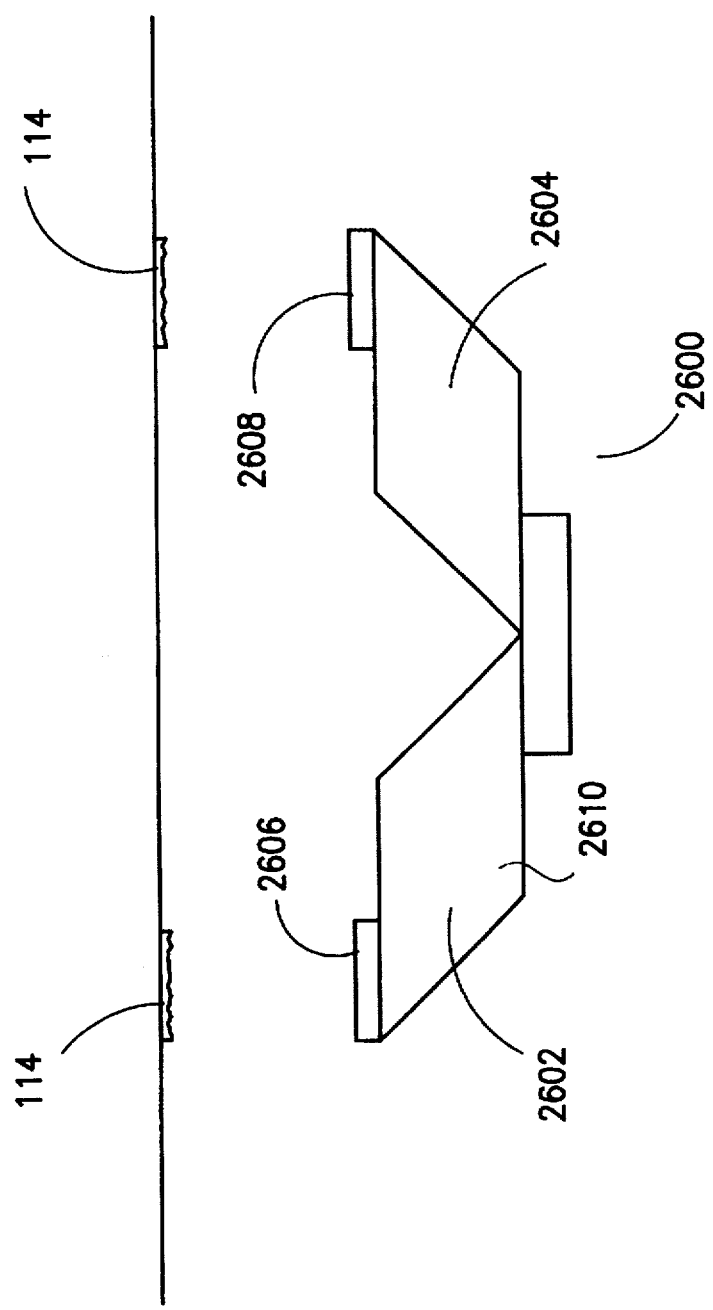
FIG. 26a is a top view of an optional prism assembly used with the invention.
Figure 26B:
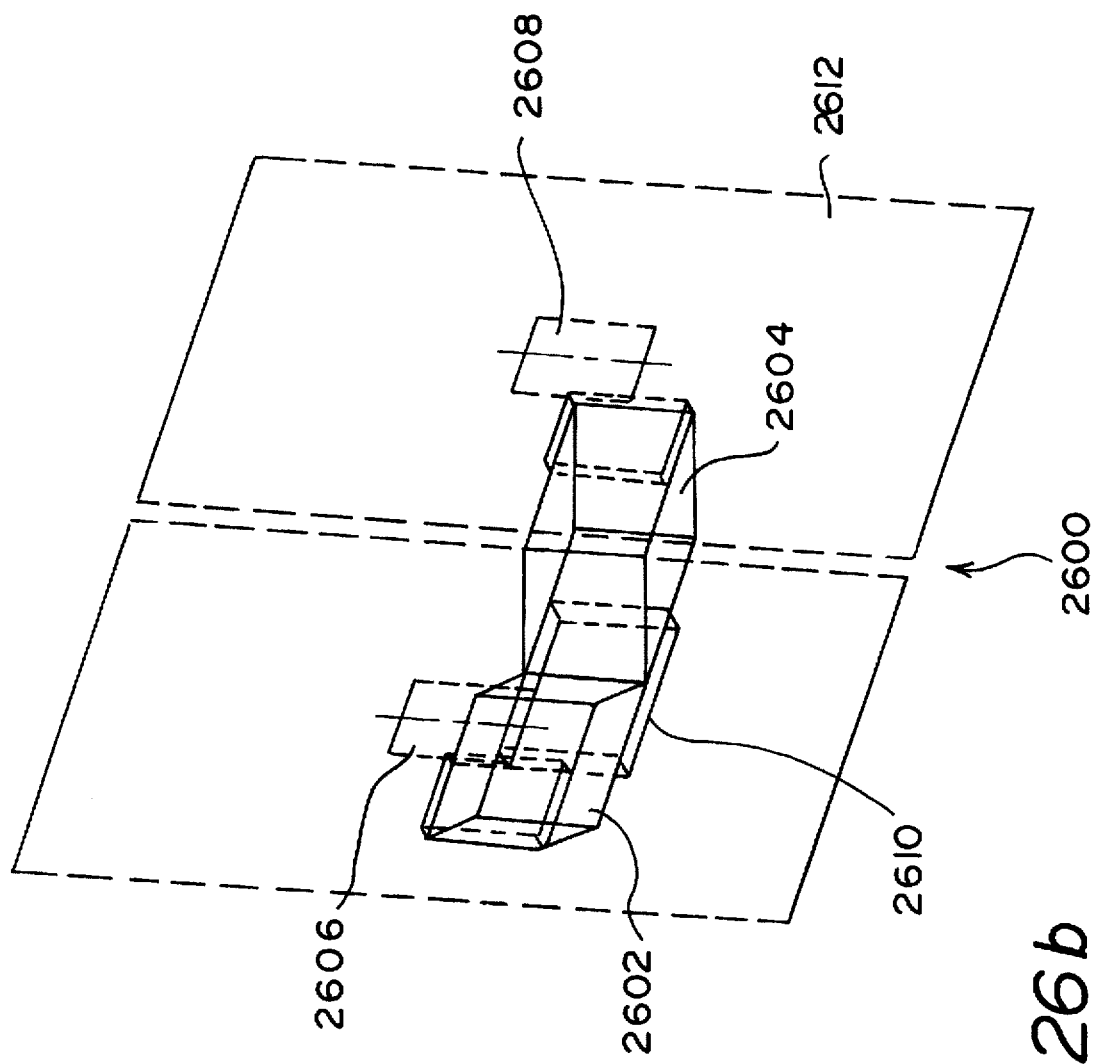
FIG. 26b is an oblique view of the same prism assembly.
Figure 27C:
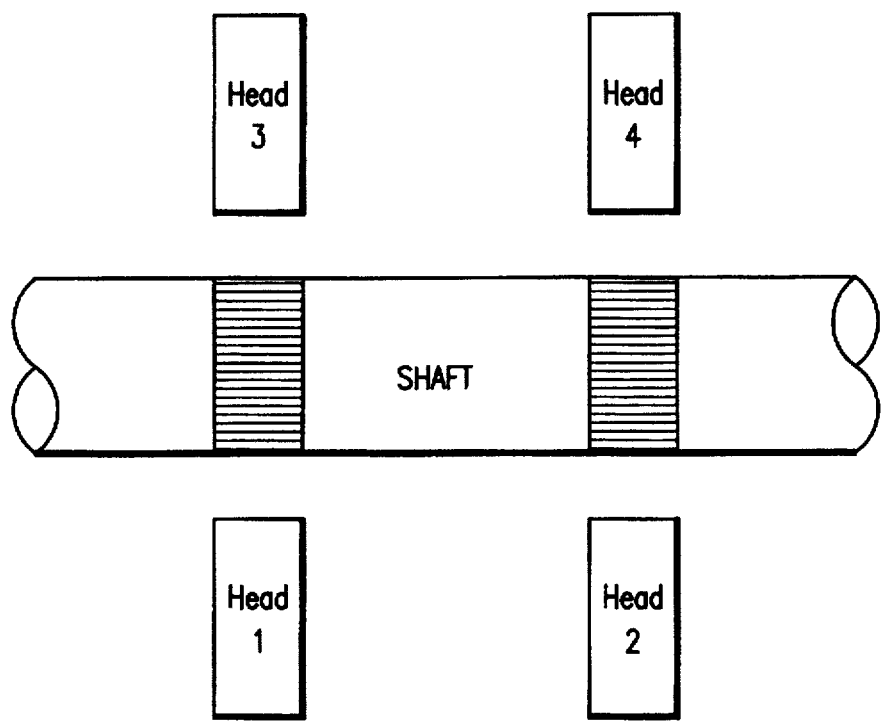
Figure 27F:
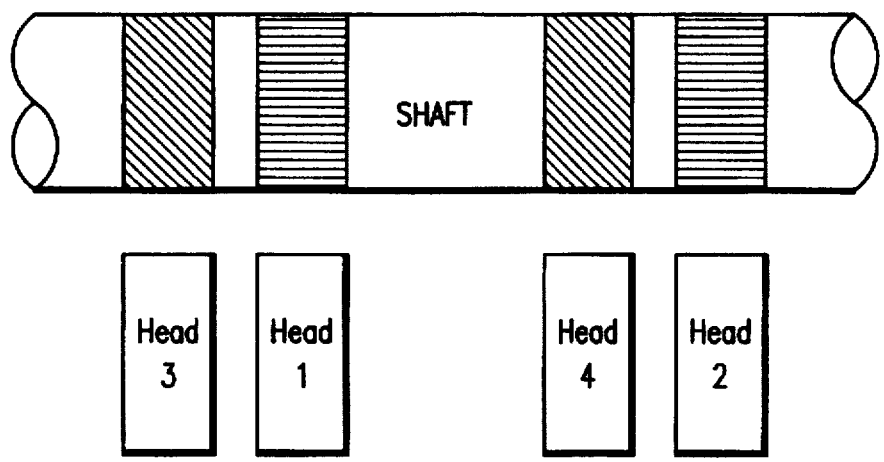
Figure 27G:
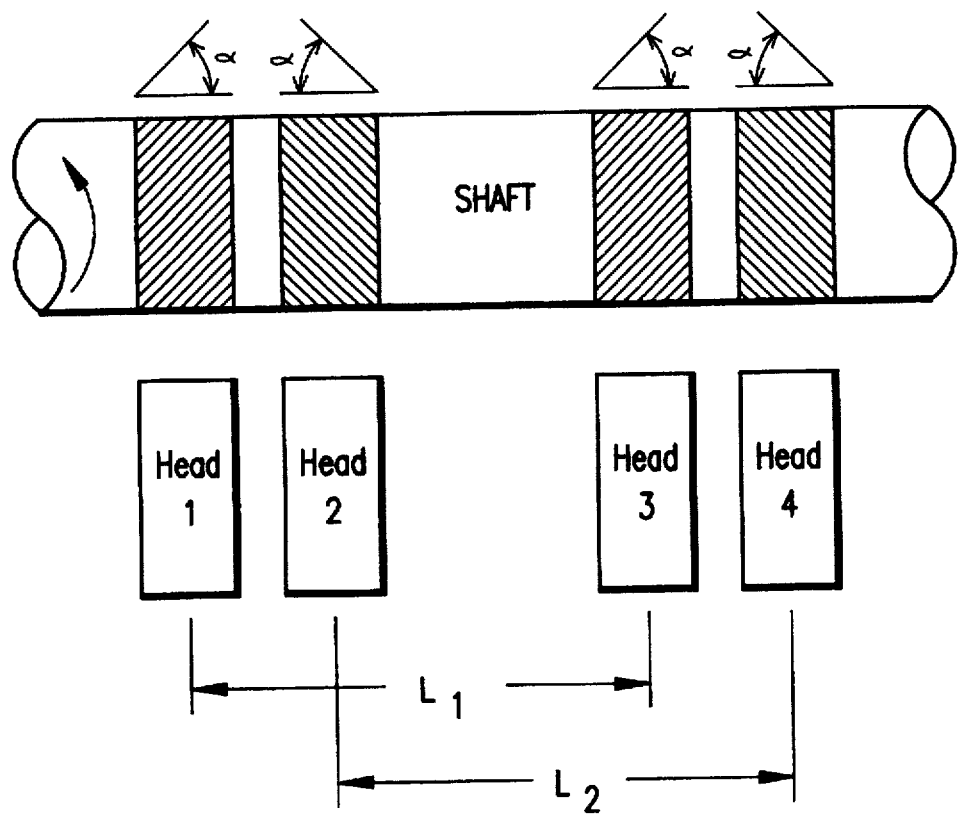

To extend the allowable range of axial displacement, a prism assembly 2600 comprising prisms 2602 and 2604 is added to the optical path as shown in FIGS. 26a and 26b. Prisms 2602 and 2604 allow lines 114 and index line 1404 to be separated by the combined displacement of the two prisms. The lines on the shaft may thus be extended over a range of the displacement of two such prisms. Typically, prisms 2602 and 2604 are sized so that their combined displacement is approximately 1.4 inches. Thus, prism assembly 2600 collects an image from axially separated windows 2606 and 2608 and transmits the image through window 2610 to the shared optics of sensor unit 104. Prism assembly 2600 may also be provided with a field stop mask 2612 to reduce the incidence of ambient light transmitted through prism assembly 2600.

Rotating shafts, including those in magnetic bearings, can be servo-controlled using the inventive apparatus as a shaft position and torque monitor. Because the position measurements provided are in real time with fast response, they are suitable for feedback control applications ranging from vibration control to servo-positioning, servo-magnet bearing control, speed control and torsion control.

Figure 28A:
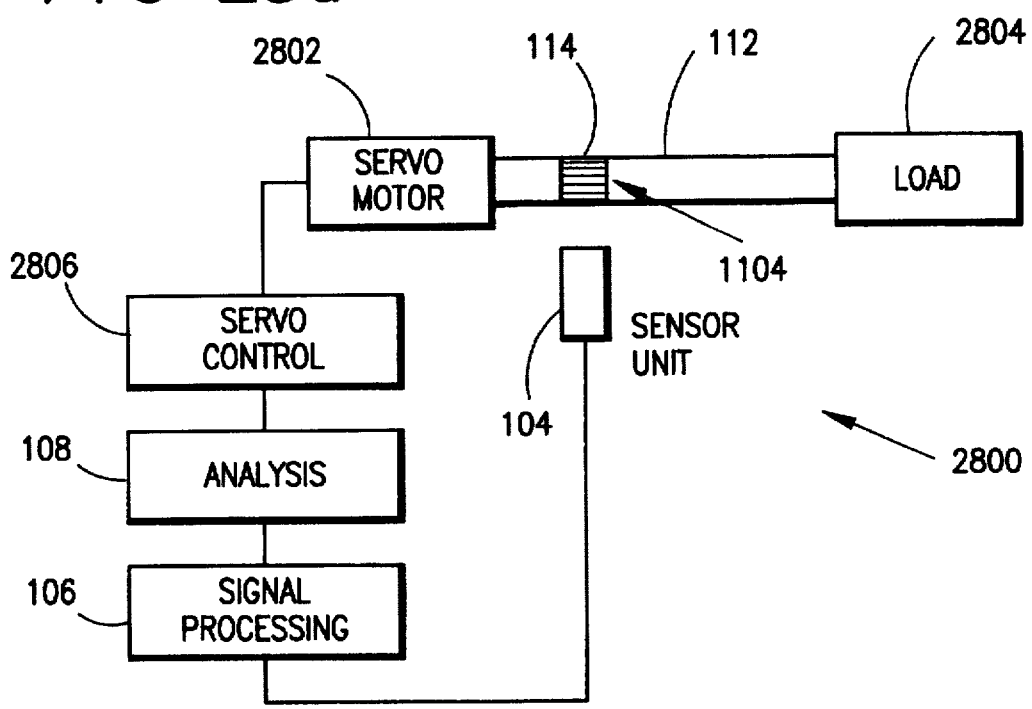
FIG. 28a is a block schematic diagram of a servo-motor control system incorporating the inventive apparatus and methods.

FIG. 28a is a block schematic diagram of a servo motor control system based on the invention. Servo motor control system 2800 comprises servo motor 2802, servo control 2806, shaft 112, lines 114, index line 1404, sensor unit 104, signal processing circuits 106, and analysis circuits 108. Servo motor 2802 is connected to drive load 2804 through shaft 112. Shaft 112 carries one or more sets of lines 114 and index lines 1404, the passage and position of which are sensed by one or more sensor units 104, depending on the parameters to be servo-controlled, in the manner disclosed above. Sensor units 104 are connected to signal processing circuits 106 which process the signals generated by sensor units 104 and provide an output indicating the passage of lines to analysis circuits 108. Analysis circuits 108 determine the position of the shaft, the speed of the shaft, torsion on the shaft, and/or axial strain on the shaft, as required depending on the servo control objectives, based on input from signal processing circuits 106. Analysis circuits 108 transmit this information to servo control 2806, which is a conventional servo control circuit (such as a proportional-integral-derivative controller). In this manner, servo control 2806 controls operation of servo motor 2802 to accurately establish a desired speed and position of the shaft and/or load 2804 based on the shaft parameters determined by the measuring methods of the present invention.

Figure 28B:
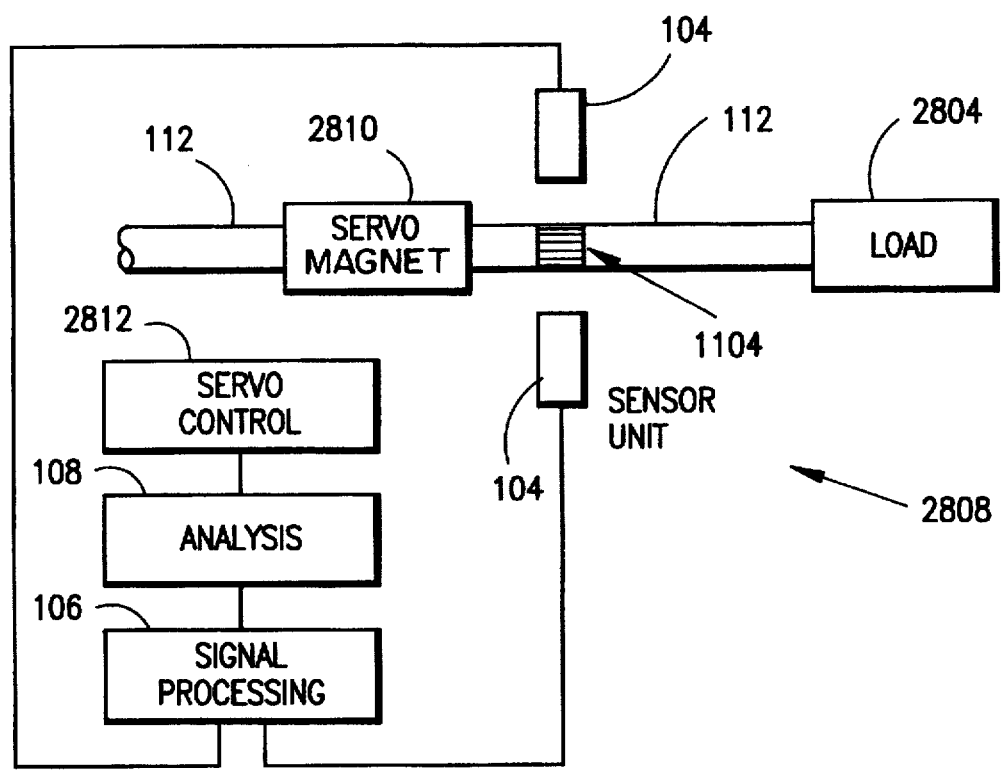
FIG. 28b is a block schematic diagram of a servo-magnet control system incorporating the inventive apparatus and methods.

FIG. 28b is a block schematic diagram of a servo-magnet control system 2808 for precisely controlling the positioning of a shaft held by a magnetic bearing, based on the optical sensing technology disclosed herein. Servo-magnet control system 2808 comprises servo-magnet 2810, servo control 2812, shaft 112, one or more sets of lines 114, index lines 1404, a plurality of sensor units 104, signal processing circuits 106, and analysis circuits 108. Servo-magnet 2810 is connected to precisely position shaft 112 by varying a magnetic field suspending shaft 112. Shaft 112 carries a plurality of sets of lines 114 and index lines 1404, the passage and position of which are sensed by the plurality of sensor units 104. Sensor units 104 are connected to signal processing circuits 106 which process the signals generated by sensor units 104 and provide an output indicating the passage of lines to analysis circuits 108. Analysis circuits 108 determine the lateral position of the shaft, and may also determine the speed of the shaft, torsion on the shaft, and/or axial strain on the shaft and/or load, as required depending on the servo control objectives, based on input from signal processing circuits 106. Analysis circuits 108 transmit this information to servo control 2812, which is a conventional servo-magnet control circuit (such as a proportional-integral-derivative controller). Servo control 2812 controls operation of servo-magnet 2810 to accurately establish a desired position, torsional strain, and/or axial strain of shaft 112 and/or load 2804 based on the measuring methods disclosed herein.

Figure 29A:
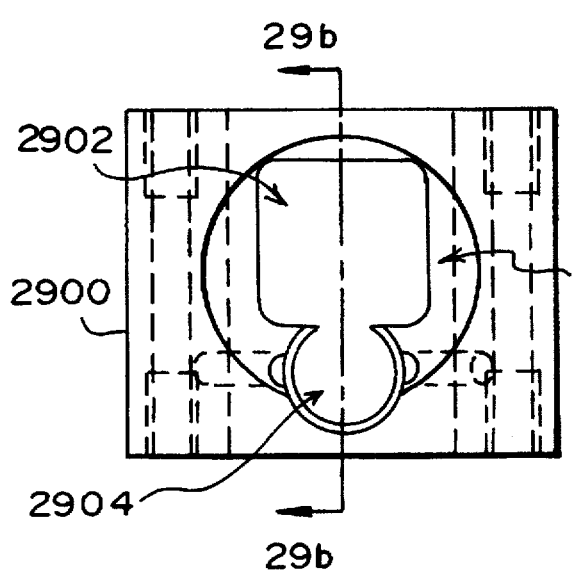
FIG. 29a is an end view of a photodiode mount for installing both primary line detection and index line detection photodiodes to use the same optical components in a sensor unit.
Figure 29B:
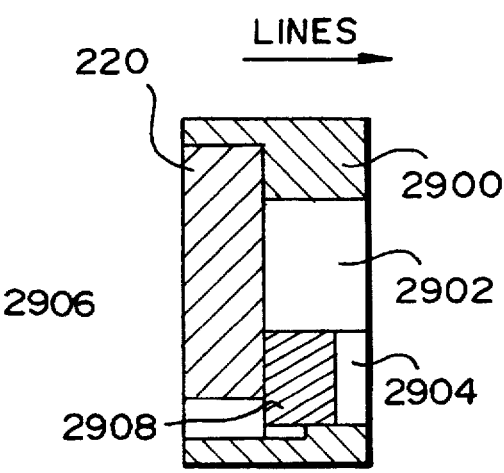
FIG. 29b is a side sectional view of the photodiode mount of FIG. 29a showing the installation of the primary line detection photodiode and the index line detection photodiode.

FIGS. 29a and 29b show a mounting arrangement for locating line detection photodiode 220 and index line detection photodiode 2908 to detect the image of lines 114 and index lines 1404. FIG. 29a is an end view of a photodiode mount 2900 formed with a line detection viewport 2902, an adjacent index line detection viewport 2904, and a line detection photodiode mounting recess 2906 behind line detection viewport 2902. Photodiode mount 2900 is installed on turret disk 216 (shown in FIGS. 2a and 2b) in the location shown for photodiode 220 in FIG. 2b.

FIG. 29b is a side sectional view of photodiode mount 2900 showing the installation of line detection photodiode 220 and index line detection photodiode 2908. Index line detection photodiode 2908 may be a Model No. PIN 3D photodiode manufactured by United Detector Technology. Index line detection photodiode 2908 is installed in index line detection viewport 2904, and the primary line detection photodiode 220 is installed behind index line detection photodiode 2908. The two photodiodes are then connected respectively to two sets of generally identical signal processing circuits 106 (described above) which effectively detect the passage of lines 114 and index lines 1404, respectively based on the photodiode signal output. Line detection viewport 2902 has a generally rectangular shape to correspond to the sensitivity pattern of the preferred photodiode 220. Using photodiode mount 2900, the two photodiode systems can be effectively mounted to share a single optical arrangement in a sensor unit 104 of the type described above with reference to FIG. 2a.

Thus, a monitoring system has been disclosed that provides a high angular resolution and high frequency response with low cost, no moving parts, no contact with the shaft, and which in many embodiments requires no machining or other permanent changes to the shaft. The system can be easily and quickly retrofitted to existing shafts, and can be added and serviced while at sea. The apparatus is interchangeable, transferrable, and portable, in that the same system is provided for all shafts. Only the lines on the shaft are not interchangeable. The system disclosed is also very rugged, and can withstand large vibration and shock loads and resume functioning. Further, the system can be adapted to operate underwater in applications where such operation is desired.

In testing of an actual IRLED system constructed according to the invention, on a shaft 2.4" in diameter with a pair of matched, seamless sets of over 1000 lines each, the following specifications were achieved: Minimum surface speed, 0.03 meters/sec; Maximum surface speed, 50 m/s; and rotational rates of 1–25,000 rpm and higher. The empirical data showed resolution of 1/1000 of the selected maximum rotational speed, plus or minus one line count with plus or minus 0.01 line repeatability, and torsional strain resolution of 0.2 micrometers for a shaft 3" in diameter, 1 arc-second. Further improvements in specifications can also be achieved using the principles disclosed herein.

We claim:

1. A system for analyzing nonrotational movement of a moving shaft having a central longitudinal axis and having a first set of grid lines spaced about its circumference formed at a first angle to the central longitudinal axis and a second set of grid lines spaced about its circumference and formed at a second angle different from the first angle, comprising:

first and second optical detection means mountable at fixed positions proximate to the first and second sets of grid lines respectively, for detecting the passage of lines at said first and second angles respectively and producing output signals varying with movement of the grid lines relative to optical grid images generated by the optical detection means; and processing circuit means connected to said first and second optical detection means for receiving said output signals and generating an output indicative of at least one of displacement of the central longitudinal axis of the shaft and displacement of the shaft along its central longitudinal axis, at a location of said first and second sets of grid lines.

2. The system of claim 1 wherein said processing circuit means further comprises means for generating an output indicating at least one of rigid body displacement and elastic deformation.

3. The system of claim 1 wherein said second set of grid lines is formed at a location axially spaced from a location of said first set of grid lines and wherein said first and second optical detection means are located proximate to said first and second locations, respectively.

4. The system of claim 3 wherein a third axially spaced set of parallel lines, formed at a third angle differing from each of said first and second angles, is provided at a third location on the shaft axially spaced from said first and second locations, and wherein the system further comprises a third said optical detection means located proximate to said third location and connected to said processing circuit means for generating output signals indicative of movement of lines at said third location.

5. The system of claim 4 wherein at least one of said optical detection means comprises a plurality of optical detection subsystems arranged at angular intervals about the shaft.

6. The system of claim 5 wherein at least one of said optical detection means comprises four optical detection subsystems arranged at ninety degree intervals about the shaft.

7. The system of claim 5 wherein the second optical detection means is located between the first and third optical detection means proximate to the shaft, and said first and third optical detection means comprise four optical detection subsystems arranged at ninety degree intervals about the shaft, each said optical detection subsystem generating an output signal to the processing circuit means representative of movement of the lines adjacent to said optical detection subsystem with respect to a grid image.

8. The system of claim 1 further comprising synchronization means for detecting passage of a predetermined point on the shaft and generating a synchronizing signal to said processing circuit means.

9. The system of claim 3 further comprising shaft twist compensation means connected to the processing circuit means for determining a component of phase shift between the output signals of the first and second optical detection means attributable to shaft twist and subtracting said component attributable to shaft twist from the output indicative of shaft displacement.

10. The system of claim 1 wherein said first and second sets of grid lines are superimposed in a single position, about the circumference of the shaft.

11. The system of claim 10 further comprising optical means for imaging a portion of said superimposed grid lines on both said first and second optical detection means.

12. The system of claim 11 wherein the first and second optical detection means each comprise an optical grid aligned in accordance with the first and second angles, respectively, and photodetector means for producing output signals varying with movement of the imaged grid lines relative to the aligned optical grid.

13. The system of claim 10 wherein the shaft is provided with third and fourth sets of parallel grid lines superimposed about the circumference of the shaft in a single position axially spaced from the position of said first and second set of grid lines, the third set of grid lines aligned at a third angle and the fourth set of grid lines aligned at a fourth angle, the fourth angle different from the third angle; the system further comprising third and fourth optical detection means mountable at fixed positions proximate to the third and fourth sets of grid lines respectively, for detecting the passage of lines at said third and fourth angles respectively and producing output signals varying with movement of the grid lines relative to optical grid images generated by the optical detection means.

14. The system of claim 1 wherein said processing circuit means includes means for measuring displacement of the central longitudinal axis of the shaft and generating an output indicative thereof.

15. The system of claim 1 wherein said processing circuit means includes means for measuring displacement of the shaft along its central longitudinal axis and generating an output indicative thereof.

16. A system for analyzing nonrotational movement of a moving shaft having a central longitudinal axis, the shaft having a first set of parallel grid lines spaced about its circumference at a first location, formed at a first angle relative to the central longitudinal axis, and a second set of parallel grid lines at a second location axially spaced from the first location and formed at a second angle different from the first angle, comprising:

first and second optical detection means mountable at fixed positions proximate to the grid lines at the first and second locations respectively, for detecting the passage of lines at the first angle and second angle respectively and producing output signals varying with movement of the grid lines relative to optical grid images generated by the optical detection means; and processing circuit means connected to said first and second optical detection means for receiving said output signals and generating an output indicative of at least one of displacement of the central longitudinal axis of the shaft and displacement of the shaft along its central longitudinal axis, at said axial locations.

17. The system of claim 16 wherein said processing circuit means further comprises means for generating an output indicating at least one of rigid body displacement and elastic deformation.

18. The system of claim 16 wherein at least one of said optical detection means comprises a plurality of optical detection subsystems arranged at angular intervals about the shaft.

19. The system of claim 16 wherein a third axially spaced set of lines, formed at a third angle differing from each of said first and second angles, is provided at a third location on the shaft, and wherein the system further comprises a third said optical detection means located proximate to said third location and connected to said processing circuit means for generating output signals indicative of movement of lines at said third location.

20. The system of claim 19 wherein at least one of said optical detection means comprises a plurality of optical detection subsystems arranged at angular intervals about the shaft.

21. The system of claim 20 wherein at least one of said optical detection means comprises four optical detection subsystems arranged at ninety degree intervals about the shaft.

22. The system of claim 16 further comprising synchronization means for detecting passage of a predetermined point on the shaft and generating a synchronizing signal to said processing circuit means.

23. The system of claim 16 wherein said processing circuit means includes means for measuring displacement of the central longitudinal axis of the shaft and generating an output indicative thereof.

24. The system of claim 16 wherein said processing circuit means includes means for measuring displacement of the shaft along its central longitudinal axis and generating an output indicative thereof.

25. A system for analyzing nonrotational movement of a moving shaft having a central longitudinal axis, the shaft having a first set of parallel grid lines spaced about its circumference at a first location, formed at an angle relative to the central longitudinal axis, and a second set of parallel grid lines at a second location axially spaced from the first location and formed at the same said angle, comprising:

first and second optical detection means mountable at fixed positions proximate to the grid lines at the first and second locations respectively, for detecting the passage of lines and producing output signals varying with movement of the grid lines relative to optical grid images generated by the optical detection means; and processing circuit means connected to said first and second optical detection means for receiving said output signals, measuring a phase difference thereof, and generating an output indicative of axial strain of the shaft between said axial locations based on said phase difference.

26. A system for measuring nonrotational movement of a shaft having an axis of rotation and having at least one set of grid lines spaced about its circumference in at least one location, comprising:

a plurality of optical detection subsystems mountable in a fixed position proximate to said shaft and near said grid line location for producing an output signal varying with movement of the grid lines relative to said optical detection means, each said optical detection subsystem comprising incoherent radiation energy generation means for producing incoherent radiation energy and directing it against the grid lines; a Ronchi grid having a plurality of radiation passage lines with spacing corresponding to the grid lines; lens means for imaging a radiation image scattered from the shaft grid lines onto the plane of said Ronchi grid; and photodetection means for detecting the radiation level passing through said Ronchi grid means and generating an output signal representative of the movement of the grid lines; and processing circuit means connected to said optical detection subsystems for receiving said output signals and generating an output signal indicative of at least one of displacement of the shaft axis and shaft displacement along the shaft axis, relative to the locations of said optical detection subsystems.

27. The system of claim 26 wherein the processing circuit means measures plunge of the shaft.

28. The system of claim 26 wherein first and second optical detection subsystems are mounted in opposition across said shaft to detect passage of the same set of grid lines.

29. The system of claim 28 wherein said processing circuit means compares a count of grid lines passing said first optical detection subsystem with a count of grid lines passing said second optical detection subsystem to measure motion of the shaft axis relative to said optical detection subsystems.

30. The system of claim 26 wherein first and second optical detection subsystems are mounted at axially spaced locations along said shaft and said shaft is provided with grid lines at each of said axially spaced locations.

31. The system of claim 30 comprising four said optical detection subsystems, the third and fourth optical detection subsystems mounted in opposition to said first and second optical detection subsystems respectively at said axially spaced locations.

32. The system of claim 31 wherein the processing circuit means measures pitch and plunge of the shaft.

33. The system of claim 30 wherein said processing circuit means compares a count of grid lines passing said first optical detection subsystem with a count of grid lines passing said second optical detection subsystem to measure motion of the shaft axis relative to said optical detection subsystems.

* * * * *